United States Patent [19]

Ueda et al.

[11] Patent Number: 5,077,164
[45] Date of Patent: Dec. 31, 1991

[54] PHOTOSENSITIVE MEMBER CONTAINING AN AZO DYE

[75] Inventors: Hideaki Ueda; Takamasa Ueda, both of Osaka; Masakazu Takata, Nagaokakyo, all of Japan

[73] Assignee: Minolta Camera Kabushiki Kaisha, Osaka, Japan

[21] Appl. No.: 540,758

[22] Filed: Jun. 20, 1990

[30] Foreign Application Priority Data

Jun. 21, 1989 [JP] Japan .................................. 1-160515
Jun. 21, 1989 [JP] Japan .................................. 1-160516
Jun. 27, 1989 [JP] Japan .................................. 1-164372
Jul. 25, 1989 [JP] Japan .................................. 1-191937
Oct. 2, 1989 [JP] Japan .................................. 1-257389

[51] Int. Cl.$^5$ ............................................. G03G 5/06
[52] U.S. Cl. ...................................... 430/73; 430/77; 430/78
[58] Field of Search .................. 430/58, 59, 72, 73, 430/75, 76, 79

[56] References Cited

U.S. PATENT DOCUMENTS 4,480,019 10/1984 Higashiguchi et al. ............... 430/58
4,939,058 7/1990 Shibata et al. ......................... 430/75

FOREIGN PATENT DOCUMENTS 57-188042 11/1982 Japan .
59-33456 1/1984 Japan .
59-157645 9/1984 Japan .
60-119566 6/1985 Japan .

Primary Examiner—John Goodrow
Attorney, Agent, or Firm—Burns, Doane, Swecker & Mathis

[57] ABSTRACT

The present invention relates to a photosensitive member with a photosensitive layer on or over an electrically conductive substrate, in which the photosensitive layer comprises at least one of azo pigments selected from the group consisting of azo pigments represented by the following general formulas [I], [II] and [III].

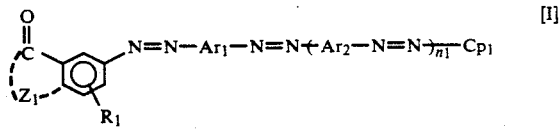

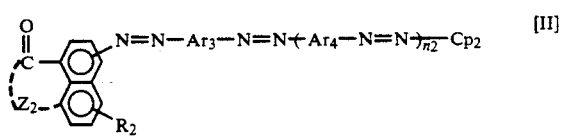

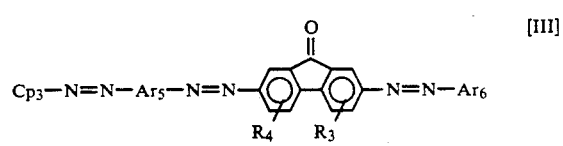

in which $Z_1$ is a residual group of a condensed ring excluding the benzene ring and the carbonyl group in the formula [I]; $Z_2$ is a residual group of a condensed ring excluding the naphthalene ring and the carbonyl group in the formula [II]; $Z_1$ and $Z_2$ may have a substituent respectively; $R_1$, $R_2$, $R_3$ and $R_4$ represent independently a hydrogen atom, an alkyl group, an alkoxy group, a halogen atom, a hydroxy group or a nitro group; $Ar_1$, $Ar_2$, $Ar_3$, $Ar_4$ and $Ar_5$ represent independently an arylene group which may have a substituent; $Ar_6$ represents an aryl group which may have a substituent or a residual group of a coupler component having a phenolic hydroxy group; $Cp_1$, $Cp_2$ and $Cp_3$ represent independently a residual group of a coupler component having a phenolic hydroxy group; $n_1$ and $n_2$ represent independently an integer of 0 or 1.

19 Claims, 1 Drawing Sheet

PHOTOSENSITIVE MEMBER CONTAINING AN AZO DYE

BACKGROUND OF THE INVENTION

This invention relates to a photosensitive member containing a new azo dye.

Known photosensitive materials for forming a photosensitive member include inorganic photoconductive materials such as selenium, cadmium sulfide or zinc oxide.

These photosensitive materials have many advantages such as low loss of charges in the dark, an electrical charge which can be rapidly dissipated with irradiation of light and the like. However, they have disadvantages. For example, a photosensitive member based on selenium is difficult to produce, has high production costs and is difficult to handle due to inadequate resistivity to heat or mechanical impact. A photosensitive member based on zinc oxide or cadmium sulfide has defects such as its unstable sensitivity with time because of the deterioration of dyestuffs, added as a sensitizer, by corona charge and fading with exposure.

Many kinds of organic photoconductive materials such as polyvinylcarbazole and so on have been proposed. These organic photoconductive materials have superior film forming properties, are light in weight, etc., but inferior in sensitivity, durability and environmental stability compared to the aforementioned inorganic photoconductive materials.

Various studies and developments have been in progress to overcome the above noted defects and problems. A function-divided photosensitive member of a laminated or a dispersed type has been proposed, in which charge generating function and charge transporting function are divided by different layers or different dispersed materials. The function-divided photosensitive member can be a highly efficient photosensitive member in electrophotographic properties such as chargeability, sensitivity, residual potential, durability with respect to copy and repetition, because most adequate materials can be selected from various materials. Further, function-divided photosensitive members have high productivity and low costs, since they can be prepared by coating, and suitably selected charge generating materials can freely control a region of photosensitive wavelength. Illustrative examples of such charge generating materials are organic pigments or dyes such as phthalocyanine pigment, cyanine pigment, polycyclic quinone pigment, perylene pigment, perinone pigment, indigo dye, thioindigo dye, squarain compounds, etc., and inorganic materials such as selenium, selenium-arsenic, selenium-tellurium, cadmium sulfide, zinc oxide, amorphous silicon, etc.

However, photosensitive members, which satisfy general property requirements are not produced easily, and photosensitive members having more improved sensitivity are desired.

SUMMARY OF THE INVENTION

The object of the invention is to provide a photosensitive member having excellent general static properties, in particular, sensitivity.

The present invention provides a photosensitive member with a photosensitive layer on or over an electrically conductive substrate, in which the photosensitive layer comprises at least one of azo pigments selected from the group consisting of azo pigments represented by the following general formulas [I], [II] and [III].

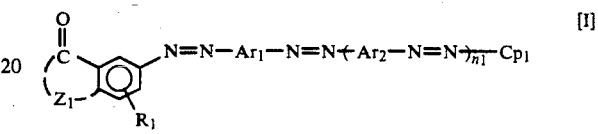

[I]

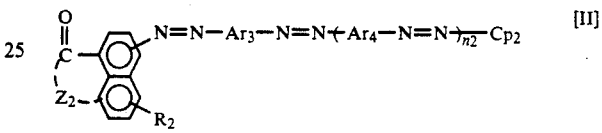

[II]

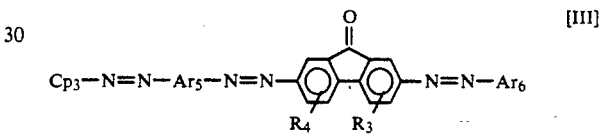

[III]

in which $Z_1$ is a residual group of a condensed ring excluding the benzene ring and the carbonyl group in the formula [I]; $Z_2$ is a residual group of a condensed ring excluding the naphthalene ring and the carbonyl group in the formula [II]; $Z_1$ and $Z_2$ may have a substituent respectively; $R_1$, $R_2$, $R_3$ and $R_4$ represent independently a hydrogen atom, an alkyl group, an alkoxy group, a halogen atom, a hydroxy group or a nitro group; $Ar_1$, $Ar_2$, $Ar_3$, $Ar_4$ and $Ar_5$ represent independently an arylene group which may have a substituent; $Ar_6$ represents an aryl group which may have a substituent or a residual group of a coupler component having a phenolic hydroxy group; $Cp_1$, $Cp_2$ and $Cp_3$ represent independently a residual group of a coupler component having a phenolic hydroxy group; $n_1$ and $n_2$ represent independently an integer of 0 or 1;

a photosensitive member with a photosensitive layer on or over an electrically conductive substrate, in which the photosensitive layer comprises a mixture of an azo pigment represented by the following general formula [IV] with an azo pigment represented by the following general formula [V]:

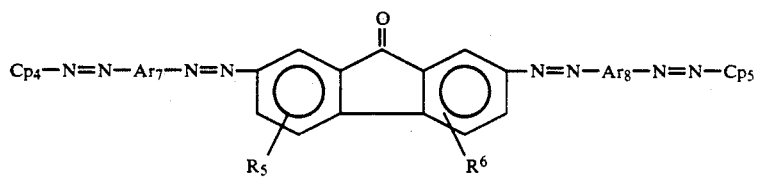

[IV]

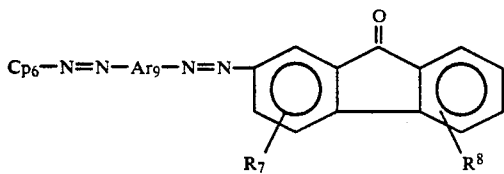

in which $Ar_7$, $Ar_8$ and $Ar_9$ represent independently an arylene group which may have a substituent; $R_5$, $R_6$, $R_7$ and $R_8$ represent independently a hydrogen atom, a halogen atom, an alkyl group, an alkoxy group, a hydroxy group or a nitro group; $Cp_4$, $Cp_5$ and $Cp_6$ represent independently a residual group of a coupler component having a phenolic hydroxy group; and a photosensitive member with a photosensitive layer on or over an electrically conductive substrate, in which the photosensitive layer comprises a mixture of an azo pigment represented by the following general formula [III] with an azo pigment represented by the following general formula [V]:

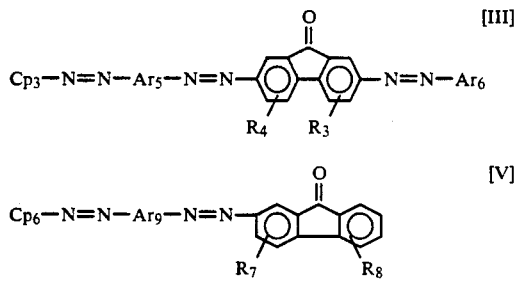

in which $Ar_5$ and $Ar_9$ represent independently an arylene group which may have a substituent; $Ar_6$ is a residual group of a coupler component having a phenolic hydroxy group; $R_3$, $R_4$, $R_7$ and $R_8$ represent independently a hydrogen atom, a halogen atom, an alkyl group, an alkoxy group, a hydroxy group or a nitro group; $Cp_3$ and $Cp_6$ represent independently a residual group of a coupler component having a phenolic hydroxy group.

DETAILED DESCRIPTION OF THE INVENTION

Figure 1:
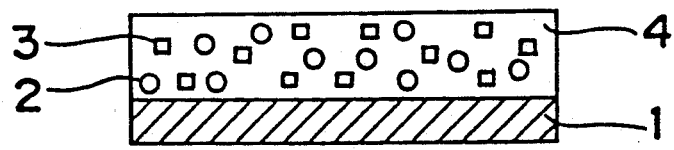
FIG. 1 is a diagram showing the structure of a dispersion-type photosensitive member embodying the invention comprising a photosensitive layer formed on an electrically conductive substrate.

The present invention provides a photosensitive member, having excellent electrophotographic properties, in particular, sensitivity.

The present invention has accomplished the above object by the introduction of a specific azo pigment into a photosensitive member as a charge generating material.

A photosensitive member provided according to the present invention contains a specific azo compound represented by the following formula [I], [II] and/or [III].

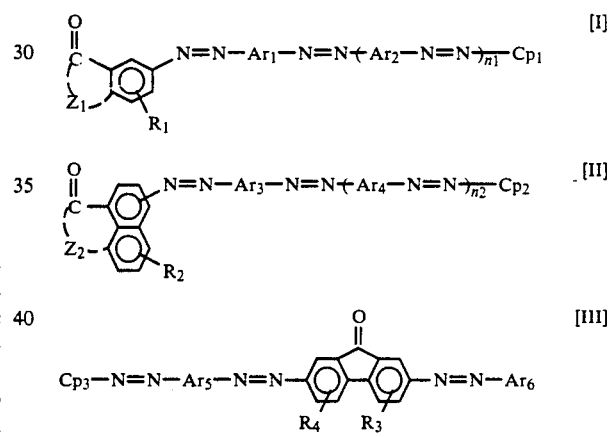

in which $Z_1$ is a residual group of a condensed ring excluding the benzene ring and the carbonyl group in the formula [I]; $Z_2$ is a residual group of a condensed ring excluding the naphthalene ring and the carbonyl group in the formula [II]; $Z_1$ and $Z_2$ may have a substituent respectively; $R_1$, $R_2$, $R_3$ and $R_4$ represent independently a hydrogen atom, an alkyl group, an alkoxy group, a halogen atom, a hydroxy group or a nitro group; $Ar_1$, $Ar_2$, $Ar_3$, $Ar_4$ and $Ar_5$ represent independently an arylene group which may have a substituent; $Ar_6$ represents an aryl group which may have a substituent or a residual group of a coupler component having a phenolic hydroxy group; $Cp_1$, $Cp_2$ and $Cp_3$ represent independently a residual group of a coupler component having a phenolic hydroxy group; $n_1$ and $n_2$ represent independently an integer of 0 or 1, The present invention further provides a photosensitive member with a photosensitive layer on or over an electrically conductive substrate, in which the photosensitive layer comprises a mixture of an azo pigment represented by the following general formula [IV] with an azo pigment represented by the following general formula [V]:

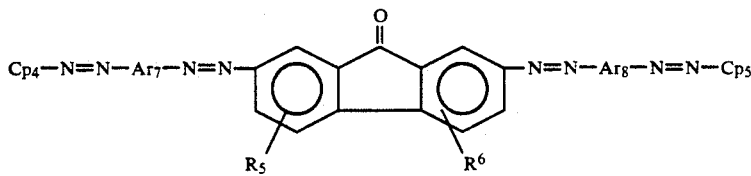

[IV]

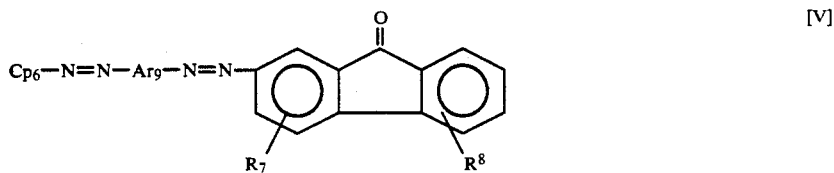

[V]

in which $Ar_7$, $Ar_8$ and $Ar_9$ represent independently an arylene group which may have a substituent; $R_5$, $R_6$, $R_7$ and $R_8$ represent independently a hydrogen atom, a halogen atom, an alkyl group, an alkoxy group, a hydroxy group or a nitro group; $Cp_4$, $Cp_5$ and $Cp_6$ represent independently a residual group of a coupler component having a phenolic hydroxy group; and a photosensitive member with a photosensitive layer on or over an electrically conductive substrate, in which the photosensitive layer comprises a mixture of an azo pigment represented by the following general formula [III] with an azo pigment represented by the following general formula [V]:

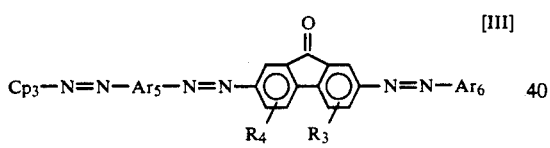

[III]

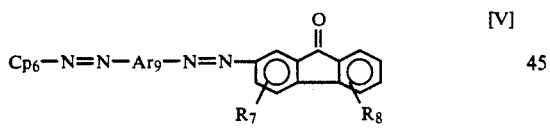

[V]

in which $Ar_5$ and $Ar_9$ represent independently an arylene group which may have a substituent; $Ar_6$ is a residual group of a coupler component having a phenolic hydroxy group; $R_3$, $R_4$, $R_7$ and $R_8$ represent independently a hydrogen atom, a halogen atom, an alkyl group, an alkoxy group, a hydroxy group or a nitro group; $Cp_3$ and $Cp_6$ represent independently a residual group of a coupler component having a phenolic hydroxy group.

The group represented by

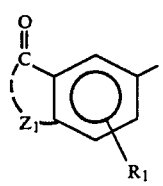

in the general formula [I] is exemplified by

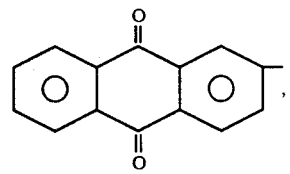

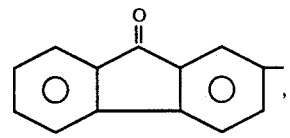

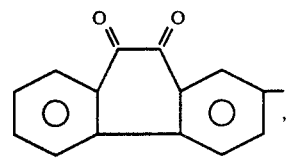

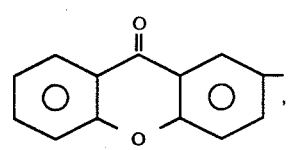

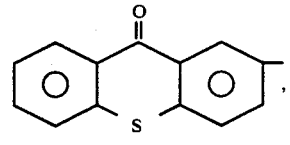

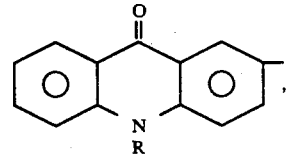

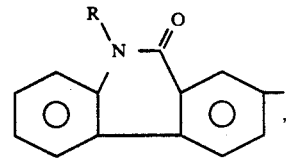

-continued
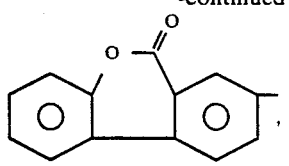
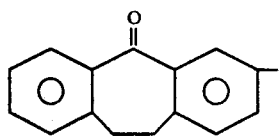
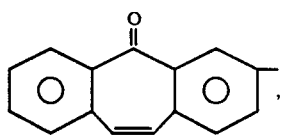
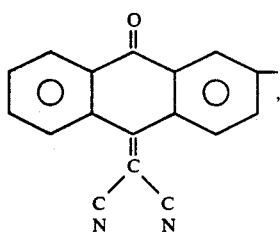
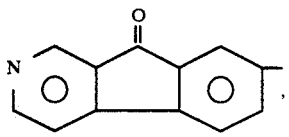
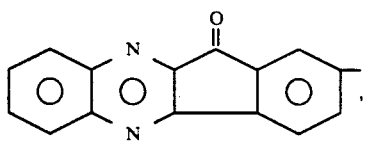
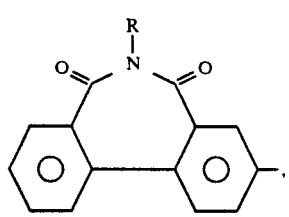
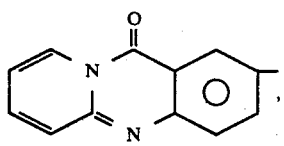
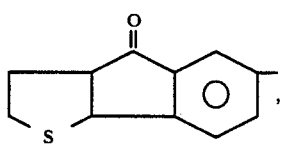
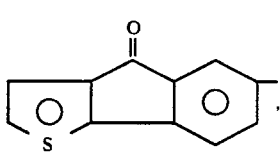
-continued
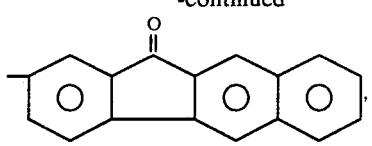
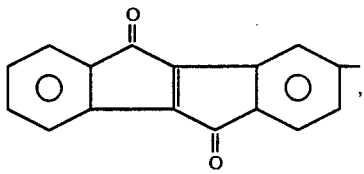
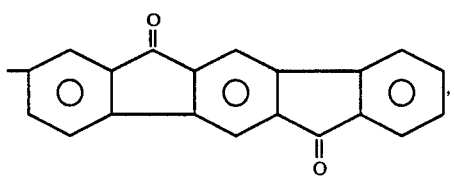
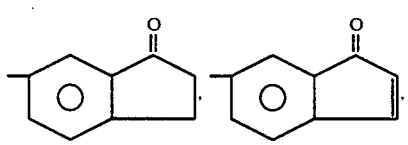
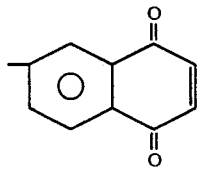
The intermediate product:
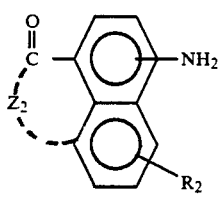
which is used to prepare the azo pigment represented by the general formula [II] is exemplified by
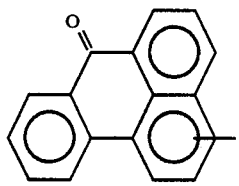
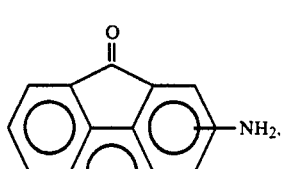

-continued

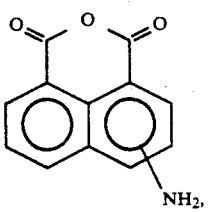

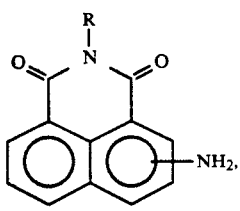

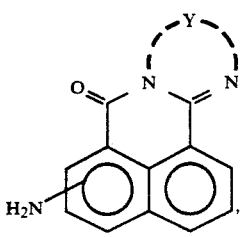

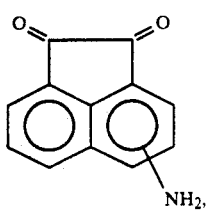

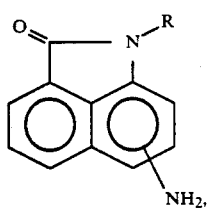

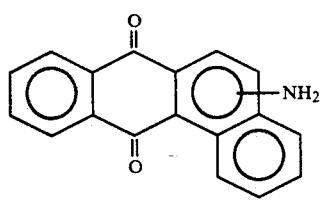

$Ar_1$–$Ar_5$ in the general formulas [I]–[III] represent independently an arylene group, such as phenylene, naphthylene or the like. The phenylene group is preferable. $Ar_1$–$Ar_5$ may have a substituent respectively, such as a $C_1$–$C_3$ alkyl group, a $C_1$–$C_2$ alkoxy group, a halogen atom (fluorine, chlorine, bromine or the like) or the like.

$Ar_6$ in the general formula [III] represents an aryl group, such as phenyl or the like, or a residual group of a coupler component having a phenolic hydroxy group. The residual group may be the same as a residual group (Cp) of a coupler component described later. $Ar_6$ may have a substituent, such as a $C_1$–$C_2$ alkoxy group, a halogen atom or the like.

$R_1$, $R_2$, $R_3$ and $R_4$ in the general formulas [I]–[II] represent independently a hydrogen atom, a $C_1$–$C_4$ alkyl group, a $C_1$–$C_4$ alkoxy group, a halogen atom (fluorine, chlorine, bromine or the like), nitro group or a hydroxy group.

$Ar_7$, $Ar_8$, $Ar_9$ in the general formulas [IV] and [V] prefers respectively an arylene group, in particular, phenylene. The phenylene group may have a substituent, for example, a halogen atom, a lower alkyl group, such as methyl or the like, a lower alkoxy group, such as methoxy or the like, or a nitro group. A phenylene group having the lower alkyl group as the substituent is particularly preferred.

$Cp_1$–$Cp_6$ represent independently a residual group of a coupler component having a phenolic hydroxyl group, which is exemplified by the ones represented by the following general formulas [a]–[j]:

 [a]

 [b]

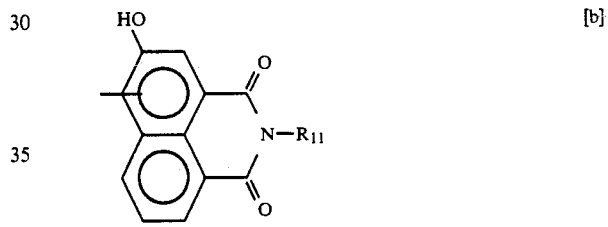 [c]

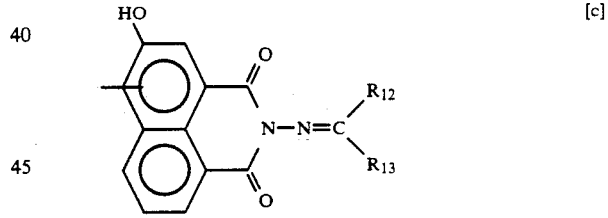 [d]

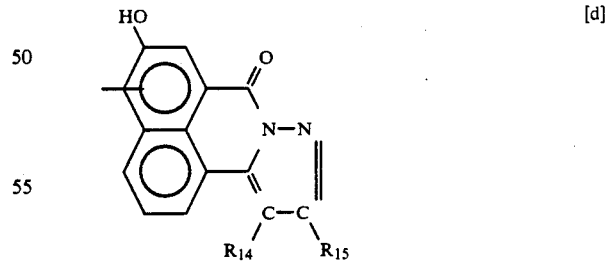 [e]

-continued

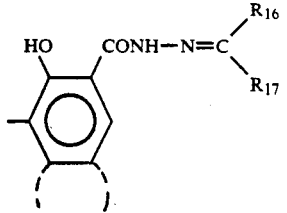

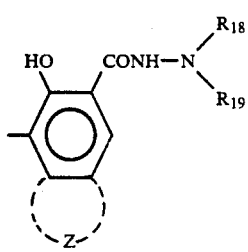

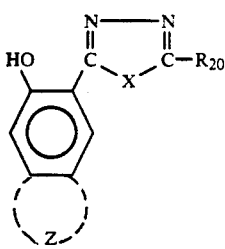

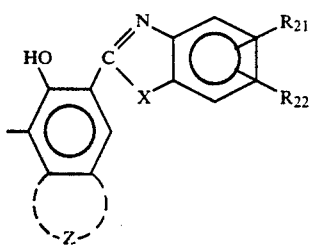

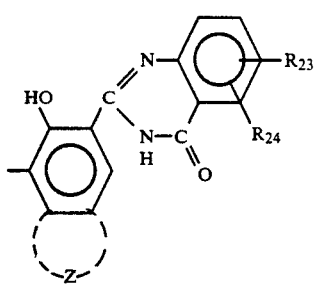

wherein X is an oxygen atom, a sulfur atom or a nitrogen atom which may have a substituent; Y is a bivalent group of aromatic hydrocarbon or a bivalent group which may form a heterocyclic ring together with nitrogen atoms; z is a residual group which may be condensed with benzene ring to form a conjugated polycyclic ring or a heterocyclic ring; $R_9$, $R_{10}$, $R_{12}$, $R_{13}$, $R_{16}$, $R_{17}$, $R_{18}$ and $R_{19}$ are an alkyl group, an aralkyl group, an aryl group, or a heterocyclic group, each of which may have a substituent and form a ring with each other, or a hydrogen atom; $R_{11}$ and $R_{20}$ are independently an alkyl group, an aralkyl group, an aryl group or a heterocyclic group, each of which may have a substituent; $R_{14}$, and $R_{15}$ are a hydrogen atom, a halogen atom, or an alkyl group, an aralkyl group, an acyl group, an alkoxycarbonyl group, an aryl group, a condensed polycyclic group or a heterocyclic group, each of which may have a substituent; $R_{21}$, $R_{22}$, $R_{23}$ and $R_{24}$ are a hydrogen atom, a halogen atom, an alkyl group, a nitro group, substituted sulfone group, a carbamoyl group which may have a substituent on the nitrogen atom, a sulfamoyl group, a C-acylamino group which may have a substituent or a phthalimidyl group; $R_{21}$ and $R_{22}$, or $R_{22}$ and $R_{23}$ may form a ring with each other.

In particular, a preferred coupler is the one represented by the foregoing general formula [a], [c], [f], [g] or [h] wherein $R_9$, $R_{10}$, $R_{16}$, $R_{18}$ are hydrogen, $R_{10}$, $R_{13}$, $R_{17}$, $R_{19}$, $R_{20}$ are the substituted phenyl group of the following general formula,

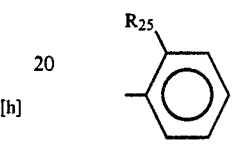

wherein $R_{25}$ is selected from the group consisting of halogen, nitro, cyano, trinitro-fluoromethyl.

A preferred coupler component of the invention is shown below by chemical formulas (1)–(80), but with no significance in restricting the embodiments of the invention.

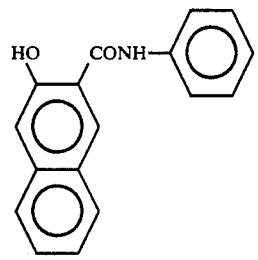

[1]

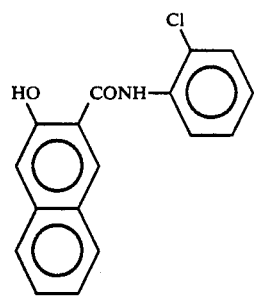

[2]

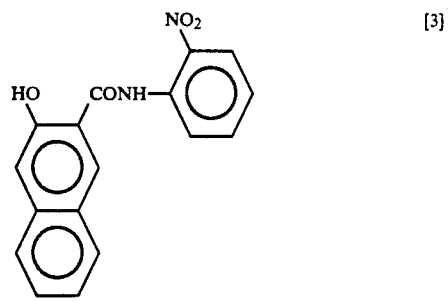

[3]

-continued
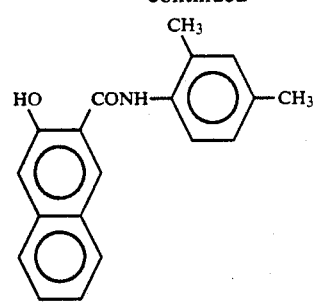 [4]
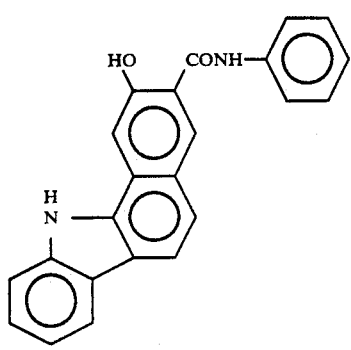 [5]
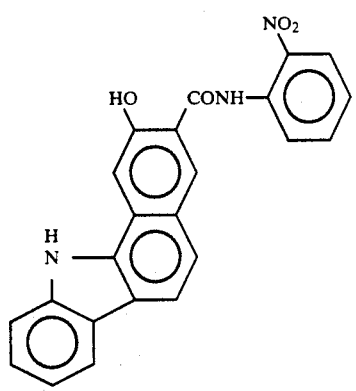 [6]
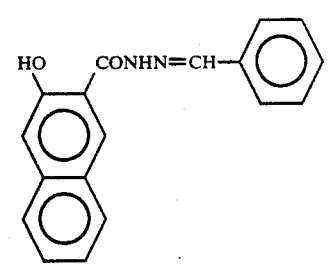 [7]
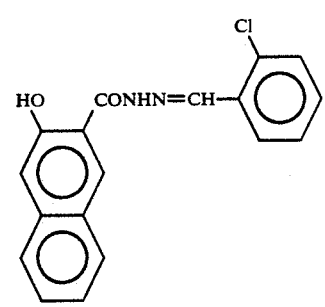 [8]
-continued
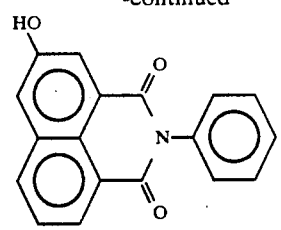 [9]
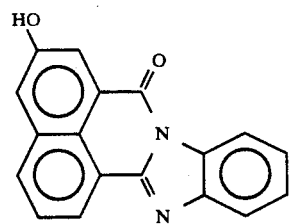 [10]
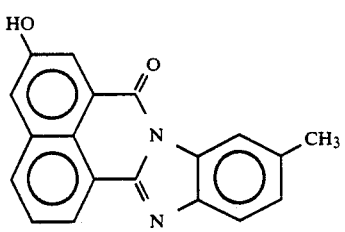 [11]
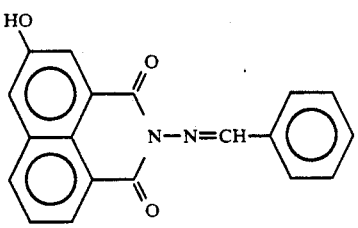 [12]
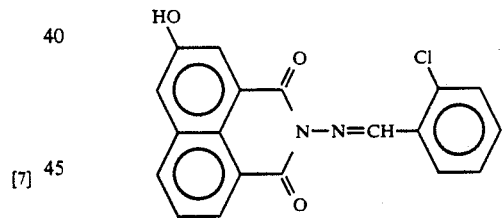 [13]
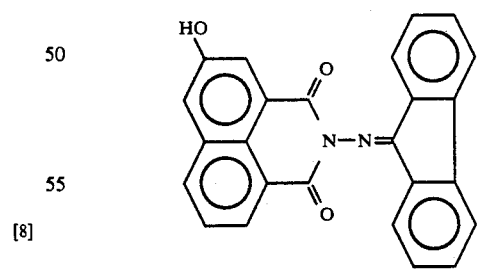 [14]
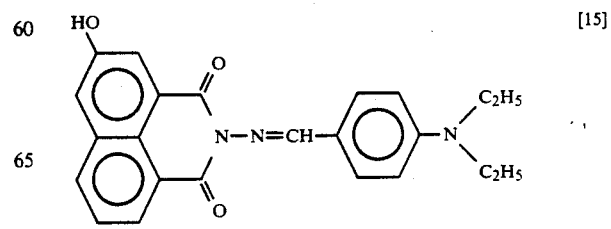 [15]

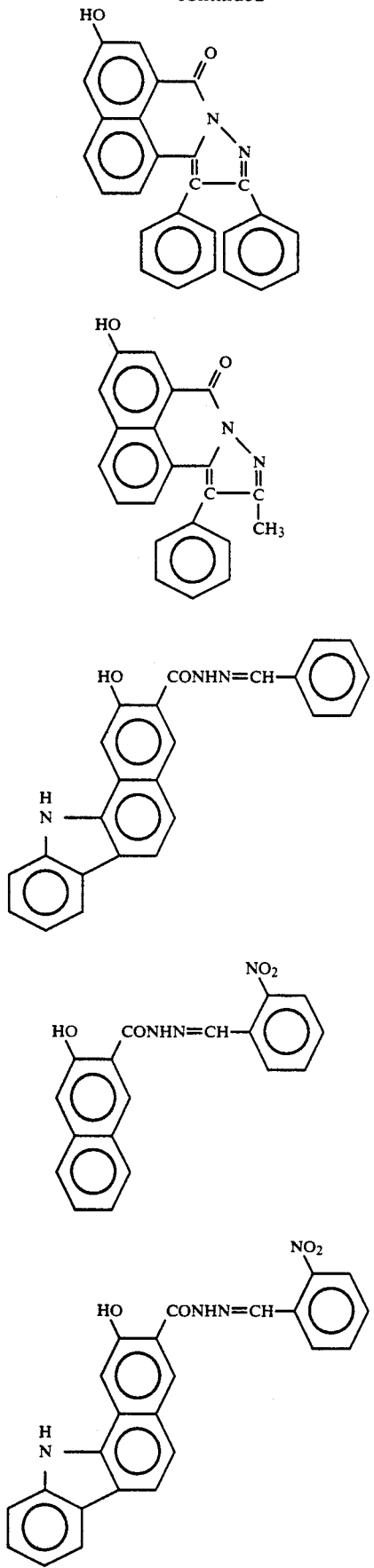
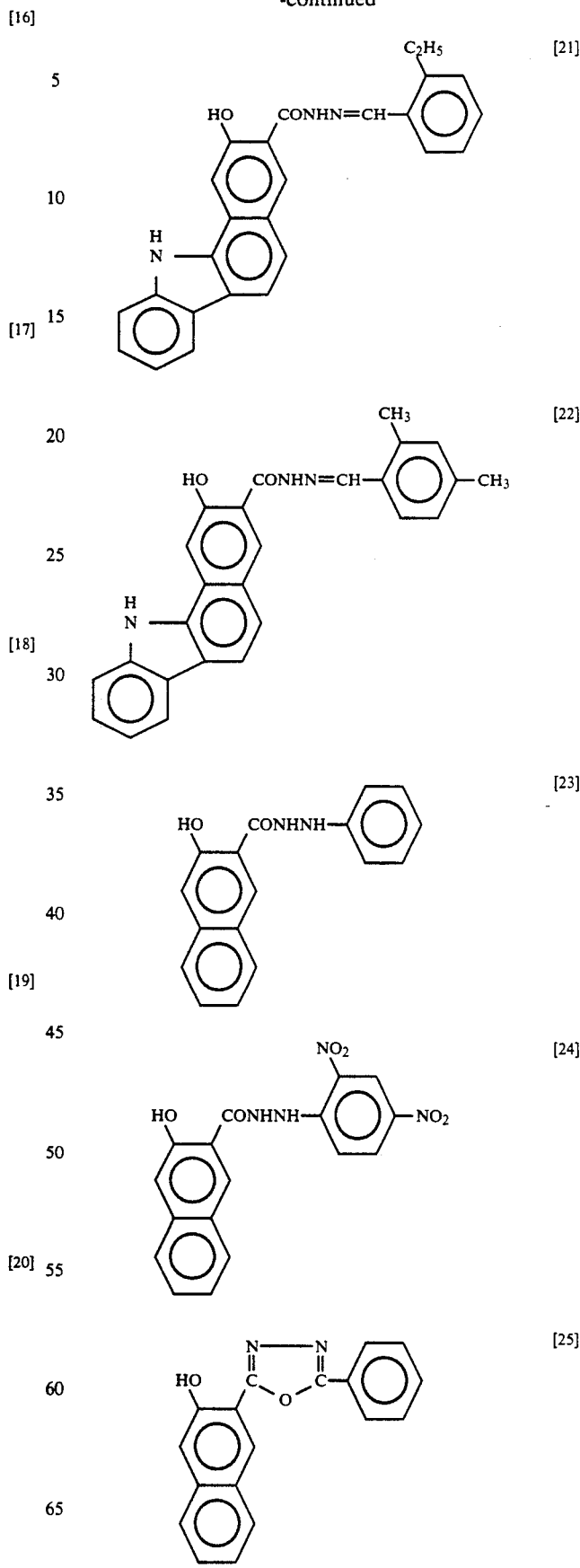

-continued
[26] 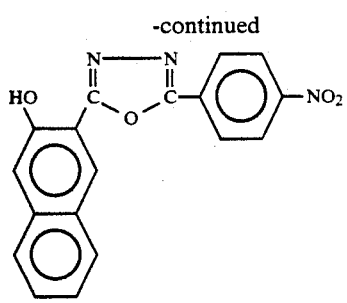
[27] 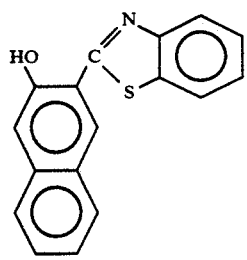
[28] 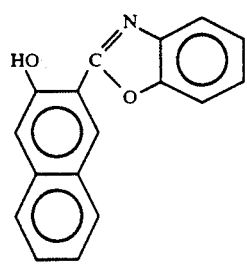
[29] 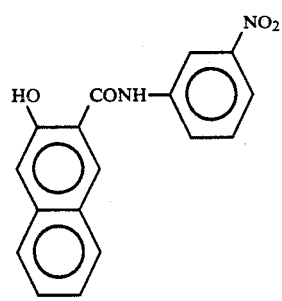
[30] 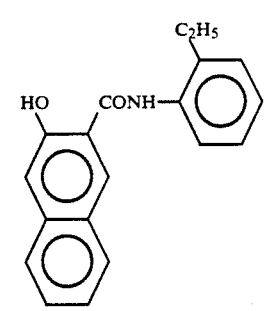
[31] 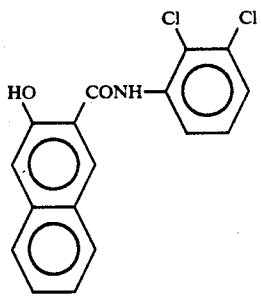
-continued
[32] 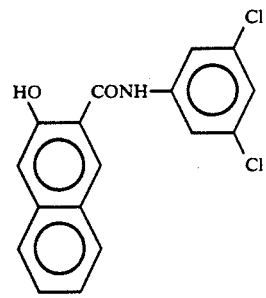
[33] 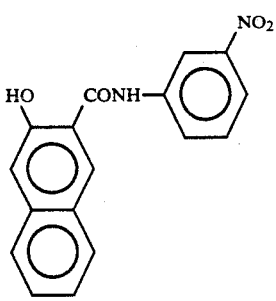
[34] 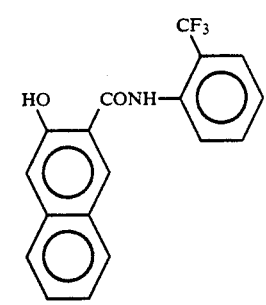
[35] 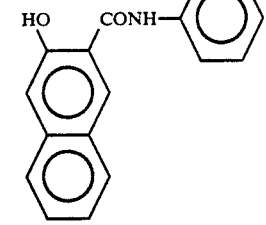
[36] 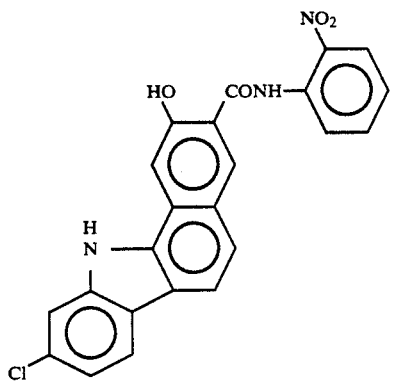

[37] 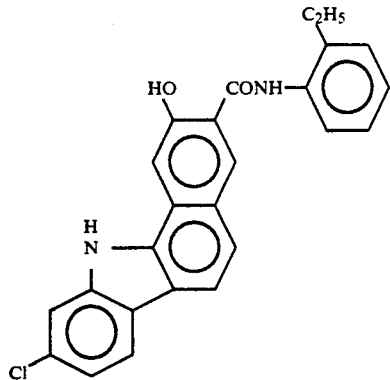
[38] 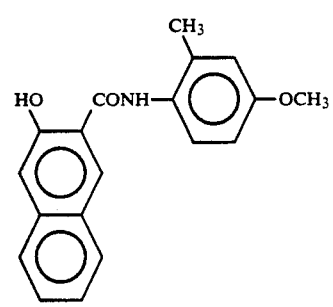
[39] 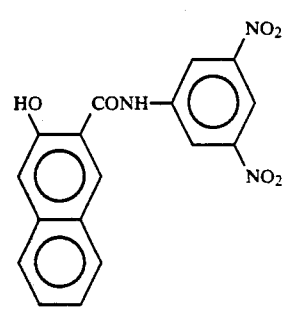
[40] 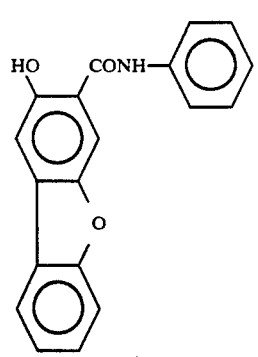
[41] 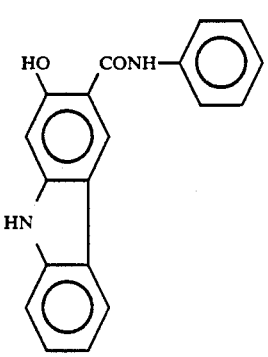
[42] 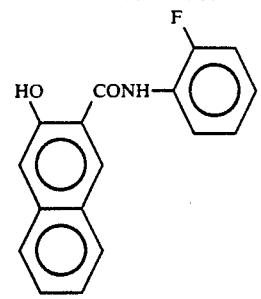
[43] 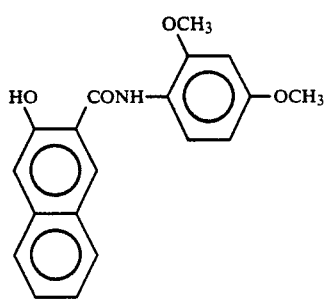
[44] 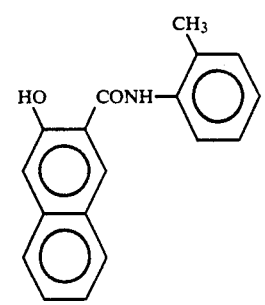
[45] 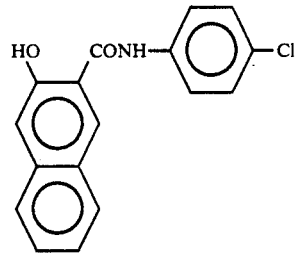
[46] 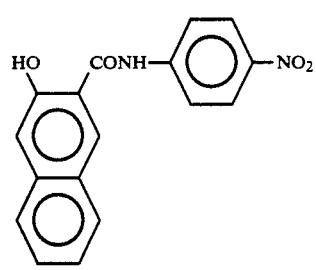

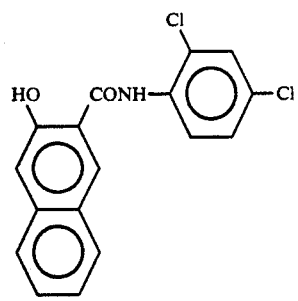 [47]
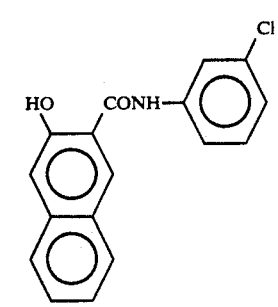 [48]
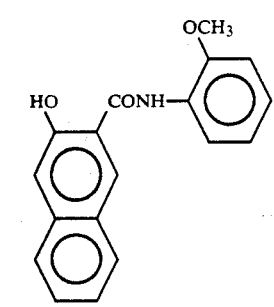 [49]
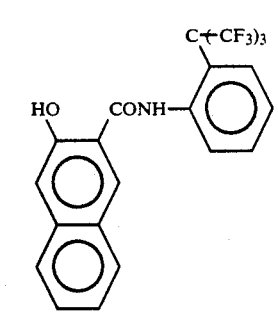 [50]
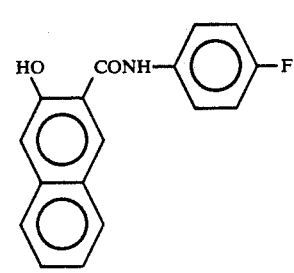 [51]
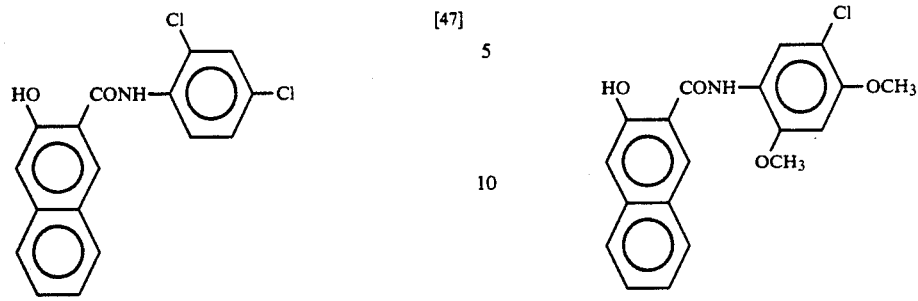 [52]
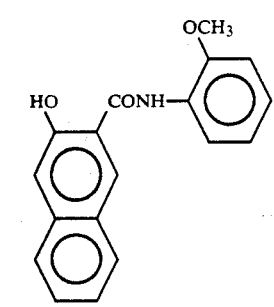 [53]
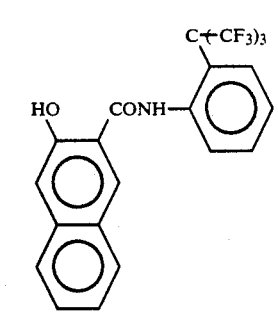 [54]
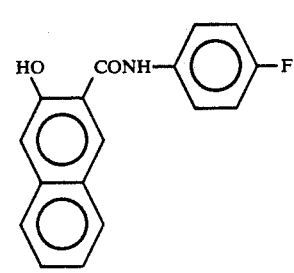 [55]
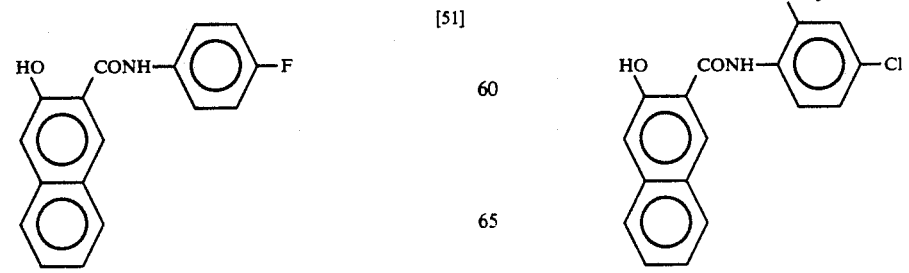 [56]

-continued
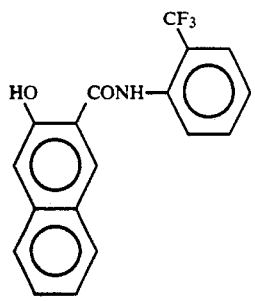 [57]
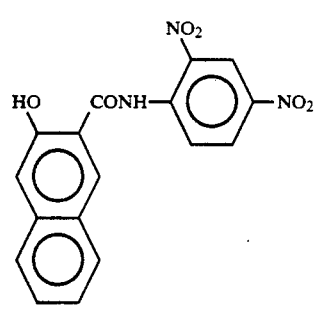 [58]
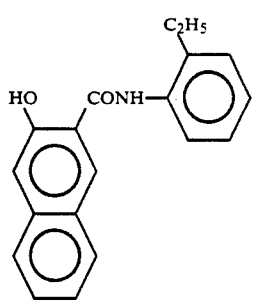 [59]
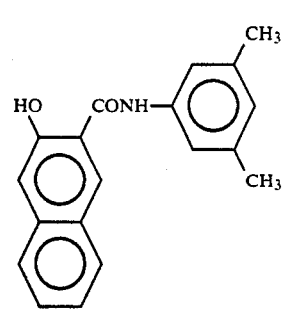 [60]
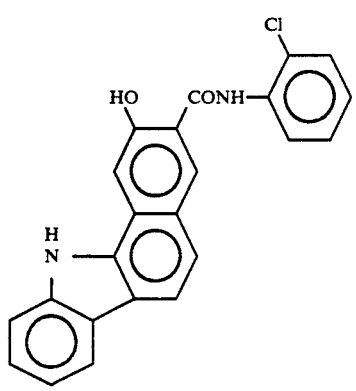 [61]
-continued
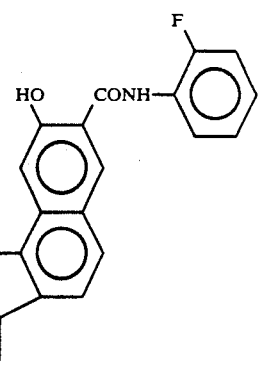 [62]
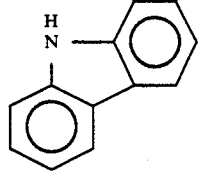 [63]
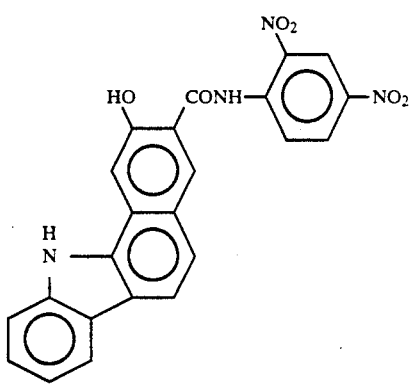 [64]
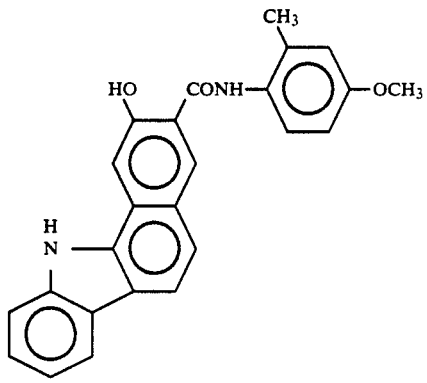 [65]

-continued
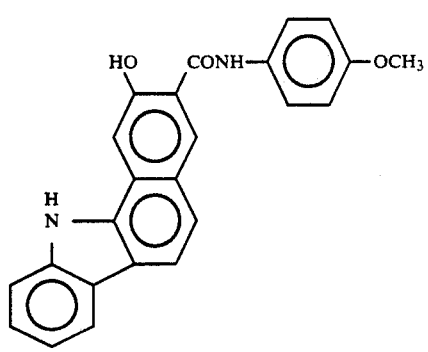
[66]
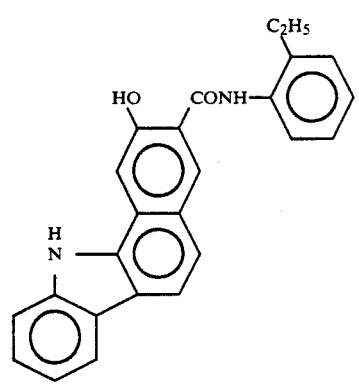
[67]
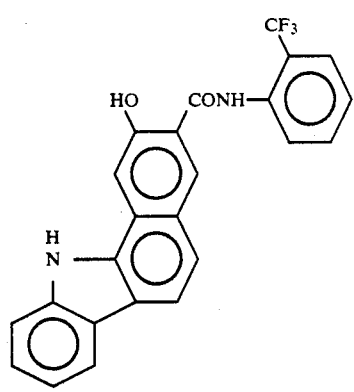
[68]
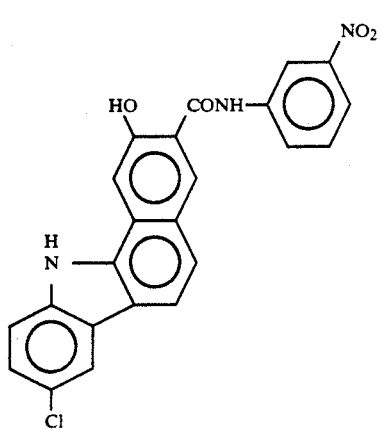
[69]
-continued
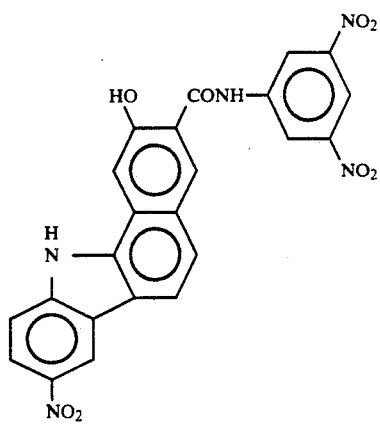
[70]
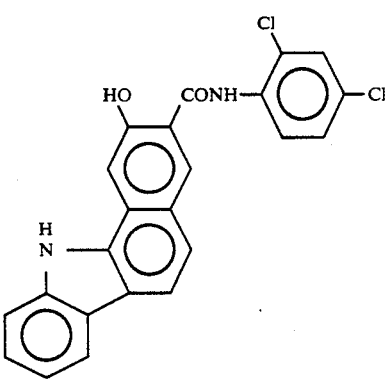
[71]
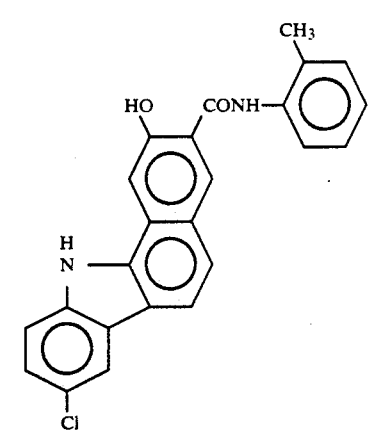
[72]
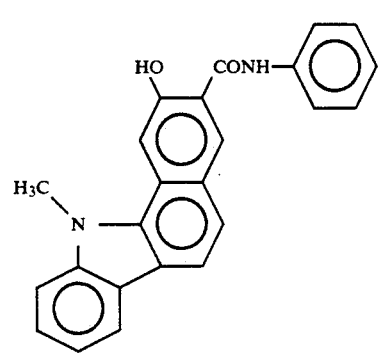
[73]

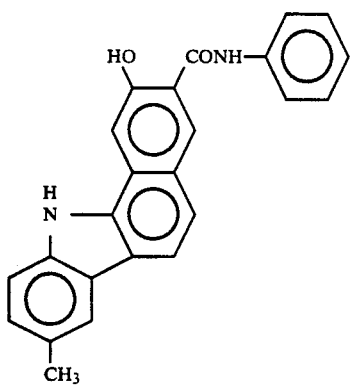
[74]
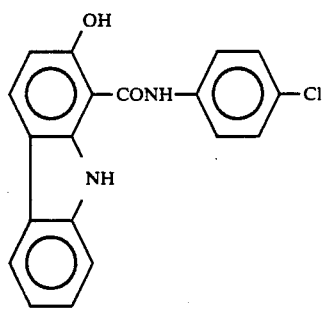
[78]
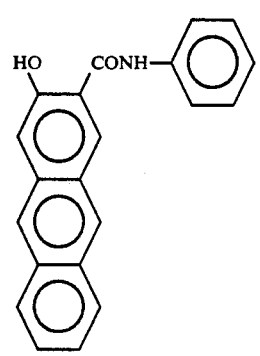
[75]
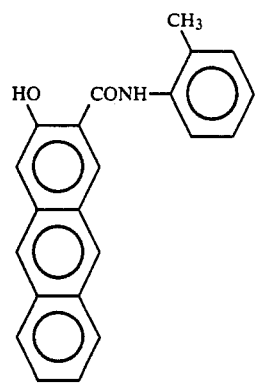
[76]
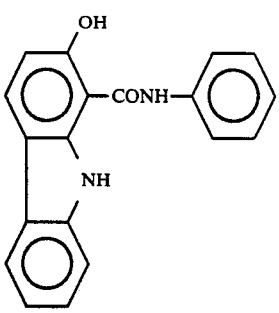
[77]
[79]
[80]
Particularly preferred azo pigments represented by the general formula [III] are exemplified in the Table A below:
TABLE A
| Azo pigment No. | Cp$_3$ | Ar$_5$ | Ar$_6$ | R$_4$ | R$_3$ |
|---|---|---|---|---|---|
| A-1 | 4 | –⟨C$_6$H$_4$⟩– | –⟨C$_6$H$_4$⟩–OH | H | H |

TABLE A-continued

| Azo pigment No. | Cp₃ | Ar₅ | Ar₆ | R₄ | R₃ |
|---|---|---|---|---|---|
| A-2 | 2 | phenyl | phenyl-OH | H | H |
| A-3 | 1 | 2-CH₃-phenyl | 2-CH₃-phenyl-OH | H | H |
| A-4 | 47 | 2-CH₃-phenyl | phenyl-OH | H | H |
| A-5 | 2 | 2-CH₃-phenyl | 2-CH₃-phenyl-OH | H | H |
| A-6 | 42 | 2-CH₃-phenyl | phenyl-OH | 4-NO₂ | H |
| A-7 | 31 | 2-CH₃-phenyl | phenyl-OH | H | H |
| A-8 | 53 | 3-CH₃-phenyl | phenyl-OH | H | H |
| A-9 | 39 | 2-CH₃-phenyl | phenyl-OH | H | H |
| A-10 | 2 | 2-CH₃-phenyl | 2-CH₃-phenyl-OH | H | H |
| A-11 | 4 | 2-CH₃-phenyl | phenyl-OCH₃ | H | H |
| A-12 | 42 | 2-CH₃-phenyl | phenyl-OH | H | H |

TABLE A-continued

| Azo pigment No. | Cp₃ | Ar₅ | Ar₆ | R₄ | R₃ |
|---|---|---|---|---|---|
| A-13 | 2 | 2-CH₃-phenyl | 4-OH-phenyl | 3-Br | 6-Br |
| A-14 | 3 | 2-CH₃-phenyl | 4-OH-phenyl | H | H |
| A-15 | 47 | 2-OCH₃-phenyl | 4-OH-phenyl | H | H |
| A-16 | 49 | 2-OCH₃-phenyl | phenyl | H | H |
| A-17 | 50 | 2-OCH₃-phenyl | phenyl | 3-Cl | 6-Cl |
| A-18 | 53 | 2-C₂H₅-phenyl | 4-OH-phenyl | H | H |
| A-19 | 54 | 2-C₂H₅-phenyl | 3-CH₃-4-OH-phenyl | H | H |
| A-20 | 55 | 2-C₂H₅-phenyl | 3-CH₃-4-OH-phenyl | H | H |
| A-21 | 2 | 2-C₂H₅-phenyl | 4-OH-phenyl | 4-NO₂ | H |
| A-22 | 33 | 4-C₂H₅-phenyl | 4-OH-phenyl | H | H |
| A-23 | 44 | 2-C₂H₅-phenyl | 44 | 3-Cl | H |

TABLE A-continued
| Azo pigment No. | Cp₃ | Ar₅ | Ar₆ | R₄ | R₃ |
|---|---|---|---|---|---|
| A-24 | 47 | 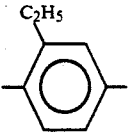 4-C₂H₅-phenyl | 47 | 3-Cl | H |
| A-25 | 51 | 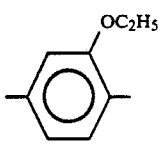 4-OC₂H₅-phenyl | 51 | 3-Br | H |
| A-26 | 31 | 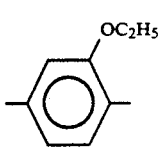 4-OC₂H₅-phenyl | 31 | 3-Br | H |
| A-27 | 53 | 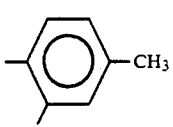 3,4-dimethyl-phenyl (CH₃ shown) | 53 | 3-Br | 6-Br |
| A-28 | 2 | 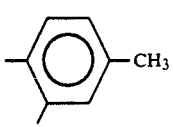 | 2 | 3-Br | 6-Br |
| A-29 | 47 | 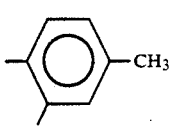 | 47 | H | H |
| A-30 | 51 | 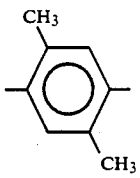 2,4,5-trimethylphenyl | 51 | H | H |
| A-31 | 53 | 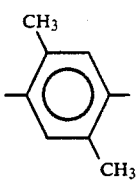 | 53 | 4-Br | H |
| A-32 | 39 | 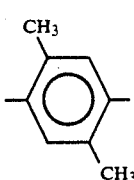 | 39 | H | H |
| A-33 | 2 | 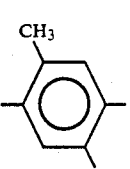 | 2 | H | H |

TABLE A-continued
| Azo pigment No. | Cp3 | Ar5 | Ar6 | R4 | R3 |
|---|---|---|---|---|---|
| A-34 | 3 | 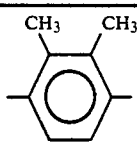 | 3 | H | H |
| A-35 | 4 | 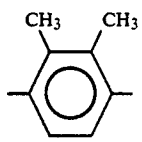 | 4 | H | H |
| A-36 | 47 | 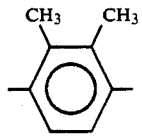 | 47 | H | H |
| A-37 | 5 | 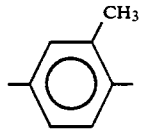 | 5 | 3-Cl | 6-Cl |
| A-38 | 68 | 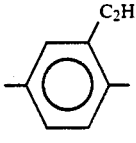 | 68 | 3-Cl | 6-Cl |
| A-39 | 2 | 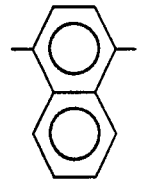 | 2 | 3-Cl | H |
| A-40 | 47 | 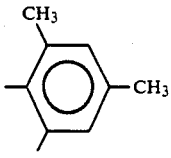 | 47 | 3-Cl | H |
| A-41 | 31 | 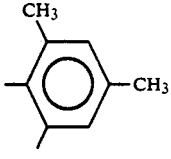 | 31 | 3-Br | 6-Br |
| A-42 | 65 | 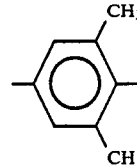 | 65 | 3-Br | 6-Br |
| A-43 | 69 | 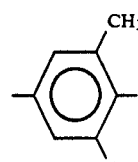 | 69 | 3-Br | H |

TABLE A-continued

| Azo pigment No. | Cp₃ | Ar₅ | Ar₆ | R₄ | R₃ |
|---|---|---|---|---|---|
| A-44 | 2 | 2,6-dimethylphenyl | 4 | 3-Br | H |
| A-45 | 3 | 2,6-dimethylphenyl | 52 | 4-CH₃ | H |
| A-46 | 4 | 2,6-dimethylphenyl | 53 | H | H |
| A-47 | 42 | 2-methyl-4-methoxyphenyl | 65 | H | H |
| A-48 | 50 | 2-methyl-4-methoxyphenyl | 10 | H | H |
| A-49 | 31 | naphthyl | 25 | 4-OCH₃ | H |
| A-50 | 53 | naphthyl | 29 | H | H |

Particularly preferred azo pigments represented by the general formula [IV] are exemplified in the Table B below:

TABLE B

| Azo pigment No. | Cp₄ | Cp₅ | Ar₇ | Ar₈ | R₅ | R₆ |
|---|---|---|---|---|---|---|
| A-51 | 2 | 2 | phenyl | phenyl | H | H |

TABLE B-continued
| Azo pigment No. | Cp4 | Cp5 | Ar7 | Ar8 | R5 | R6 |
|---|---|---|---|---|---|---|
| A-52 | 47 | 47 | 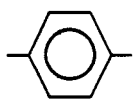 |  | 4-NO₂ | H |
| A-53 | 1 | 1 | 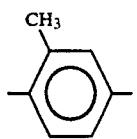 | 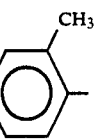 | H | H |
| A-54 | 2 | 2 | 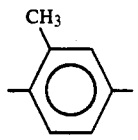 | 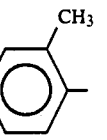 | H | H |
| A-55 | 31 | 31 | 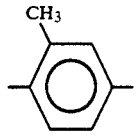 | 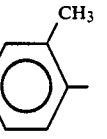 | H | H |
| A-56 | 42 | 42 | 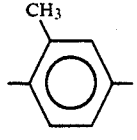 | 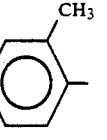 | H | H |
| A-57 | 49 | 49 | 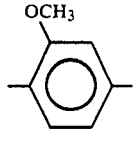 | 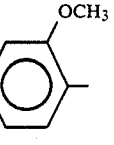 | H | H |
| A-58 | 53 | 53 | 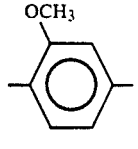 | 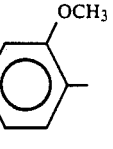 | H | H |
| A-59 | 39 | 39 | 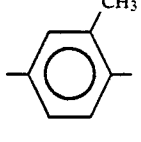 | 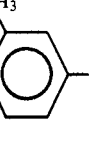 | H | H |
| A-60 | 5 | 5 | 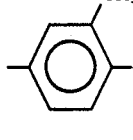 | 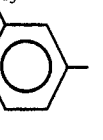 | H | H |
| A-61 | 68 | 68 | 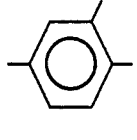 |  | H | H |
| A-62 | 1 | 1 | 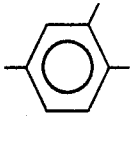 | 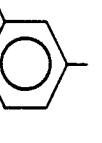 | H | H |

TABLE B-continued

| Azo pigment No. | Cp₄ | Cp₅ | Ar₇ | Ar₈ | R₅ | R₆ |
|---|---|---|---|---|---|---|
| A-63 | 2 | 2 | 2-OCH₃-phenyl | 2-OCH₃-phenyl | H | H |
| A-64 | 3 | 3 | 2-OCH₃-phenyl | 2-OCH₃-phenyl | H | H |
| A-65 | 47 | 47 | 2-C₂H₅-phenyl | 2-C₂H₅-phenyl | H | H |
| A-66 | 49 | 49 | 2-C₂H₅-phenyl | 2-C₂H₅-phenyl | H | H |
| A-67 | 50 | 50 | 2-C₂H₅-phenyl | 2-C₂H₅-phenyl | H | H |
| A-68 | 53 | 53 | 2-C₂H₅-phenyl | 2-C₂H₅-phenyl | H | H |
| A-69 | 54 | 54 | 2-C₂H₅-phenyl | 2-C₂H₅-phenyl | H | H |
| A-70 | 55 | 55 | 2-C₂H₅-phenyl | 2-C₂H₅-phenyl | 3-Cl | H |
| A-71 | 2 | 2 | 2-C₂H₅-phenyl | 2-C₂H₅-phenyl | H | H |
| A-72 | 33 | 33 | 2-C₂H₅-phenyl | 2-C₂H₅-phenyl | H | H |
| A-73 | 44 | 44 | 2-C₂H₅-phenyl | 2-C₂H₅-phenyl | H | H |

TABLE B-continued

| Azo pigment No. | $Cp_4$ | $Cp_5$ | $Ar_7$ | $Ar_8$ | $R_5$ | $R_6$ |
|---|---|---|---|---|---|---|
| A-74 | 47 | 47 | 2-ethylphenyl (−C₆H₃(C₂H₅)−) | 2-ethylphenyl (−C₆H₃(C₂H₅)−) | 3-Cl | 6-Cl |
| A-75 | 51 | 51 | 2-ethylphenyl | 2-ethylphenyl | H | H |
| A-76 | 31 | 31 | 2-ethylphenyl | 2-ethylphenyl | H | H |
| A-77 | 53 | 53 | 2-methylphenyl (−C₆H₃(CH₃)−) | 2-methylphenyl | H | H |
| A-78 | 2 | 2 | 2-methylphenyl | 2-methylphenyl | H | H |
| A-79 | 47 | 47 | 2-methylphenyl | 2-methylphenyl | H | H |
| A-80 | 51 | 51 | 2-methylphenyl | 2-methylphenyl | H | H |
| A-81 | 53 | 53 | 2-methylphenyl | 2-methylphenyl | 3-Cl | 6-Cl |
| A-82 | 39 | 39 | 2-methylphenyl | 2-methylphenyl | 4-$NO_2$ | H |
| A-83 | 2 | 2 | 2,5-dimethylphenyl (−C₆H₂(CH₃)₂−) | 2,5-dimethylphenyl | H | H |

TABLE B-continued

| Azo pigment No. | Cp4 | Cp5 | Ar7 | Ar8 | R5 | R6 |
|---|---|---|---|---|---|---|
| A-84 | 4 | 4 | 2,4-(CH₃)₂-C₆H₃ | 2,4-(CH₃)₂-C₆H₃ | H | H |
| A-85 | 47 | 47 | 2,4-(CH₃)₂-C₆H₃ | 2,4-(CH₃)₂-C₆H₃ | H | H |
| A-86 | 5 | 5 | 2,4-(CH₃)₂-C₆H₃ | 2,4-(CH₃)₂-C₆H₃ | H | H |
| A-87 | 68 | 68 | 2,4-(CH₃)₂-C₆H₃ | 2,4-(CH₃)₂-C₆H₃ | 4-Br | H |
| A-88 | 2 | 2 | 2,3-(CH₃)₂-C₆H₃ | 2,3-(CH₃)₂-C₆H₃ | H | H |
| A-89 | 47 | 47 | 2,3-(CH₃)₂-C₆H₃ | 2,3-(CH₃)₂-C₆H₃ | H | H |
| A-90 | 31 | 31 | 2,3-(CH₃)₂-C₆H₃ | 2,3-(CH₃)₂-C₆H₃ | H | H |
| A-91 | 65 | 3 | 2,3-(CH₃)₂-C₆H₃ | 2,3-(CH₃)₂-C₆H₃ | H | H |
| A-92 | 69 | 69 | 2,3-(CH₃)₂-C₆H₃ | 2,3-(CH₃)₂-C₆H₃ | H | H |

TABLE B-continued

| Azo pigment No. | Cp$_4$ | Cp$_5$ | Ar$_7$ | Ar$_8$ | R$_5$ | R$_6$ |
|---|---|---|---|---|---|---|
| A-93 | 2 | 2 | 2,4-(CH$_3$)$_2$-C$_6$H$_3$ | 2,4-(CH$_3$)$_2$-C$_6$H$_3$ | H | H |
| A-94 | 42 | 42 | 2,4-(CH$_3$)$_2$-C$_6$H$_3$ | 2,4-(CH$_3$)$_2$-C$_6$H$_3$ | H | H |
| A-95 | 50 | 50 | 2,4-(CH$_3$)$_2$-C$_6$H$_3$ | 2,4-(CH$_3$)$_2$-C$_6$H$_3$ | H | H |
| A-96 | 39 | 39 | 2,4-(CH$_3$)$_2$-C$_6$H$_3$ | 2,4-(CH$_3$)$_2$-C$_6$H$_3$ | H | H |
| A-97 | 72 | 72 | 2,4-(CH$_3$)$_2$-C$_6$H$_3$ | 2,4-(CH$_3$)$_2$-C$_6$H$_3$ | H | H |
| A-98 | 2 | 2 | 2,3-(CH$_3$)$_2$-C$_6$H$_3$ | 2,3-(CH$_3$)$_2$-C$_6$H$_3$ | H | H |
| A-99 | 42 | 42 | 2,3-(CH$_3$)$_2$-C$_6$H$_3$ | 2,3-(CH$_3$)$_2$-C$_6$H$_3$ | H | H |
| A-100 | 47 | 47 | 2,3-(CH$_3$)$_2$-C$_6$H$_3$ | 2,3-(CH$_3$)$_2$-C$_6$H$_3$ | H | H |

TABLE B-continued
| Azo pigment No. | Cp4 | Cp5 | Ar7 | Ar8 | R5 | R6 |
|---|---|---|---|---|---|---|
| A-101 | 50 | 50 | 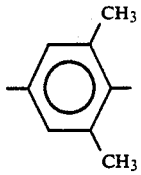 | 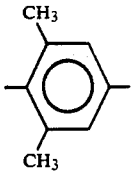 | 4-NO2 | H |
| A-102 | 31 | 31 | 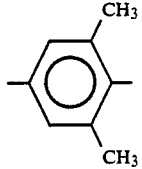 | 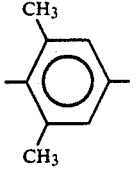 | 3-Cl | H |
| A-103 | 53 | 53 | 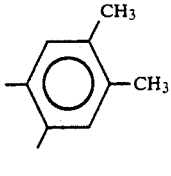 | 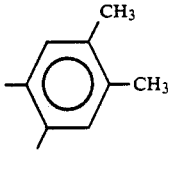 | H | H |
| A-104 | 2 | 2 | 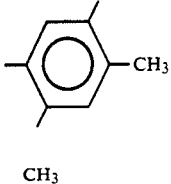 | 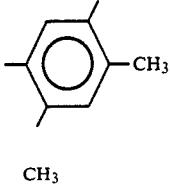 | H | H |
| A-105 | 47 | 47 | 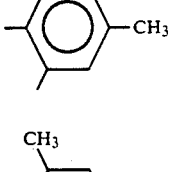 | 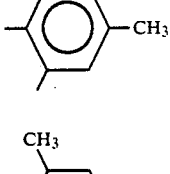 | H | H |
| A-106 | 65 | 65 | 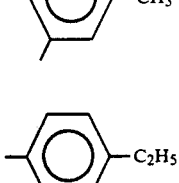 | 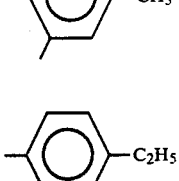 | 3-Br | 6-Br |
| A-107 | 2 | 2 | 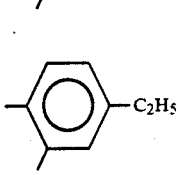 | 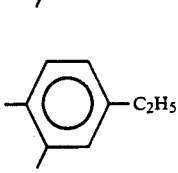 | H | H |
| A-108 | 42 | 42 | 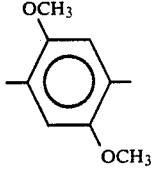 | 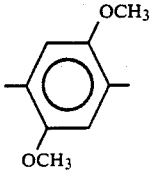 | H | H |
| A-109 | 53 | 53 |  |  | H | H |

TABLE B-continued

| Azo pigment No. | Cp4 | Cp5 | Ar7 | Ar8 | R5 | R6 |
|---|---|---|---|---|---|---|
| A-110 | 63 | 63 | tetrachlorophenyl | tetrachlorophenyl | H | H |

Particularly preferred azo pigments represented by the general formula [V] are exemplified in the Table C below:

TABLE C

| Azo pigment No. | Cp6 | Ar9 | R7 | R8 |
|---|---|---|---|---|
| B-1 | 1 | phenyl | H | H |
| B-2 | 2 | phenyl | H | H |
| B-3 | 2 | methylphenyl | H | H |
| B-4 | 4 | methylphenyl | H | H |
| B-5 | 42 | phenyl | 4-NO$_2$ | H |
| B-6 | 47 | phenyl | 5-Cl | H |
| B-7 | 49 | methylphenyl | H | H |
| B-8 | 31 | methylphenyl | 5-Cl | H |
| B-9 | 2 | methylphenyl | 3-Cl | H |
| B-10 | 47 | methylphenyl | H | H |
| B-11 | 49 | methylphenyl | 3-Cl | H |
| B-12 | 50 | phenyl | 7-NO$_2$ | H |
| B-13 | 31 | methylphenyl | 7-NO$_2$ | H |
| B-14 | 53 | methylphenyl | H | H |
| B-15 | 2 | methylphenyl | 7-NO$_2$ | H |
| B-16 | 2 | phenyl | 7-OH | H |
| B-17 | 42 | phenyl | 7-OH | H |
| B-18 | 47 | phenyl | 7-OH | H |
| B-19 | 53 | phenyl | 7-OH | H |

TABLE C-continued

| Azo pigment No. | Cp₆ | Ar₉ | R₇ | R₈ |
|---|---|---|---|---|
| B-20 | 2 | 2,4-dimethylphenyl (CH₃) | 7-OH | H |
| B-21 | 47 | 2,4,5-trimethylphenyl (CH₃, CH₃) | H | H |
| B-22 | 31 | 2,4,5-trimethylphenyl (CH₃, CH₃) | H | H |
| B-23 | 53 | 4-methylphenyl (CH₃) | H | H |
| B-24 | 39 | 4-methylphenyl (CH₃) | H | H |
| B-25 | 2 | 4-methylphenyl (CH₃) | 3-Br | H |
| B-26 | 47 | 4-methylphenyl (CH₃) | 3-Br | 6-Br |
| B-27 | 31 | 4-methylphenyl (CH₃) | 3-Br | 6-Br |
| B-28 | 39 | 4-methylphenyl (CH₃) | 7-NO₂ | H |
| B-29 | 63 | 4-methylphenyl (CH₃) | 7-NO₂ | H |
| B-30 | 68 | 4-methylphenyl (CH₃) | 7-NO₂ | H |
| B-31 | 1 | 3,4-dimethylphenyl (CH₃) | H | H |
| B-32 | 2 | 3,4-dimethylphenyl (CH₃) | H | H |
| B-33 | 47 | 3,4-dimethylphenyl (CH₃) | 7-OH | H |
| B-34 | 2 | 2-methoxyphenyl (OCH₃) | 7-OH | H |
| B-35 | 4 | 2-methoxyphenyl (OCH₃) | H | H |
| B-36 | 42 | 2-methoxyphenyl (OCH₃) | 3-Br | H |
| B-37 | 47 | 2-methoxyphenyl (OCH₃) | 7-OH | H |
| B-38 | 31 | 2-methoxyphenyl (OCH₃) | H | H |
| B-39 | 53 | 2-methoxyphenyl (OCH₃) | 4-Br | H |
| B-40 | 2 | 2-ethylphenyl (C₂H₅) | 7-OH | H |
| B-41 | 47 | 2-ethylphenyl (C₂H₅) | H | H |

TABLE C-continued

| Azo pigment No. | Cp₆ | Ar₉ | R₇ | R₈ |
|---|---|---|---|---|
| B-42 | 31 | 2,4-(C₂H₅)- phenyl | 7-NO₂ | 4-NO₂ |
| B-43 | 63 | 4-(C₂H₅)-phenyl | 7-OH | H |
| B-44 | 66 | 2-(C₂H₅)-phenyl | H | H |
| B-45 | 68 | 2-(C₂H₅)-phenyl | H | H |
| B-46 | 2 | 2,5-(CH₃)₂-phenyl | H | H |
| B-47 | 47 | 2,5-(CH₃)₂-phenyl | 7-OH | H |
| B-48 | 31 | 2,5-(CH₃)₂-phenyl | 7-NO₂ | H |
| B-49 | 53 | 2,5-(CH₃)₂-phenyl | 4-Cl | H |
| B-50 | 72 | 2,5-(CH₃)₂-phenyl | 3-Cl | 6-Cl |
| B-51 | 2 | 2,3-(CH₃)₂-phenyl | H | H |
| B-52 | 53 | 2,3-(CH₃)₂-phenyl | H | H |
| B-53 | 39 | 2,3-(CH₃)₂-phenyl | H | H |
| B-54 | 68 | 2,3-(CH₃)₂-phenyl | 7-OH | H |
| B-55 | 72 | 2,3-(CH₃)₂-phenyl | 7-NO₂ | H |
| B-56 | 2 | 2,4-(CH₃)₂-phenyl | H | H |
| B-57 | 47 | 2,4-(CH₃)₂-phenyl | 7-CH₃ | H |
| B-58 | 52 | 2,4-(CH₃)₂-phenyl | 7-OH | H |
| B-59 | 53 | 2,4-(CH₃)₂-phenyl | 4-Cl | H |

TABLE C-continued

| Azo pigment No. | Cp6 | Ar9 | R7 | R8 |
|---|---|---|---|---|
| B-60 | 62 | 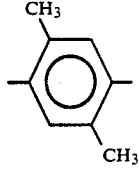CH3 / CH3 (dimethylphenyl) | 3-Br | 6-Br |
| B-61 | 2 | 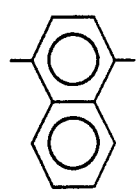 (naphthyl) | 3-Br | 6-Br |

An azo pigment represented by the general formual [I], [II], [III], [IV] or [V] may be prepared by an usual method.

For example, an amino compound represented by the general formula [A], [B], [C], [D] or [E]:

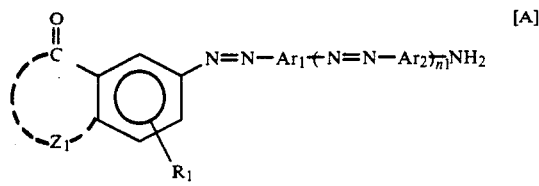 [A]

in which $Z_1$, $R_1$, $Ar_1$, $Ar_2$, n, are the same as described in the formula [I]:

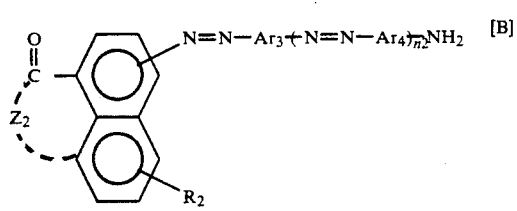 [B]

in which $Z_2$, $R_2$, $Ar_3$, $Ar_4$, n, are the same as described in the formula [II]:

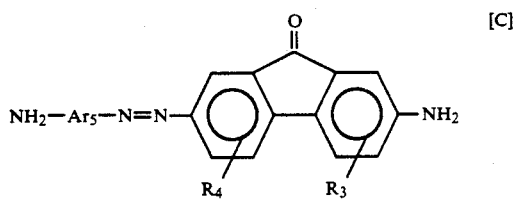 [C]

in which $R_3$, $R_4$ and $Ar_5$ are the same as described in the formula [III]:

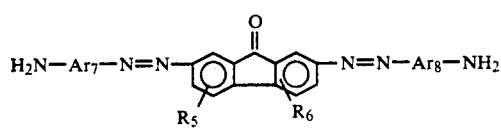 [D]

in which $R_5$, $R_6$, $Ar_7$ and $Ar_8$ are the same as described in the formula [IV];

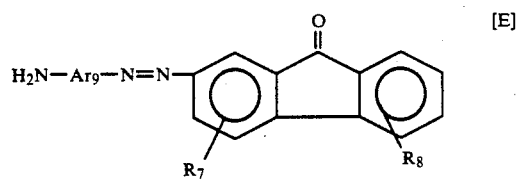 [E]

in which $R_7$, $R_8$, $Ar_9$ are the same as described in the formula [V], may be subjected to a diazotization reaction using sodium nitrite - hydrochloric acid in the existence of alkali for the reaction of the azo compound with an adequate coupler component represented by the general formulas [a]-[j]. In other method, after an amino compound is converted to an diazo compound, an acid, such as $HBF_4$ or the like is added to separate the salt thereof, followed by a coupling reaction. The coupling reaction is carried out in an adequate solvent, such as water and/or N,N-dimethylformamide or the like at the reaction temperature of 30°-25° C. or less for 1-10 hours according to a known method.

The amino compound represented by the general formulas [A]-[E] may be prepared according to a known method, for example, according to the reaction formulas shown below:

The amino compound represented by the general formula [A]

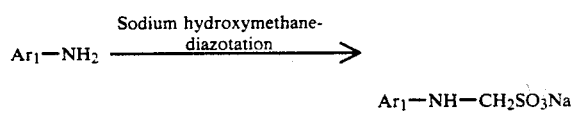

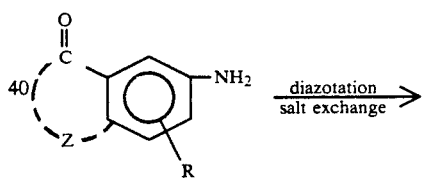

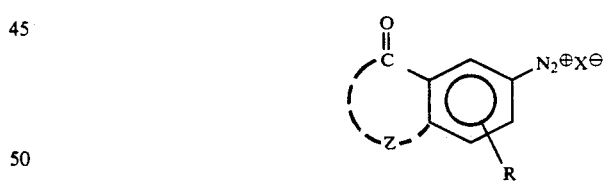

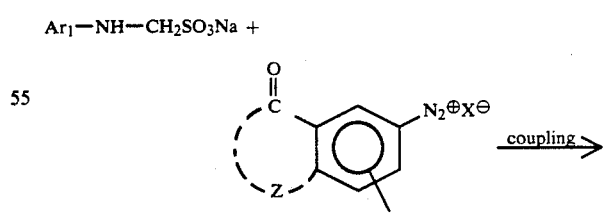

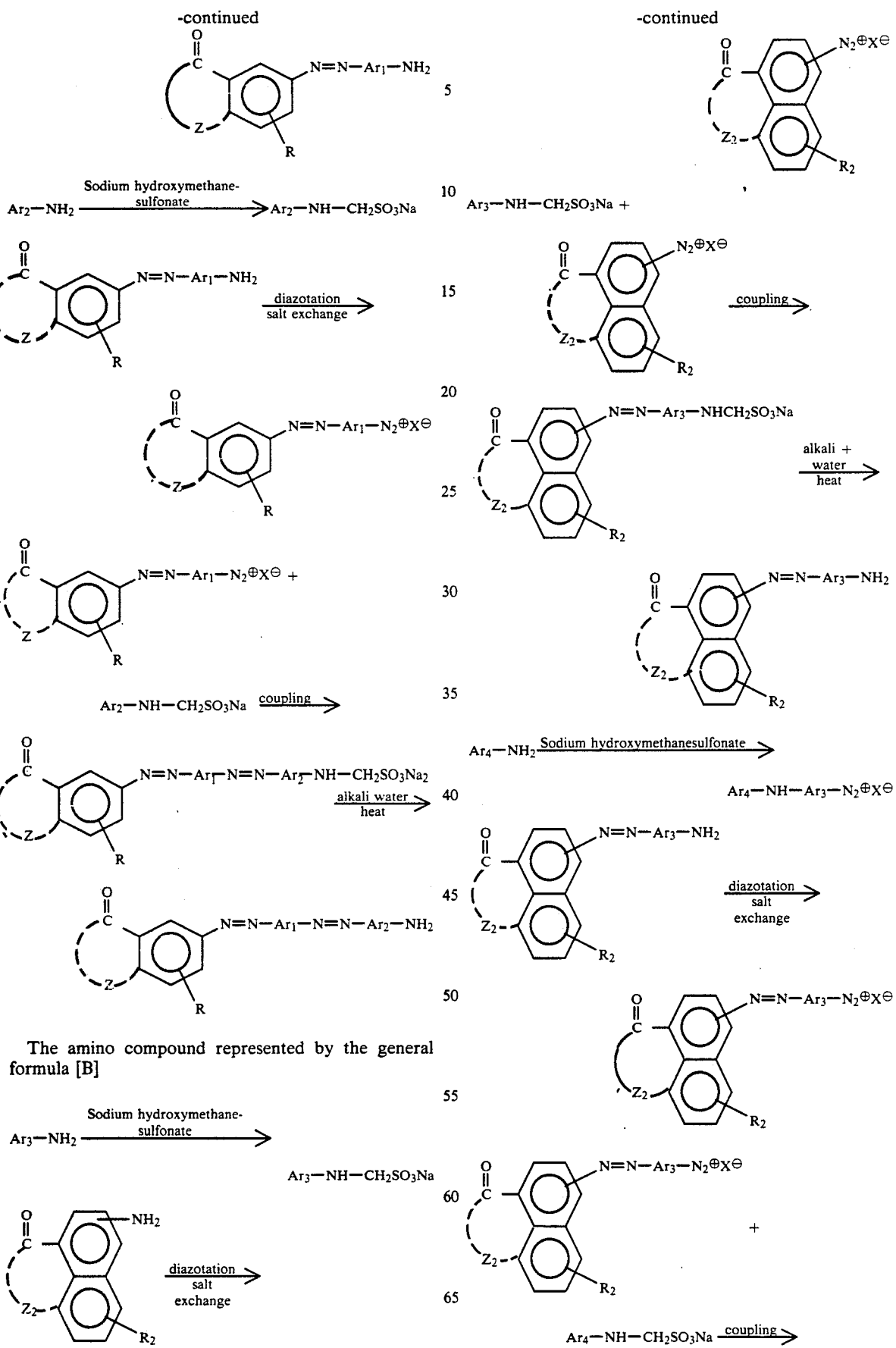

61
-continued
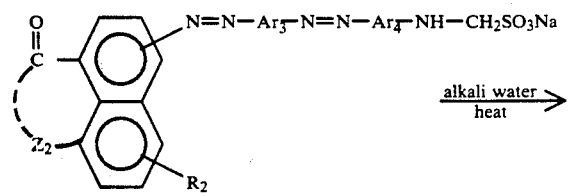
→ alkali water / heat → 5
62
-continued
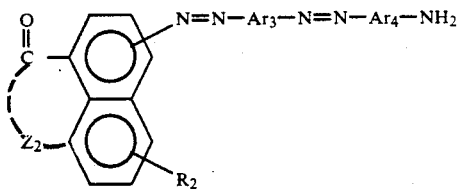
The amino compound represented by the general formula [D]
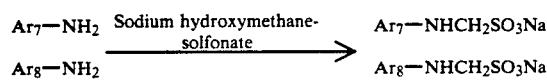
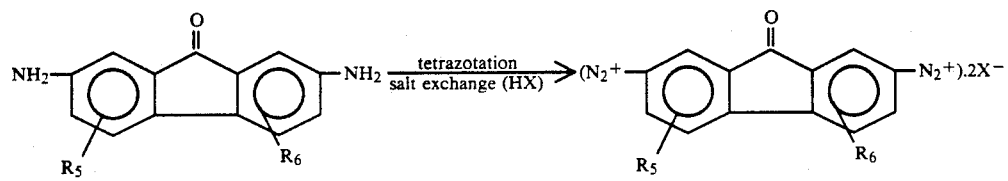
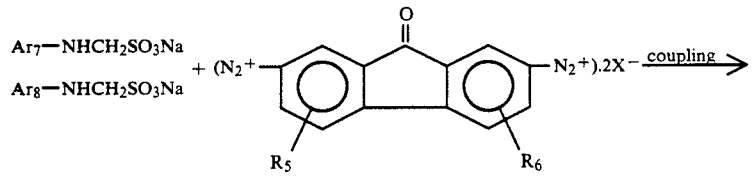
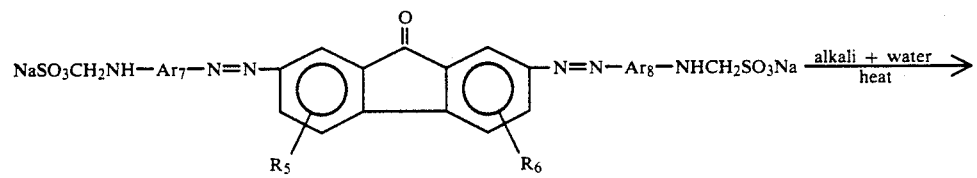
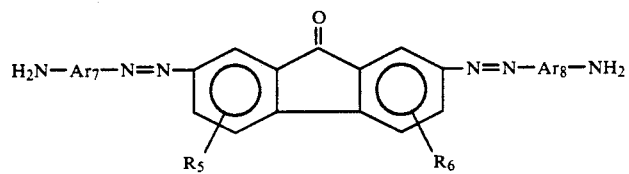
The amino compound represented by the general formula [E]
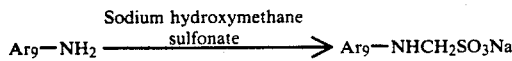
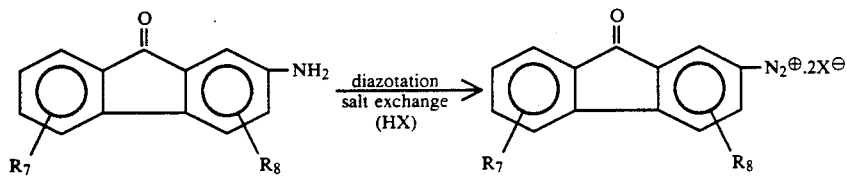
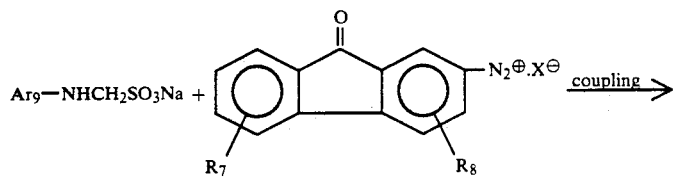

-continued

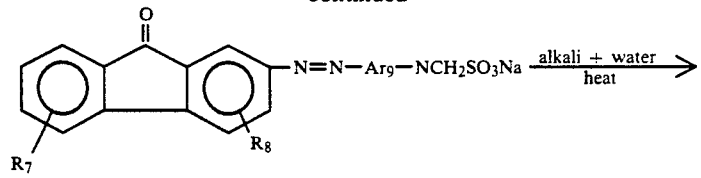

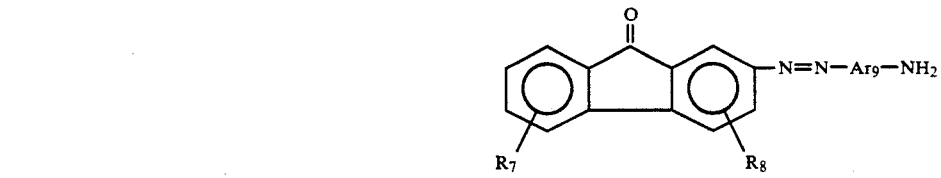

In the reaction formulas as above mentioned for the synthesis of azo compounds of the general formulas [A]-[E], the azo compounds are reacted with sodium hydroxymethane sulfonate in water to protect the amino-groups.

The diazotation of the amine compounds can be carried out smoothly under usual conditions, followed by salt-exchange with HX (for example, HBF$_4$ or the like). Then, the products are isolated.

The coupling reaction may be carried out by a known method.

Then, the resultant products are dissolved in an aqueous solution containing sodium hydroxide, potassium hydroxide, sodium carbonate or the like. The solution is boiled to remove the protective groups for the amino groups to obtain the azo-amino compound represented by the general formulas [A]-[E].

A photosensitive member of the present invention has a photosensitive layer comprising one or more kinds of azo compounds of the general formulas [I]-[III] which are prepared as aforementioned.

An azo pigment in a photosensitive member of the invention functions as a photoconductive materials and generates charges with very high efficiency by absorbing light, resulting in the improvement of sensitivity of a photosensitive member. The generated charges may be transported with an azo pigment as a medium, but more effectively with a charge transporting material as a medium.

In particular, the combination of the azo compounds represented by the general formula [III] or [IV] with the azo pigment represented by the general formula [V] may provide a panchromatic photosensitive member excellent in sensitivity, resistance to light-fatigue, resistance to repeating use and stability, because the azo pigment represented by the general formula [III] or [IV] is more sensitive in the relatively longer wave region and the azo pigment represented by the general formula [V] is more sensitive in the relatively shorter wave region.

An azo pigment represented by the general formula [III] or [IV] is mixed with the azo pigment represented by the general formula [V] at the weight ration ([III]/[V] or [IV]/[V]) of 1/5-5/1, preferably ⅓-3/1. If the ratio is smaller than 1/5, the spectral sensitivity shifts excessively to short wavelength as a whole. If the ratio is bigger that 5/1, the spectral sensitivity shifts excessively to long wavelength as a whole.

An electrically conductive substrate is exemplified by a sheet or a drum made of metal or alloy such as copper, aluminium, silver, iron, and nickel; a substrate such as a plastic film on which the foregoing metal or alloy is adhered by a vacuum-deposition method or an electroless plating method and the like; a substrate such as a plastic film and paper on which an electroconductive layer is formed by applying or depositing electroconductive polymer, indium oxide, tin oxide etc..

A photosensitive member, various types of which are known, may be any type in the invention.

Figure 2:
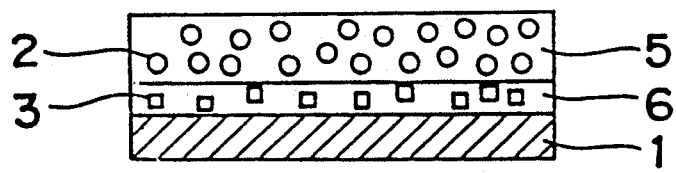
FIG. 2 is a diagram showing the structure of a photosensitive member of the function-divided type comprising a charge generating layer and a charge transporting layer which are formed on an electrically conductive substrate.
Figure 3:
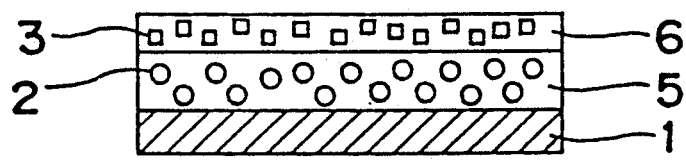
FIG. 3 is a diagram showing the structure of a member of another photosensitive member of the function-divided type comprising a charge generating layer and a charge transporting layer which are formed on an electrically conductive substrate.

For example, a photosensitive member of the invention may be a monolayer type as shown in FIG. 1 in which a photosensitive layer (4) is formed on an eletrically conductive substrate (1) by dispersion a photoconductive material (3) and a charge transporting material (2) in a binder resin; a laminated type as shown in FIG. 2 in which a photosensitive layer is a function divided type and formed by laminating a charge generating layer (6) containing the photoconductive material (3) on the electrically conductive substrate (1) and then laminating a charge transporting layer (5) containing the charge transporting material (2) is formed on the charge generating layer (6); a laminated type contrary to FIG. 2 as shown in FIG. 3 in which a photosensitive layer is a function divided type and formed by laminating the charge transporting layer (5) containing the charge transporting material (2) on the electrically conductive substrate (1) and then laminating the charge generating layer (6) containing the photoconductive material (3) on the charge transporting layer (5).

Figure 4:
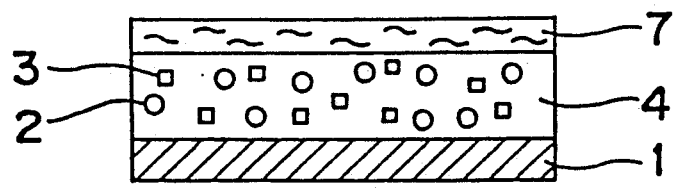
FIG. 4 is a diagram showing the structure of another dispersion-type photosensitive member comprising a photosensitive layer and a surface protective layer formed on an electrically conductive substrate.
Figure 5:
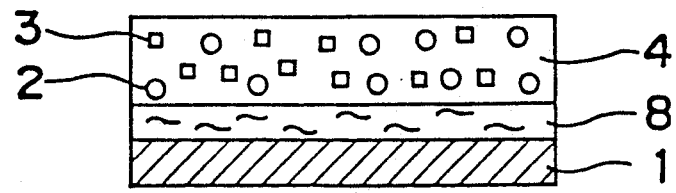
FIG. 5 is a diagram showing the structure of another dispersion-type photosensitive member comprising a photosensitive layer and an intermediate layer formed on an electrically conductive substrate.

A photosensitive layer may have a surface protective layer (7) on the photosensitive layer (4) as shown in FIG. 4, and an intermediated layer (8) between the electrically conductive substrate (1) and the photosensitive layer (4) as shown in FIG. 5. The formation of the intermediate layer as shown in FIG. 5 effects adhesivity and coatability between the electrically conductive substrate and the photosensitive layer, protection of the electrically conductive substrate, and improvement of charge injection from the electrically conductive substrate to the photoconductive layer. A photosensitive member of the foregoing laminated and function-divided type may have the above mentioned surface protective layer or intermediate layer.

First, a photosensitive member of monolayer type as shown in FIG. 1 is explained for its formation.

In order to form a photosensitive member of a monolayer type, fine particles of azo pigments of the present invention are dispersed in a resin solution or a solution containing a charge transporting compound and resin, which is sprayed on the electrically conductive substrate and dried. The thickness of the photosensitive layer is 3-30 μm, preferably 5-20 μm. The sensitivity is poor if the azo pigment is used in an insufficient quantity, whereas the chargeability is poor and the mechanical strength of photosensitive layer is inadequate if used to excess. Therefore, the amount of an azo pigment contained in the photosensitive layer is within the range of 0.01-2 parts by weight, preferably, 0.2-1.2 parts by weight on the basis of one part by weight of resin. If a charge transporting material such as polyvinylcarbazole, which is capable of being used as a binder itself, is used, an additional amount of an azo pigment is preferably 0.01-0.5 parts by weight on the basis of one part by weight of charge transporting materials.

And then, a photosensitive member of laminated type as shown in FIG. 2 is explained for its formation.

In order to form a photosensitive member of a laminated type, an azo pigment is deposited in a vacuum on an electrically conductive substrate, an azo pigment is dissolved in an amine-containing solvent to apply onto an electrically conductive substrate or an application solution containing a pigment and, if necessary, binder resin dissolved in an appropriate solvent is applied onto an electrically conductive substrate to be dried, for the formation of a charge generating layer on the electrically conductive substrate. Then, a solution containing a charge transporting material and a binder is applied onto the charge generating layer followed by drying for the formation of a charge transporting layer. The thickness of the azo pigment-containing layer as a charge generating layer is 4 μm or less, preferably, 2 μm or less. It is suitable that the charge-transporting layer has a thickness in the range 3-50 μm, preferably 5-30 μm, and proportion of charge transporting materials in the charge-transporting layer is 0.2-2 parts by weight, preferably 0.3-1.3 parts by weight on the basis of one part by weight of the binder. There is no need to use a binder when the charge-transporting material is of a high-polymer which is capable of serving as a binder itself.

Some examples of suitable binders for the production of a photosensitive member are thermoplastic resins such as saturated polyester, polyamide, acrylic, ethylene-vinyl acetate copolymer, ion cross-linked olefin copolymer (ionomer), styrene-butadiene block copolymer, polycarbonate, vinyl chloride-vinyl acetate copolymer, cellulose ester, polyimide, styrol, etc., and thermosetting resins such as, epoxy, urethane, silicone, phenolic, melamine, xylene, alkyl, thermosetting acrylic, etc., and photocuring resins, and photoconductive resins such as poly-N-vinyl carbazole, polyvinyl pyrene, polyvinyl anthracene, polyvinylpyrrole, etc., all named without any significance of restricting the use to them. Any of these resins can be used singly or in combination with other resins. It is desirable for any of these electrically insulative resins to have a volume resistance of $1 \times 10^{12}$ Ω.cm or more when measured singly.

A photosensitive member of the present invention permits, in combination with the binder, the use of a plasticizer, such as halogenated paraffin, polybiphenyl, chloride, dimethyl naphthalene, dibutyl phthalate or 0-terphenyl, the use of an electron-attaractive sensitizer, such as chloranyl, tetracyanoethylene, 2,4,7-trinitrofluorenone, 5,6-dicyanobenzoquinone, tetracyanoquinodimethane, tetrachlorphthalic anhydride, or 3,5-dinitrobenzoic acid, and the use of a sensitizer, such as methyl violet, rhodamine B, cyanine dye, pyrylium salt, and thiapyrylium salt.

Illustrative examples of charge transporting materials for use in a photosensitive member, if necessary, are hydrazone compounds, pyrazoline compounds, styryl compound, triphenylmethane compounds, oxadiazol compounds, carbazole compounds, stilbene compounds, enamine compounds, oxazole compounds, triphenylamine compounds, tetraphenylbenzidine, azine compounds and the like, including carbazole, N-ethylcarbazole, N-vinylcarbazole, N-phenylcarbazole, tethracene, chrysene, pyrene, perylene, 2-phenylnaphthalene, azapyrene, 2,3-benzochrysene, 3,4-benzopyrene, fluorene, 1,2-benzofluorene, 4-(2-fluorenylazo)resorcinol, 2-p-anisolaminofluorene, p-diethylaminoazobenzene, cadion, N,N-dimethyl-p-phenylazoaniline, p-(dimethylamino)stilbene, 1,4-bis(2-methylstyryl)benzene, 9-(4-diethylaminostyryl)anthracene, 2,5-bis(4-diethylaminophenyl)-1,3,5-oxadiazole, 1-phenyl-3-(p-diethylaminostyryl)-5-(p-diethylaminophenyl)-pylazoline, 1-phenyl-3-phenyl-5-pylazolone, 2-(m-naphtyl)-3-phenyloxazole, 2-(p-diethylaminostyryl)-6-diethylaminobenzoxazole, 2-(p-diethylaminostyryl)-6-diethylaminobenzothiazole, bis(4-diethylamino-2-methylphenyl)phenylmethane, 1,1-bis(4-N,N-diethylamino-2-ethylphenyl-heptane, N,N-dipehnylhydrazino-3-methylidene-10-ethylphenoxazine, N,N-diphenylhydrazino-3-methylidene-10-ethylphenothiazine, 1,1,2,2-tetrakis-(4-N,N-diethylamino-2-ethylphenyl)ethane, p-diethylaminobenzaldehyde-N,N-diphenylhydrazone, p-diphenylaminobenzaldehyde-N,N-diphenylhydrazone, N-ethylcarbazole-N-methyl-N-phenylhydrazone, p-diethylaminobenzaldehyde-N-α-naphtyl-N-phenylhydrazone, p-diethylaminobenzaldehyde-3-methylbenzothiazolinone-2-hydrazone, 2-methyl-4-N,N-diphenylamino-β-phenylstilbene, α-phenyl-4-N,N-diphenylaminostilbene, 1,1-bis(p-biethylaminophenyl)4,4-diphenyl-1,3-butadiene and the like. Any of these charge transporting materials can be used singly or in combination with other charge transporting materials.

Preferred charge transporting materials in the present invention are exemplified below:

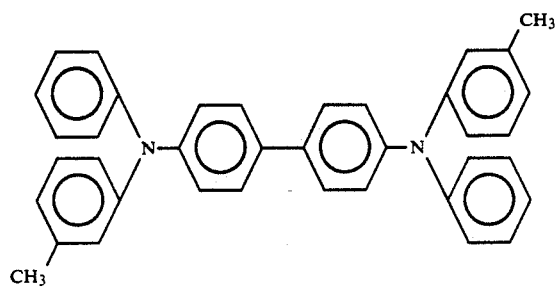

(C-1)

-continued
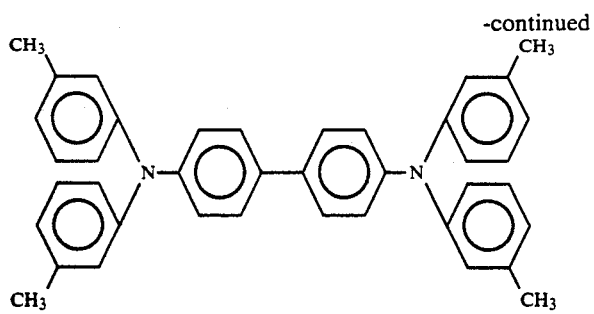 (C-2)
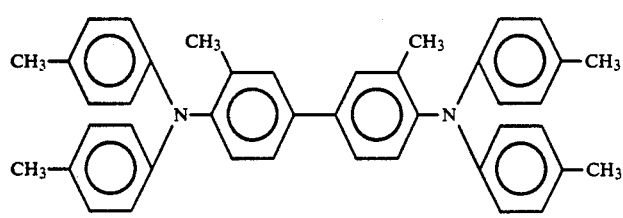 (C-3)
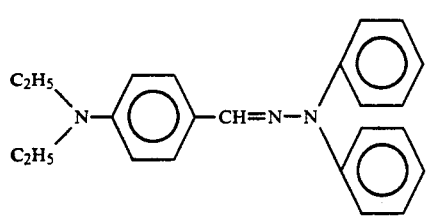 (C-4)
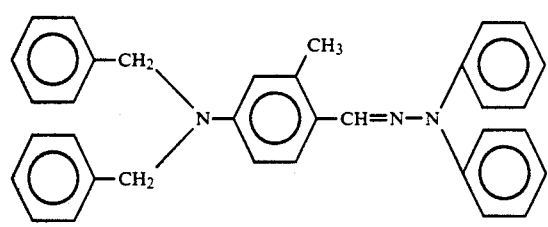 (C-5)
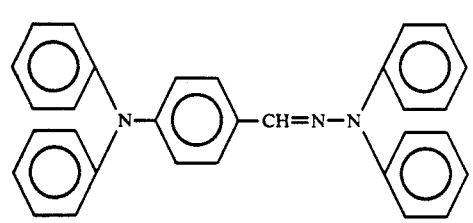 (C-6)
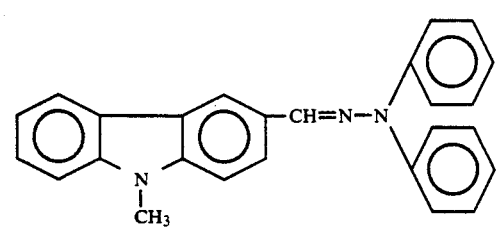 (C-7)
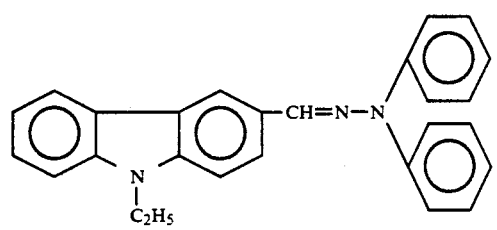 (C-8)

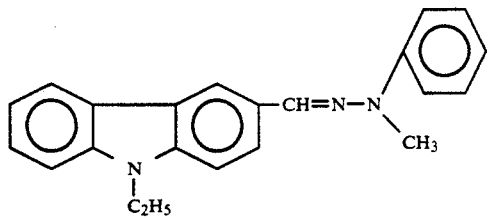 (C-9)
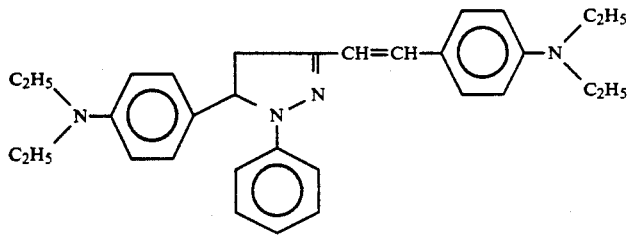 (C-10)
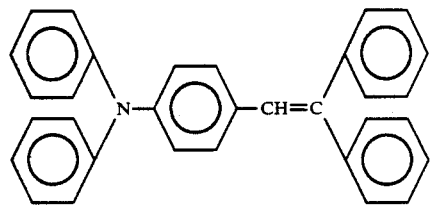 (C-11)
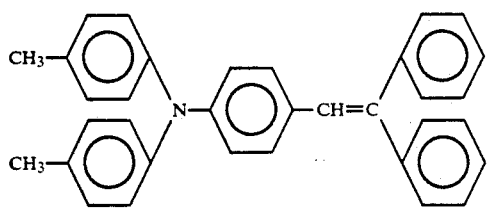 (C-12)
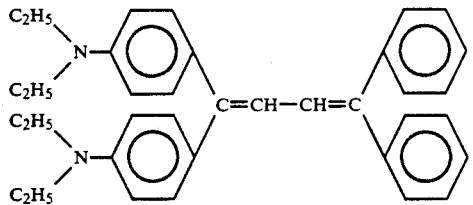 (C-13)
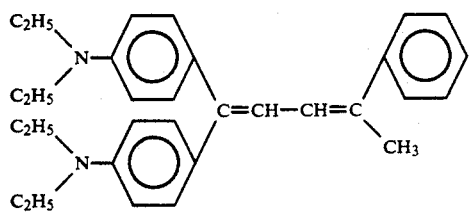 (C-14)
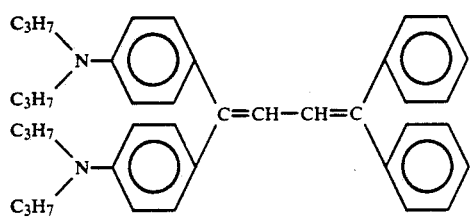 (C-15)

-continued

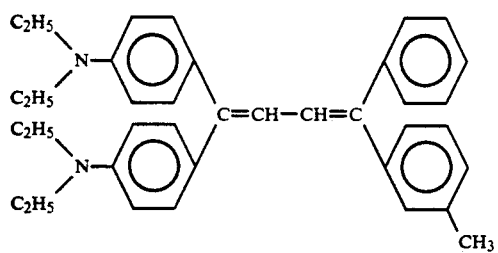 (C-16)

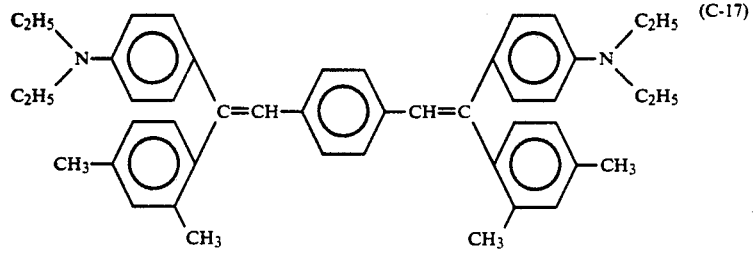 (C-17)

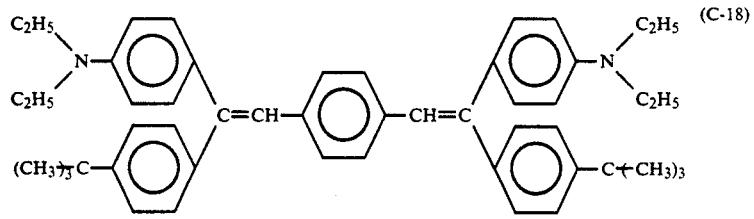 (C-18)

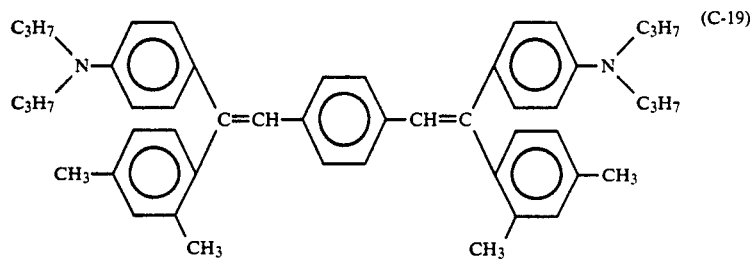 (C-19)

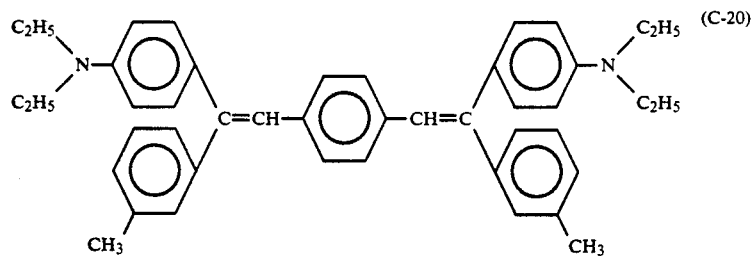 (C-20)

A surface protective layer as shown in FIG. 4 may be formed with polymer itself such as acrylic resin, polyaryl resin, polycarbonate resin and urethane resin, or formed by dispersing a material with low electroconductive material such as tin oxide, indium oxide. Organic plasma polymerized layer can be also applied and it may contain oxygen nitrogen, halogen, atoms of Group III or V in the Periodic Table if necessary. The thickness of a surface protective layer is desirable 5 μm or less.

An intermediate layer as shown in FIG. 5 may be formed with polymer itself, such as polyimide, polyamide, nitorcellulose, polyvinyl butyral, polyvinyl alcohol, or formed by dispersing a material with low electroconductive material, such as tin oxide, indium oxide or the like, or by depositing aluminium oxide, zinc oxide, silicon oxide, or the like. It is preferable that the thickness of the intermediate layer is 1 μm or less.

SYNTHETIC EXAMPLE 1

In this Synthetic Example, one of the amino pigments represented by the general formula [I] is synthesized by reacting the compound represented by the chemical formula (i):

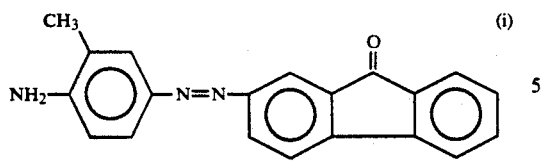

as an azo-amino compound of the formula [A] with the coupler component of the chemical formula [1].

The other amino pigments represented by the general formula [I] can be prepared similarly as described below:

The azo amino compound represented by the chemical formula (i) of 3.1 g (0.01 mole) was dispersed in 18N hydrocholic acid (200 ml). The dispersion was stirred and cooled to 5 ° C., followed by the addition of an aqueous solution of sodium nitrite (1.4 g) in water (20 ml). Further, the mixture was stirred under cooled conditions for 1 hour to produce diazo compounds. The solution containing the diazo compounds was diluted with water to dissolve the diazo compounds, and filtered. Fluoboric acid (30 g) was added to the filtrate to grow crystals. The obtained crystals were filtered to give diazonium tetrafluoroborate.

Then, the resultant diazonium salt (4.1 g, 0.01 mole) and the coupling agent (3.1 g, 0.24 mole) represented by the chemical formula [1] were dissolved in dimethyl sulfoxide (400 ml), to which a solution of sodium acetate (5 g) dissolved in water (30 ml) was dropped at room temperature for about 30 minutes. After addition, the solution was further stirred at room temperature for 3 hours, followed by filtration of deposited crystals.

The obtained crude crystals were dispersed in deionized water (1 liter), and the solution was stirred at room temperature for 3 hours, followed by filtrating the crystals. The obtained crystals were further dispersed in DMF (1 liter), and the solution was stirred at room temperature for 3 hours, followed by filtrating the crystals. The obtained crystals were washed with DMF two more times, washed with water and dried. The crystals were further dried under depressurized conditions at 80° C. for 1 hour to obtain azo pigment of 4.0 g (yield 68.1%).

The resultant azo pigment was violet-red crystals.

The azo pigment was subjected to elemental analysis to compare the found values (%) with the calculated values (%) of each element. The result is shown in Table 1.

TABLE 1

| element | (elemental analysis) | | |
|---|---|---|---|
| | C | H | N |
| found (%) | 75.51 | 4.23 | 11.85 |
| calcd* (%) | 76.64 | 4.26 | 11.93 |

*$C_{35}H_{25}O_3$

SYNTHETIC EXAMPLE 2

In this Example, the amino pigment represented by the general formula [II] in which

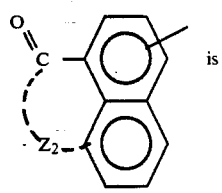

is

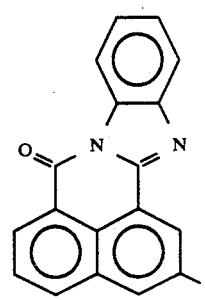

$Ar_3$ is phenylene,
$n_2$ is zero and
$Cp_2$ is the coupler component of the chemical formula [1]

is synthesized.

The other amino pigments represented by the general formula [II] can be prepared similarly as described below:

The azo amino compound represented by the chemical formula (ii);

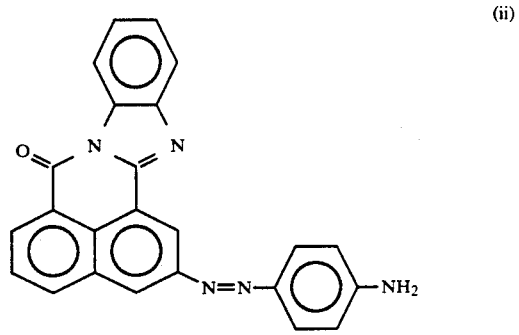

of 3.89 g (0.01 mole) was dispersed in 18N hydrocholic acid (200 ml). The dispersion was stirred and cooled to 5° C., followed by the addition of an aqueous solution of sodium nitrite (1.4 g) in water (20 ml). Further, the mixture was stirred under cooled conditions for 1 hour to produce diazo compounds. The solution containing the diazo compounds was diluted with water to dissolve the diazo compounds, and filtered. Fluoboric acid (30 g) was added to the filtrate to grown crystals. The obtained crystals were filtered to give diazonium tetrafluoroborate.

Then, the resultant diazonium salt (4.88 g, 0.01 mole) and the coupling agent (3.49 g) represented by the chemical formula [1] were dissolved in dimethyl sulfoxide (400 ml), to which a solution of sodium acetate (5 g) dissolved in water (20 ml) was dropped at room temperature for about 30 minutes. After addition, the solution was further stirred at room temperature for 3 hours, followed by filtration of deposited crystals.

The obtained crude crystals were dispersed in deionized water (1 liter), and the solution was stirred at room temperature for 3 hours, followed by filtrating the crystals. The obtained crystals were further dispersed in DMF (1 liter), and the solution was stirred at room temperature for 3 hours, followed by filtrating the crystals. The obtained crystals were washed with DMF two more times, washed with water and dried, to obtain azo pigment of 4.8 g (yield 72.4%).

The resultant azo pigment was brown-red crystals.

The azo pigment was subjected to elemental analysis to compare the found values (%) with the calculated values (%) of each element. The result is shown in Table 2.

TABLE 2

| element | (elemental analysis) | | |
|---|---|---|---|
| | C | H | N |
| found (%) | 74.04 | 3.07 | 14.69 |
| calcd* (%) | 74.21 | 3.77 | 14.78 |

*$C_{35}25O_3$

SYNTHETIC EXAMPLE 3

In this synthetic example, the diamine compound represented by the chemical formula (iii) below is reacted with the coupler component represented by the chemical formula [1] to synthesize one of the azo pigments represented the general formula [III].

The other amino pigments represented by the general formula [III] can be prepared similarly as described below.

The diamine compound of the chemical formula (iii) below;

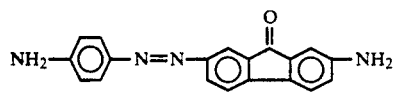

of 3.1 g (0.01 mole) and the coupler agent of the chemical formula [1] of 6.1 g were dissolved in N-methylpyrrolidone of 300 ml. A solution of sodium acetate of 5 g in water of 100 ml was dropped to the above obtained solution for about 30 minutes at 10°–20° C. After addition, the solution was further stirred at room temperature for 3 hours, followed by filtration of deposited crystals.

The obtained crystals were dispersed in DMF of 1 liter and stirred at room temperature for 3 hours, followed by filtrating the crystals. The above process was repeated two more times. Then, the crystals were washed with water and dried to obtain azo pigments of 7.0 g (yield: 82.4%).

The resultant azo pigment was violet-red crystals.

The azo pigment was subjected to elemental analysis to compare the found values (%) with the calculated values (%) of each element. The result is shown Table 3.

TABLE 3

| element | (elemental analysis) | | |
|---|---|---|---|
| | C | H | N |
| found (%) | 73.65 | 3.88 | 12.84 |
| calcd (%) | 73.78 | 3.94 | 12.99 |

SYNTHETIC EXAMPLE 4

In this synthetic example, the azo pigment represented by the chemical formula [A-53] is synthesized, which is one of the azo pigments represented by the general formula [IV].

2-hydroxy-3-naphthanilide (Naphthol AS) of 2.6 parts by weight and the tetrafluoroborate of the diamine represented by the chemical formula (iv) below:

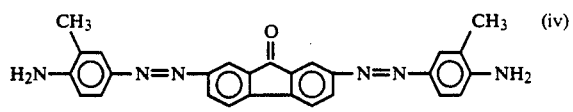

of 3.0 parts by weight were dissolved in dimethylformamide (DMF) of 200 ml. A solution of sodium acetate of 3 g in water of 50 ml was dropped to the above obtained solution for about 30 minutes at 10°–20° C. After addition, the solution was further stirred at room temperature for 3 hours, followed by filtration of deposited crystals.

The obtained cakes of crude crystals were dispersed in DMF of 400 ml and stirred at room temperature for 3 hours, followed by filtrating the crystals. The above process was repeated two more times. Then, the crystals were washed with water and dried to obtain azo pigments of 3.0 parts by weight.

The resultant azo pigment was violet-blue crystals and did not decompose at 300° C. or less.

The azo pigment was subjected to elemental analysis and infrared spectrum to for the identification thereof with the objected azo compound ($C_{61}H_{42}O_5N_{10}$) The result of elemental analysis is shown in Table 4.

TABLE 4

| element | (elemental analysis) | | |
|---|---|---|---|
| | C | H | N |
| found (%) | 73.64 | 4.23 | 8.05 |
| calcd (%) | 73.12 | 4.15 | 8.10 |

SYNTHETIC EXAMPLE 5

In this synthetic example, the azo pigment represented by the chemical formula [B-20] is synthesized, which is one of the azo pigments represented by the general formula [V].

2-hydroxy-3-(2-chlorocarboxyalinide)-naphthalene (chemical formula [2]) of 3.0 parts by weight and the tetrafluoroborate of the diamine represented by the chemical formula (v) below:

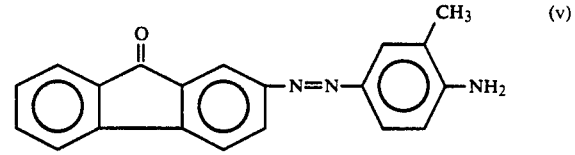

of 4.1 parts by weight were dissolved in dimethyl sulfoxide of 400 ml. A solution of sodium acetate of 1.5 g in water of 30 ml was dropped to the above obtained solution for about 30 minutes at 20°–30° C. After addition, the solution was further stirred at room temperature for 3 hours, followed by filtration of deposited crystals.

The obtained cakes of crystals were dispersed in DMF of 400 ml and stirred at room temperature for 3 hours, followed by filtrating the crystals. The above process was repeated two more times. Then, the crystals were washed with water and dried to obtain azo pigments of 4.8 parts by weight (yield: 77.9%).

The resultant azo pigment was violet-red crystals and did not decompose at 300° C. or less.

The azo pigment was subjected to elemental analysis and infrared spectrum for the identification thereof it with the objected azo compound (C$_{37}$H$_{24}$O$_3$N$_2$Cl). The result of elemental analysis is shown in Table 5.

TABLE 5

| element | (elemental analysis) | | |
|---|---|---|---|
| | C | H | N |
| found (%) | 71.50 | 3.82 | 11.22 |
| calcd (%) | 71.44 | 3.86 | 11.26 |

SYNTHETIC EXAMPLE 6

In this synthetic example, the azo pigment represented by the chemical formula [A-3] is synthesized, which is one of the azo pigments represented by the general formula [III].

2-hydroxy-3-naphthanilide (Naphthol AS) of 2.7 parts by weight and the tetrafluoroborate represented by the chemical formula (vi) below:

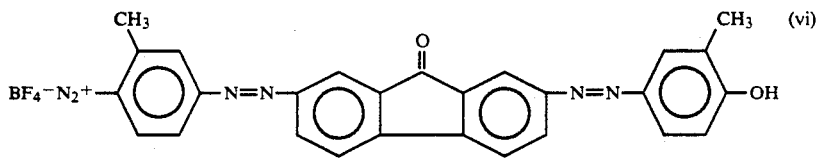

of 3.5 parts by weight were dissolved in dimethylformamide (DMF) of 200 ml. A solution of sodium acetate of 3 g in water of 50 ml was dropped to the above obtained solution for about 30 minutes at 10°-20° C. After addition, the solution was further stirred at room temperature for 3 hours, followed by filtration of deposited crystals.

The obtained cakes of crude crystals were dispersed in DMF of 400 ml and stirred at room temperature for 3 hours, followed by filtrating the crystals. The above process was repeated two more times. Then, the crystals were washed with water and dried to obtain azo pigments of 6.2 parts by weight.

The resultant azo pigment was violet crystals and did not decompose at 300° C. or less.

The azo pigment was subjected to elemental analysis and infrared spectrum for the identification thereof with the objected azo compound (C$_{44}$H$_{31}$O$_4$N$_7$) The result of elemental analysis is shown in Table 6.

TABLE 6

| element | (elemental analysis) | | |
|---|---|---|---|
| | C | H | N |
| found (%) | 73.31 | 4.25 | 13.63 |
| calcd (%) | 73.23 | 4.30 | 13.59 |

SYNTHETIC EXAMPLE 7

In this synthetic example, the azo pigment represented by the chemical formula [B-20] is synthesized, which is one of the azo pigments represented by the general formula [V].

2-hydroxy-3-(2-chlorocarboxyalinide)-naphthalene (chemical formula [2]) of 3.0 parts by weight and the tetrafluoroborate represented by the chemical formula (vii) below:

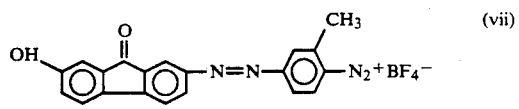

of 4.1 parts by weight were dissolved in dimethyl sulfoxide of 400 ml. A solution of sodium acetate of 1.5 g in water of 30 ml was dropped to the above obtained solution for about 30 minutes at 20°-30° C. After addition, the solution was further stirred at room temperature for 3 hours, followed by filtration of deposited crystals.

The obtained cakes of crude crystals were dispersed in DMF of 400 ml and stirred at room temperature for 3 hours, followed by filtrating the crystals. The above process was repeated two more times. Then, the crystals were washed with water and dried to obtain azo pigments of 4.8 parts by weight (yield: 77.9%).

The resultant azo pigment was violet-red crystals and did not decompose at 300° C. or less.

The azo pigment was subjected to elemental analysis and infrared spectrum for the identification thereof with the objected azo compound (C$_{37}$H$_{24}$O$_4$N$_5$Cl). The result of elemental analysis is shown in Table 7.

TABLE 7

| element | (elemental analysis) | | |
|---|---|---|---|
| | C | H | N |
| found (%) | 69.81 | 3.72 | 10.94 |
| calcd (%) | 69.65 | 3.76 | 10.98 |

EXAMPLE 1

The azo compound represented by the general formula [I] in which Ar$_1$, Ar$_2$, R$_1$, Cp$_1$ and

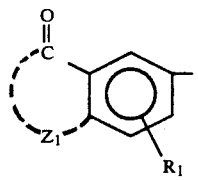

are shown in Table 8 was used in this example. The coupler components Cp$_1$ are indicated by the numbers of chemical formulas [1]-[80] as above described in Table 8.

The azo compound of 0.45 parts by weight, 0.45 parts by weight of polyester resin (Vylon 200 made by Toyobo K.K.) and 50 parts by weight of cyclohexanone were taken in Sand grinder for dispersion. The dispersion solution of the bisazo pigment was dispersed onto aluminotype-Mylar of 100 μm in thickness by a film applicator to form a charge generating layer so that a thickness of the dried layer would be 0.3 g/m$^2$.

A solution of 70 parts by weight of p-diphenylaminobenzaldehyde-N,N-diphenylhydrazone and 70 parts by weight of polycarbonate resin (K-1300;

made by Teijin Kasei K.K.) dissolved in 400 parts by weight of 1,4-dioxane was dispersed onto the above formed charge generating layer to form a charge transporting layer so that the thickness of the dried layer would be 16 μm.

Thus, a function-divided photosensitive member with the photosensitive layer which was composed of the charge generating layer and the charge transporting layer was prepared.

EXAMPLES 2-10

A function divided photosensitive member with a photosensitive layer which was composed of a charge generating layer and a charge transporting layer was prepared in a manner similar to Example 1, except that the azo compounds shown in Table 8 were used.

EXAMPLE 11-20

A function divided photosensitive member with a photosensitive layer which was composed of a charge generating layer and a charge transporting layer was prepared in a manner similar to Example 1, except that the azo compound shown in Table 8 was contained in the charge generating layer and 1,1-bis(p-diethylaminophenyl)-4,4-diphenyl-1,3-butadiene was used as a charge transporting material.

EXAMPLES 21-30

A function divided photosensitive member with a photosensitive layer which was composed of a charge generating layer and a charge transporting layer was prepared in a manner similar to Example 1, except that the azo compound shown in Table 8 was contained in the charge generating layer and N-ethylcarbazole-3-aldehyde-N-methyl-N-phenyl-hydrazone was used as a charge transporting material.

EXAMPLES 31-40

A function divided photosensitive member with a photosensitive layer which was composed of a charge generating layer and a charge transporting layer was prepared in a manner similar to Example 1, except that the azo compound shown in Table 8 was contained in the charge generating layer and p-diethylaminobenzaldehyde-N,N-diphenyl-hydrazone was used as a charge transporting material.

EXAMPLE 41-50

A function divided photosensitive member with a photosensitive layer which was composed of a charge generating layer and a charge transporting layer was prepared in a manner similar to Example 1, except that the azo compound shown in Table 8 was contained in the charge generating layer and 2-methyl-4-N,N-diethylamino-β-phenylstilbene was used as a charge transporting material.

EXAMPLES 51-60

A function divided photosensitive member with a photosensitive layer which was composed of a charge generating layer and a charge transporting layer was prepared in a manner similar to Example 1, except that the azo compound shown in Table 8 was contained in the charge generating layer and α-phenyl-4-N,N-diphenyl-aminostilbene was used as a charge transporting material.

EXAMPLES 61-70

A function divided photosensitive member with a photosensitive layer which was composed of a charge generating layer and a charge transporting layer was prepared in a manner similar to Example 1, except that the azo compound shown in Table 8 was contained in the charge generating layer and 1-pyrenecarbaldehyde-N,N-diphenylhydrazone was used as a charge transporting material.

EXAMPLES 71-80

A function divided photosensitive member with a photosensitive layer which was composed of a charge generating layer and a charge transporting layer was prepared in a manner similar to Example 1, except that the azo compound shown in Table 8 was contained in the charge generating layer and 1,1-bis(p-diethylaminophenyl)-4-methyl-4-phenyl-1,3-butadiene was used as a charge transporting material.

TABLE 8

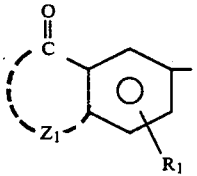

| | $R_1$ | $R_1$ | $Ar_1$ | $Ar_2$ | $Cp_1$ |
|---|---|---|---|---|---|
| Ex. 1 |  | H | 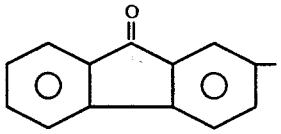 | | 2 |
| Ex. 2 |  | H | 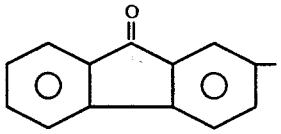 | 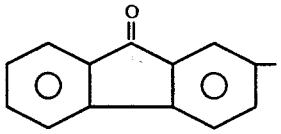 | 5 |

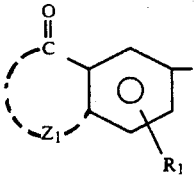

TABLE 8-continued
| | | $R_1$ | $Ar_1$ | $Ar_2$ | $Cp_1$ |
|---|---|---|---|---|---|
| Ex. 13 | 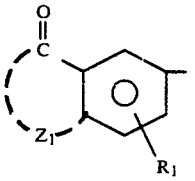 | 7-OH | 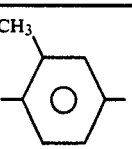CH$_3$ | | 5 |
| Ex. 14 | 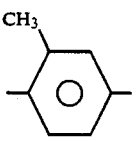 | 7-OH | CH$_3$ | CH$_3$ | 10 |
| Ex. 15 | 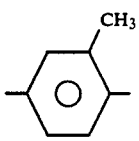 | 7-OH | OCH$_3$ | | 26 |
| Ex. 16 | 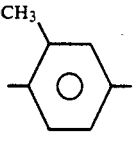 | 7-OH | OCH$_3$ | | 31 |
| Ex. 17 | 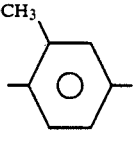 | 7-OH | CH$_3$ | | 32 |
| Ex. 18 | 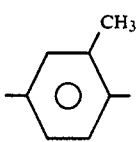 | 7-OH | CH$_3$ / CH$_3$ | | 5 |
| Ex. 19 | 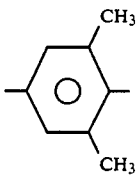 | 3-Cl | | | 10 |
| Ex. 20 | 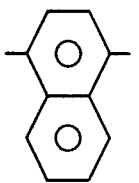 | 3-Cl | 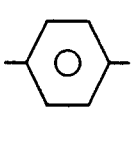 | | 31 |
| Ex. 21 | 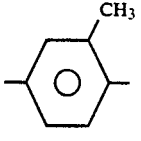 | 3-Br | CH$_3$ | | 37 |

TABLE 8-continued
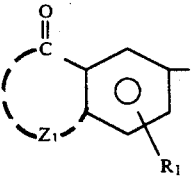
| | R₁ | Ar₁ | Ar₂ | Cp₁ |
|---|---|---|---|---|
| Ex. 22 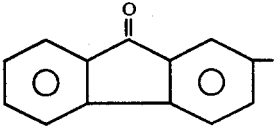 | 3-Br | 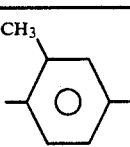 | | 5 |
| Ex. 23 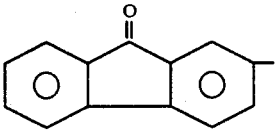 | 6-Br | 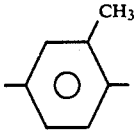 | 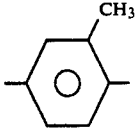 | 10 |
| Ex. 24 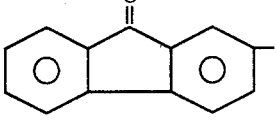 | 6-Cl | 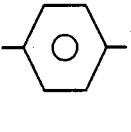 | 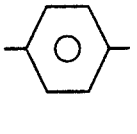 | 26 |
| Ex. 25 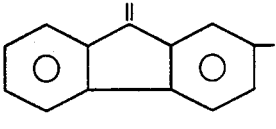 | 7-OCH₃ | 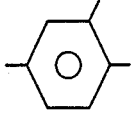 | | 28 |
| Ex. 26 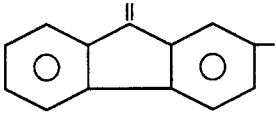 | 7-OCH₃ | 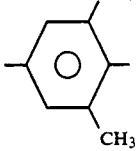 | 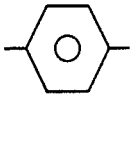 | 31 |
| Ex. 27 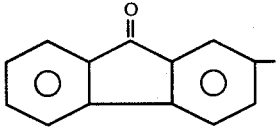 | 7-CH₃ | 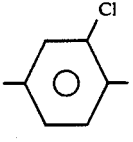 | 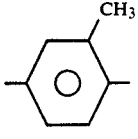 | 2 |
| Ex. 28 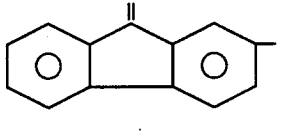 | 7-CH₃ | 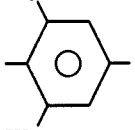 | | 3 |
| Ex. 29 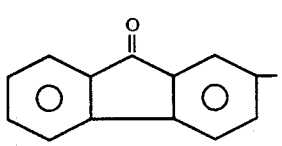 | 7-NO₂ | 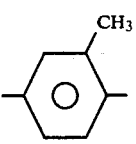 | | 5 |
| Ex. 30 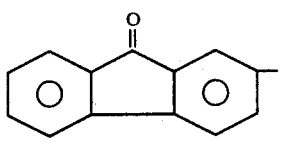 | 7-NO₂ | 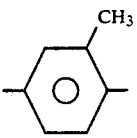 | | 32 |

TABLE 8-continued
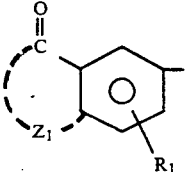
| | | $R_1$ | $Ar_1$ | $Ar_2$ | $Cp_1$ |
|---|---|---|---|---|---|
| Ex. 31 | 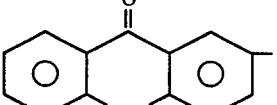 | H |  | | 2 |
| Ex. 32 | 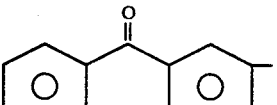 | 7-$NO_2$ | 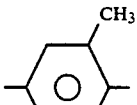 | | 5 |
| Ex. 33 | 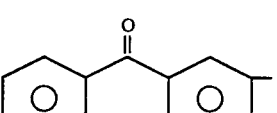 | H | 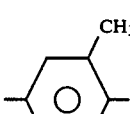 | 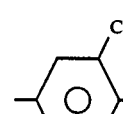 | 10 |
| Ex. 34 | 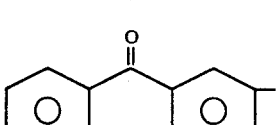 | H | 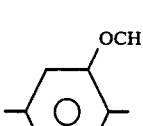 | 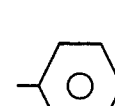 | 26 |
| Ex. 35 | 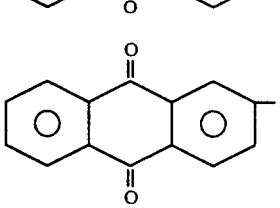 | H |  | | 10 |
| Ex. 36 | 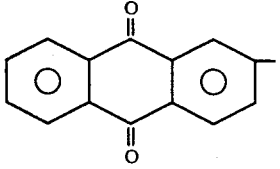 | H | 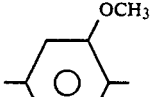 | | 26 |
| Ex. 37 |  | 3-OH | 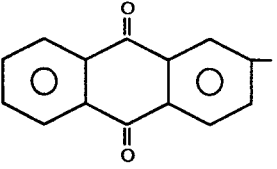 | | 31 |
| Ex. 38 | 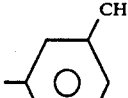 | 7-OH |  | 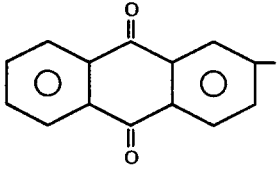 | 32 |
| Ex. 39 | 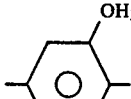 | H | 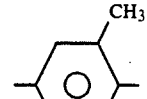 | | 31 |

TABLE 8-continued
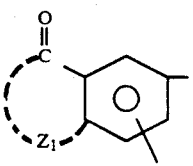
| | | $R_1$ | $Ar_1$ | $Ar_2$ | $Cp_1$ |
|---|---|---|---|---|---|
| Ex. 40 |  | 7-Cl | phenyl | 2-CH$_3$-phenyl | 32 |
| Ex. 41 | 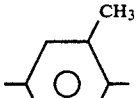 | 7-OH | 2-CH$_3$-phenyl | 2-CH$_3$-phenyl | 2 |
| Ex. 42 | 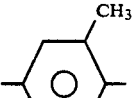 | 7-NO$_2$ | phenyl | phenyl | 5 |
| Ex. 43 | 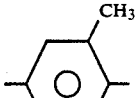 | H | phenyl | | 5 |
| Ex. 44 |  | 4-Cl | 2-CH$_3$-phenyl | | 10 |
| Ex. 45 |  | 7-OH | 2-CH$_3$-phenyl | | 31 |
| Ex. 46 |  | 3.6-Br | 2-CH$_3$-phenyl | | 26 |
| Ex. 47 | 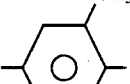 | H | phenyl | phenyl | 2 |

TABLE 8-continued

| | | $R_1$ | $Ar_1$ | $Ar_2$ | $C_{P1}$ |
|---|---|---|---|---|---|
| Ex. 48 | anthracenone with =NH | H | tolyl (CH₃) | | 32 |
| Ex. 49 | anthracenone with =NH | H | ethylphenyl (C₂H₅) | | 2 |
| Ex. 50 | anthracenone with =N-CH₃ | H | naphthyl | | 5 |
| Ex. 51 | anthracenone with =N-CH₃ | H | ethylphenyl (C₂H₅) | | 31 |
| Ex. 52 | anthracenone with =N-CH₃ | H | methoxyphenyl (OCH₃) | | 10 |
| Ex. 53 | phenanthrenone | H | tolyl (CH₃) | | 26 |
| Ex. 54 | phenanthrenone | H | tolyl (CH₃) | | 31 |

TABLE 8-continued
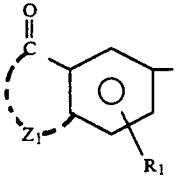
| | | $R_1$ | $Ar_1$ | $Ar_2$ | $Cp_1$ |
|---|---|---|---|---|---|
| Ex. 55 | 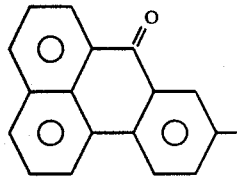 | 7-OH | 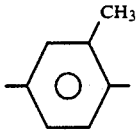 CH$_3$ | 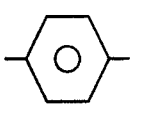 | 5 |
| Ex. 56 | 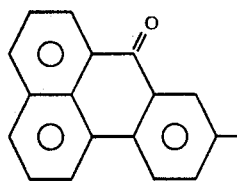 | 7-OH | 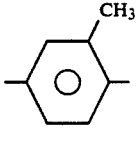 CH$_3$ | 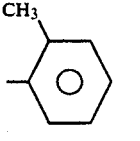 CH$_3$ | 32 |
| Ex. 57 | 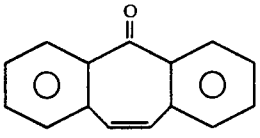 | H | 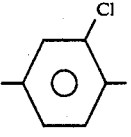 Cl | | 26 |
| Ex. 58 | 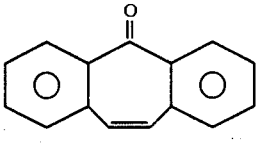 | H | 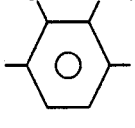 CH$_3$ CH$_3$ | | 28 |
| Ex. 59 | 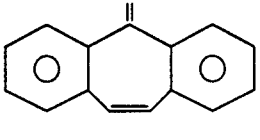 | 7-NO$_2$ | 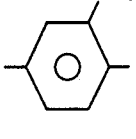 CH$_3$ | 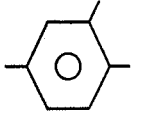 CH$_3$ | 2 |
| Ex. 60 | 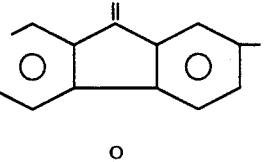 | H | 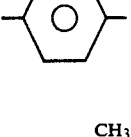 | | 3 |
| Ex. 61 | 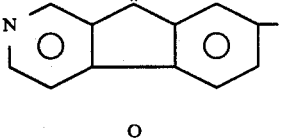 | H | 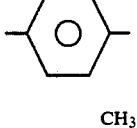 CH$_3$ | | 5 |
| Ex. 62 | 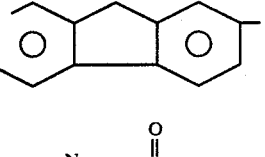 | H | 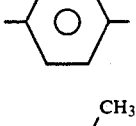 CH$_3$ | 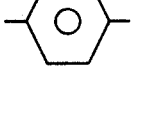 CH$_3$ | 31 |
| Ex. 63 | 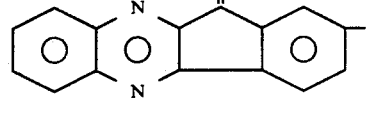 | H | 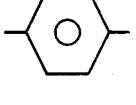 CH$_3$ | | 2 |

TABLE 8-continued
| | | R₁ | Ar₁ | Ar₂ | Cp₁ |
|---|---|---|---|---|---|
| Ex. 64 | 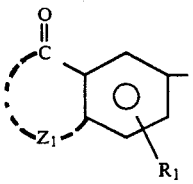 | H | 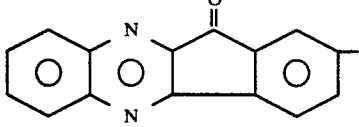 (CH₃) | | 17 |
| Ex. 65 | 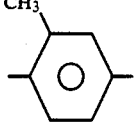 | H | 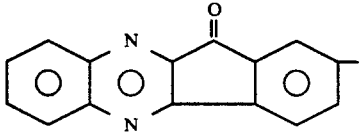 | | 32 |
| Ex. 66 | 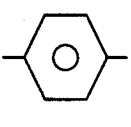 | H | 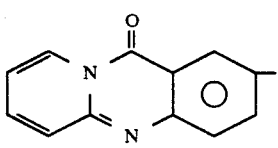 (CH₃) | | 1 |
| Ex. 67 | 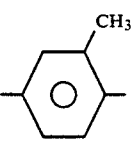 | H | 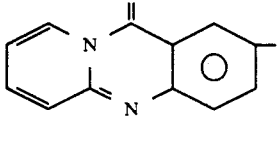 (OCH₃) | | 5 |
| Ex. 68 | 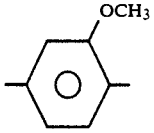 | H | 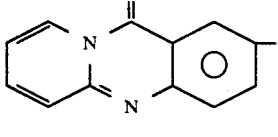 (CH₃) | 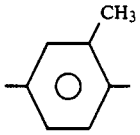 (CH₃) | 8 |
| Ex. 69 | 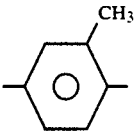 | H | 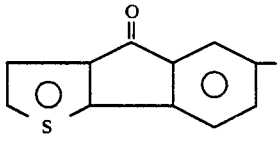 (CH₃) | | 13 |
| Ex. 70 | 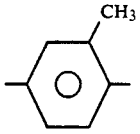 | H | 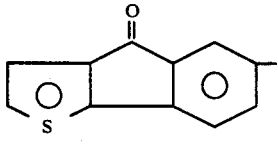 (CH₃) | | 10 |
| Ex. 71 | 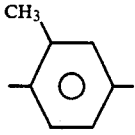 | H | 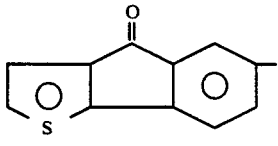 (CH₃, CH₃) | | 2 |
| Ex. 72 | 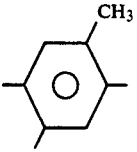 | H | 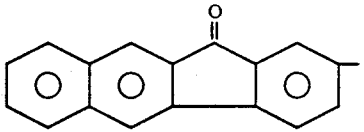 | | 5 |

TABLE 8-continued

| | | $R_1$ | $Ar_1$ | $Ar_2$ | $Cp_1$ |
|---|---|---|---|---|---|
| Ex. 73 | (anthracenone) | H | (phenyl) | (phenyl) | 10 |
| Ex. 74 | (anthracenone) | H | $CH_3$-phenyl | | 31 |
| Ex. 75 | (indenone) | H | (phenyl) | (phenyl) | 2 |
| Ex. 76 | (indenone) | H | $CH_3$-phenyl | | 5 |
| Ex. 77 | (indenone) | H | $CH_3$-phenyl | $CH_3$-phenyl | 31 |
| Ex. 78 | (naphthoquinone) | H | (phenyl) | (phenyl) | 2 |
| Ex. 79 | (naphthoquinone) | H | $CH_3$-phenyl | | 30 |
| Ex. 80 | (naphthoquinone) | H | $CH_3$-phenyl | | 32 |

COMPARATIVE EXAMPLES 1-7

A function divided photosensitive member with a photosensitive layer which was composed of a charge generating layer and a charge transporting layer was prepared in a manner similar to Example 1, except that the azo pigment represented by one of the following chemical formulas was used as a charge generating material.

Comparative Example 1

-continued
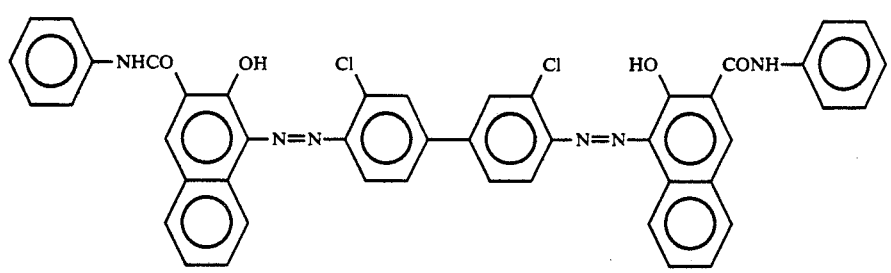
(b)
Comparative Example 2
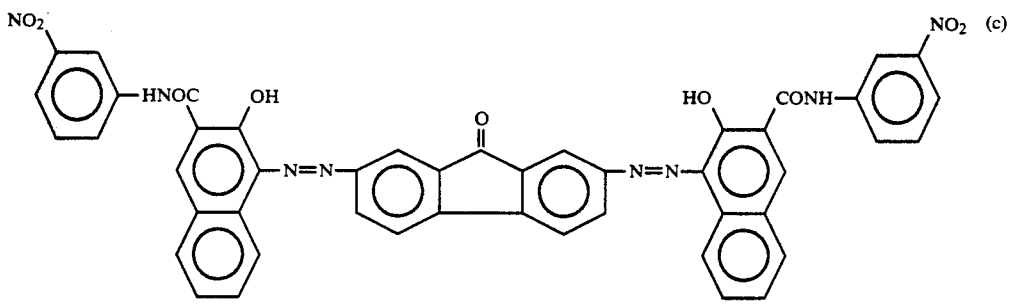
(c)
Comparative Example 3
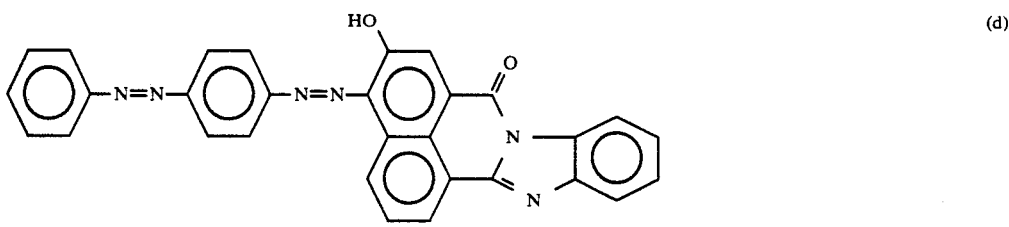
(d)
Comparative Example 4
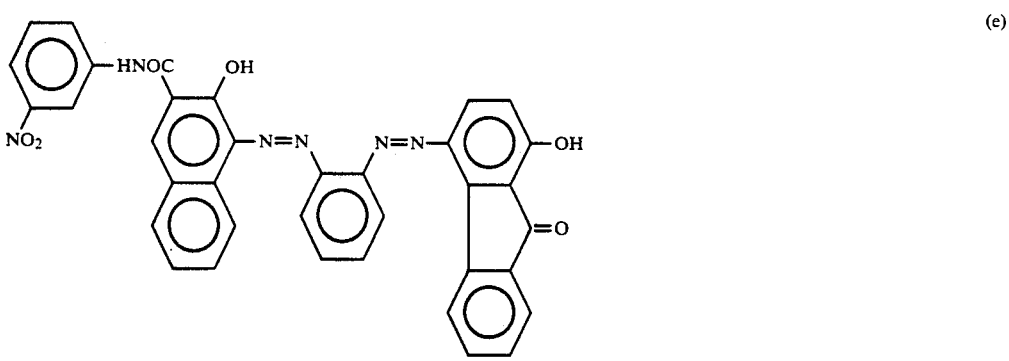
(e)
Comparative Example 5
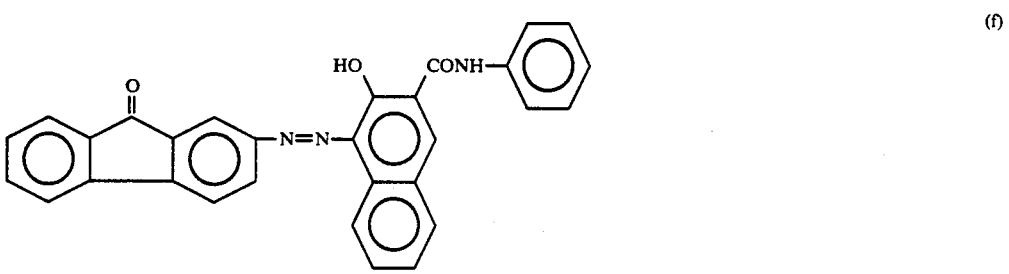
(f)
Comparative Example 6

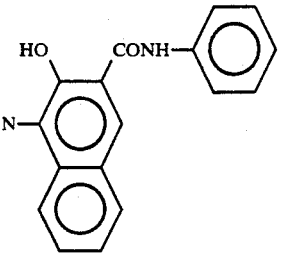
(g)

Comparative Example 7

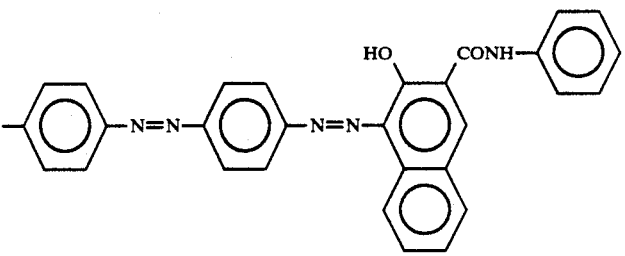
(h)

Exposure values for half reducing ($E_{\frac{1}{2}}$) and potential decay rates ($DDR_1$) were measured to evaluate sensitivity on the photosensitive members prepared in Examples 1-80, and Comparative Examples 1-7. The exposure value for half reducing, which is the exposure amount required for the surface potential to be half the value of the initial surface potential (Vo), was measured by charging first a photosensitive member by means of a corona-discharge of $-6.5$ KV in the dark and then exposing the member to white light of 5 lux in illuminance.

The potential decay rates ($DDR_1$) was measured by allowing the photosensitive member to stand in the dark for 1 minute after charging.

The results are shown in Table 9.

TABLE 9

|  | Vo(v) | $E_{\frac{1}{2}}$(lux · sec) | $DDR_1$ (%) |
|---|---|---|---|
| Ex. 1 | −650 | 0.9 | 3.2 |
| Ex. 2 | −660 | 0.8 | 2.5 |
| Ex. 3 | −650 | 0.7 | 3.0 |
| Ex. 4 | −640 | 0.6 | 3.5 |
| Ex. 5 | −660 | 0.5 | 2.8 |
| Ex. 6 | −660 | 0.5 | 2.5 |
| Ex. 7 | −650 | 0.7 | 3.2 |
| Ex. 8 | −660 | 0.6 | 2.6 |
| Ex. 9 | −650 | 0.5 | 2.9 |
| Ex. 10 | −660 | 0.6 | 2.5 |
| Ex. 11 | −660 | 0.5 | 2.6 |
| Ex. 12 | −660 | 0.4 | 2.5 |
| Ex. 13 | −650 | 0.6 | 3.0 |
| Ex. 14 | −640 | 0.5 | 3.6 |
| Ex. 15 | −650 | 0.7 | 2.9 |
| Ex. 16 | −660 | 0.6 | 3.2 |
| Ex. 17 | −640 | 0.4 | 3.6 |
| Ex. 18 | −660 | 0.7 | 2.5 |
| Ex. 19 | −660 | 0.5 | 2.7 |
| Ex. 20 | −660 | 0.8 | 2.5 |
| Ex. 21 | −640 | 0.8 | 3.5 |
| Ex. 22 | −650 | 0.6 | 3.2 |
| Ex. 23 | −660 | 0.7 | 2.8 |
| Ex. 24 | −650 | 0.8 | 3.0 |
| Ex. 25 | −640 | 0.7 | 3.5 |
| Ex. 26 | −650 | 0.5 | 3.0 |
| Ex. 27 | −650 | 0.9 | 2.9 |
| Ex. 28 | −660 | 0.7 | 2.6 |
| Ex. 29 | −650 | 1.0 | 3.0 |
| Ex. 30 | −640 | 0.8 | 3.4 |
| Ex. 31 | −660 | 1.7 | 2.5 |
| Ex. 32 | −650 | 1.2 | 3.2 |

TABLE 9-continued

|  | Vo(v) | $E_{\frac{1}{2}}$(lux · sec) | $DDR_1$ (%) |
|---|---|---|---|
| Ex. 33 | −660 | 1.0 | 2.7 |
| Ex. 34 | −650 | 1.3 | 3.0 |
| Ex. 35 | −650 | 1.8 | 3.2 |
| Ex. 36 | −650 | 1.4 | 3.1 |
| Ex. 37 | −640 | 1.0 | 3.5 |
| Ex. 38 | −660 | 1.2 | 2.5 |
| Ex. 39 | −650 | 1.5 | 3.0 |
| Ex. 40 | −660 | 1.2 | 2.8 |
| Ex. 41 | −660 | 0.9 | 2.6 |
| Ex. 42 | −650 | 1.3 | 2.9 |
| Ex. 43 | −660 | 1.2 | 2.5 |
| Ex. 44 | −650 | 1.4 | 3.0 |
| Ex. 45 | −660 | 1.0 | 2.6 |
| Ex. 46 | −640 | 0.8 | 3.6 |
| Ex. 47 | −650 | 2.0 | 3.0 |
| Ex. 48 | −660 | 1.4 | 2.5 |
| Ex. 49 | −650 | 0.9 | 3.2 |
| Ex. 50 | −640 | 0.8 | 3.5 |
| Ex. 51 | −650 | 0.7 | 2.9 |
| Ex. 52 | −640 | 0.6 | 3.6 |
| Ex. 53 | −660 | 1.2 | 2.7 |
| Ex. 54 | −660 | 0.7 | 2.5 |
| Ex. 55 | −650 | 0.8 | 3.1 |
| Ex. 56 | −650 | 0.9 | 3.2 |
| Ex. 57 | −660 | 1.3 | 2.4 |
| Ex. 58 | −650 | 1.0 | 3.0 |
| Ex. 59 | −660 | 1.8 | 2.6 |
| Ex. 60 | −650 | 1.5 | 2.9 |
| Ex. 61 | −660 | 1.4 | 2.7 |
| Ex. 62 | −650 | 1.7 | 3.1 |
| Ex. 63 | −640 | 1.3 | 3.4 |
| Ex. 64 | −650 | 1.8 | 3.0 |
| Ex. 65 | −660 | 1.0 | 2.5 |
| Ex. 66 | −660 | 1.3 | 2.8 |
| Ex. 67 | −660 | 1.5 | 2.4 |
| Ex. 68 | −650 | 1.2 | 3.0 |
| Ex. 69 | −660 | 0.9 | 2.5 |
| Ex. 70 | −650 | 1.8 | 3.2 |
| Ex. 71 | −660 | 1.4 | 2.6 |
| Ex. 72 | −660 | 1.5 | 2.5 |
| Ex. 73 | −640 | 1.7 | 3.6 |
| Ex. 74 | −650 | 1.0 | 2.9 |
| Ex. 75 | −660 | 1.2 | 3.2 |
| Ex. 76 | −650 | 0.9 | 3.2 |
| Ex. 77 | −640 | 1.5 | 3.5 |
| Ex. 78 | −660 | 1.4 | 2.7 |
| Ex. 79 | −660 | 1.0 | 2.5 |
| Ex. 80 | −650 | 1.2 | 3.2 |
| Com. Ex. 1 | −640 | 6.3 | 3.8 |
| Com. Ex. 2 | −650 | 8.5 | 3.2 |

TABLE 9-continued

|         | Vo(v) | $E_\frac{1}{2}$(lux · sec) | $DDR_1$ (%) |
|---------|-------|----------------------------|-------------|
| Com. Ex. 3 | −650 | 4.6  | 3.0 |
| Com. Ex. 4 | −660 | 18.2 | 2.7 |
| Com. Ex. 5 | −640 | 5.7  | 3.6 |
| Com. Ex. 6 | −640 | 12.3 | 3.5 |
| Com. Ex. 7 | −650 | 5.2  | 2.9 |

EXAMPLE 81

The azo compound represented by the general formula [II] in which $Ar_3$, $Ar_4$, $R_2$, $Cp_2$ and

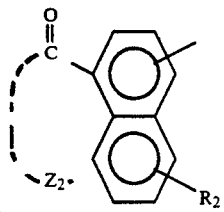

are shown in Table 10 was used in this example. The coupler components $Cp_2$ are indicated by the numbers of chemical formulas [1]–[80] as above described in Table 10.

The azo compound of 0.45 parts by weight, 0.45 parts by weight of polyester resin (Vylon 200 made by Toyobo K.K.) and 50 parts by weight of cyclohexanone were taken in Sand grinder for dispersion. The dispersion solution of the bisazo pigment was dispersed onto aluminotype-Mylar of 100 μm in thickness by a film applicator to form a charge generating layer so that a thickness of the dried layer would be 0.3 g/m².

A solution of 7 parts by weight of p-diphenylaminobenzaldehyde-N,N-diphenylhydrazone and 7 parts by weight of polycarbonate resin (K-1300; made by Teijin Kasei K.K.) dissolved in 500 parts by weight of 1,4-dioxane was dispersed onto the above formed charge generating layer to form a charge transporting layer so that the thickness of the dried layer would be 20 μm.

Thus, a function-divided photosensitive member with the photosensitive layer which was composed of the charge generating layer and the charge transporting layer was prepared.

EXAMPLES 82–90

A function divided photosensitive member with a photosensitive layer which was composed of a charge generating layer and a charge transporting layer was prepared in a manner similar to Example 81, except that the azo compounds shown in Table 8 were used.

EXAMPLES 91–100

A function divided photosensitive member with a photosensitive layer which was composed of a charge generating layer and a charge transporting layer was prepared in a manner similar to Example 81, except that the azo compound shown in Table 10 was contained in the charge generating layer and 1,1-bis(p-diethylaminophenyl)-4,4-diphenyl-1,3-butadiene was used as a charge transporting material.

EXAMPLES 101–110

A function divided photosensitive member with a photosensitive layer which was composed of a charge generating layer and a charge transporting layer was prepared in a manner similar to Example 81, except that the azo compound shown in Table 10 was contained in the charge generating layer and N-ethylcarbazole-3-aldehyde-N-methyl-N-phenyl-hydrazone was used as a charge transporting material.

EXAMPLES 111–120

A function divided photosensitive member with a photosensitive layer which was composed of a charge generating layer and a charge transporting layer was prepared in a manner similar to Example 81, except that the azo compound shown in Table 10 was contained in the charge generating layer and α-phenyl-4-N,N-diphenylaminostilbene was used as a charge transporting material.

TABLE 10

|       | (structure with $Z_2$, $R_2$) | $R_2$ | $Ar_3$ | $Ar_4$ | $Cp_2$ |
|-------|------|------|------|------|------|
| Ex. 81 | (naphthalimide structure) |  | H | (phenyl) | 2 |

TABLE 10-continued
| | | $R_2$ | $Ar_3$ | $Ar_4$ | $Cp_2$ |
|---|---|---|---|---|---|
| Ex. 82 |  | H | 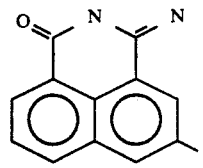 | | 5 |
| Ex. 83 | 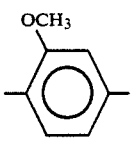 | H |  | | 10 |
| Ex. 84 | 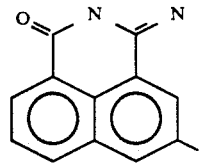 | H | 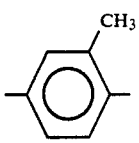 |  | 26 |
| Ex. 85 | 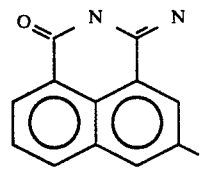 | 2-Cl | 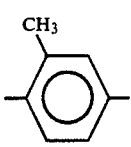 |  | 31 |
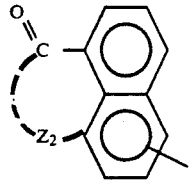

TABLE 10-continued
| | R₂ | Ar₃ | Ar₄ | Cp₂ |
|---|---|---|---|---|
| Ex. 86 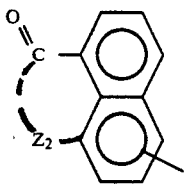 | H | 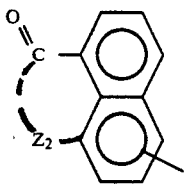 | | 32 |
| Ex. 87 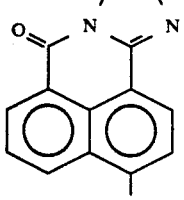 | H | 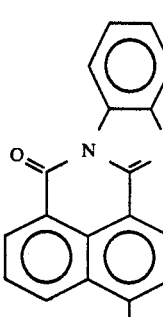 | | 10 |
| Ex. 88 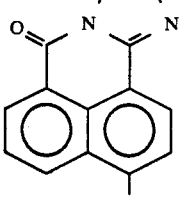 | H | 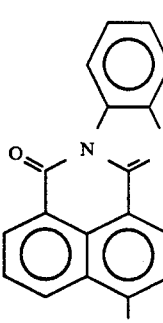 | | 5 |
| Ex. 89 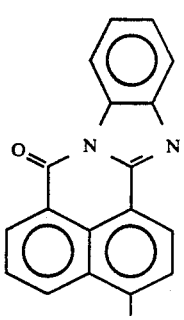 | 3-OH | 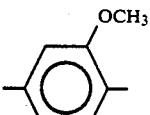 | | 37 |

TABLE 10-continued
| | | $R_2$ | $Ar_3$ | $Ar_4$ | $Cp_2$ |
|---|---|---|---|---|---|
| Ex. 90 | 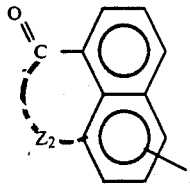 | 3-$CH_3$ | 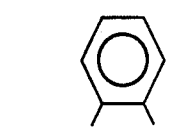 | 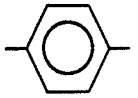 | 2 |
| Ex. 91 | 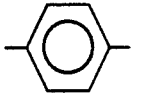 | H | 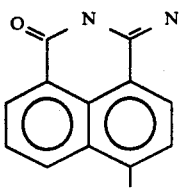 | | 2 |
| Ex. 92 | 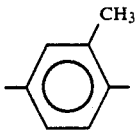 | H | 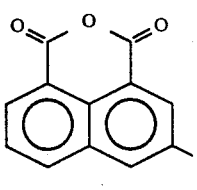 | | 10 |
| Ex. 93 | 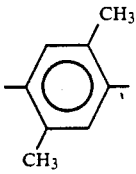 | H | 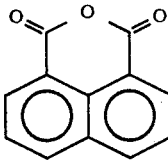 | | 31 |
| Ex. 94 | 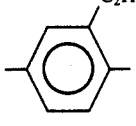 | 2-Cl | 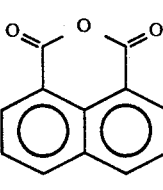 | | 2 |
| Ex. 95 | 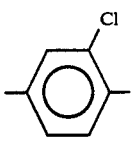 | H | 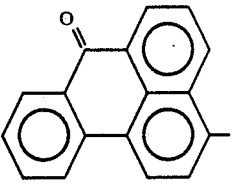 | | 5 |
| Ex. 96 | 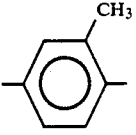 | H | 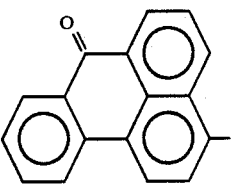 | | 10 |

TABLE 10-continued
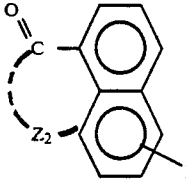
| | | $R_2$ | $Ar_3$ | $Ar_4$ | $Cp_2$ |
|---|---|---|---|---|---|
| Ex. 97 | 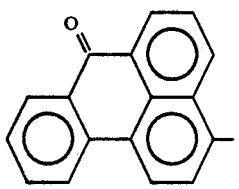 | 2-Cl | 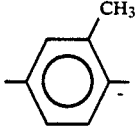 CH$_3$ | 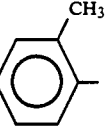 CH$_3$ | 17 |
| Ex. 98 | 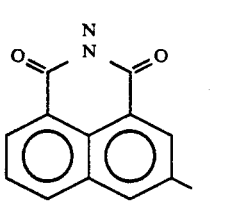 | H | 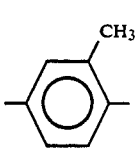 CH$_3$ | | 18 |
| Ex. 99 | 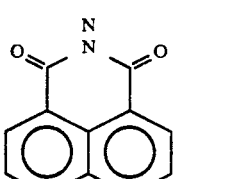 | H | 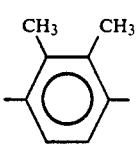 CH$_3$ CH$_3$ | | 20 |
| Ex. 100 | 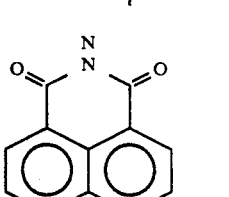 | 2-Cl | 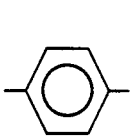 | 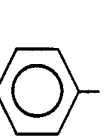 | 31 |
| Ex. 101 | 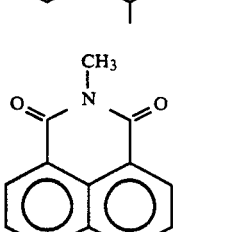 | 3-OH | 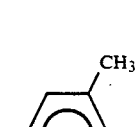 CH$_3$ | | 32 |
| Ex. 102 | 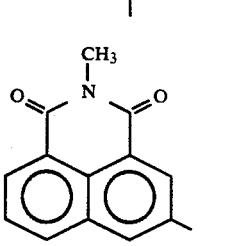 | H | 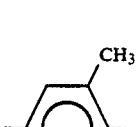 CH$_3$ | | 2 |
| Ex. 103 | 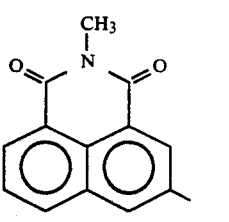 | 4-OH | 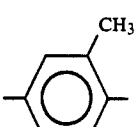 CH$_3$ CH$_3$ | | 7 |

TABLE 10-continued
| | R₂ | Ar₃ | Ar₄ | Cp₂ |
|---|---|---|---|---|
| Ex. 104 | H | 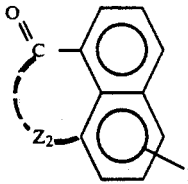 | | 8 |
| Ex. 105 | 2-Cl | 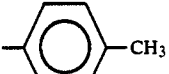 |  | 10 |
| Ex. 106 | H | 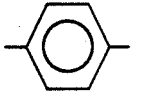 | 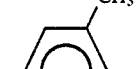 | 14 |
| Ex. 107 | H | 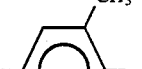 | | 17 |
| Ex. 108 | H |  | | 26 |

TABLE 10-continued
| | | $R_2$ | $Ar_3$ | $Ar_4$ | $Cp_2$ |
|---|---|---|---|---|---|
| Ex. 109 | 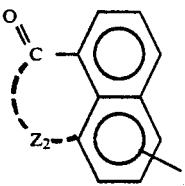 | H | 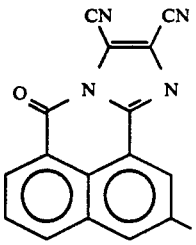 $C_2H_5$ | | 2 |
| Ex. 110 | 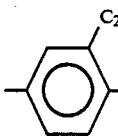 | H | 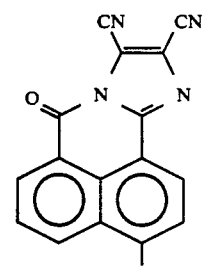 $OCH_3$ | | 5 |
| Ex. 111 | 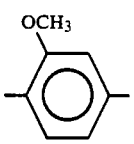 | H | 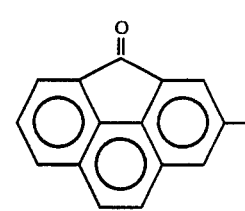 | | 31 |
| Ex. 112 | 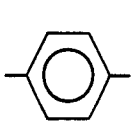 | H | 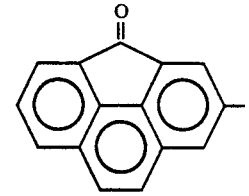 $CH_3$ | | 32 |
| Ex. 113 | 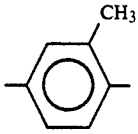 | H | 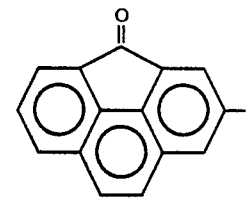 $CH_3$ | | 7 |
| Ex. 114 | 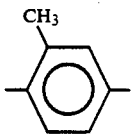 | 3-Cl | 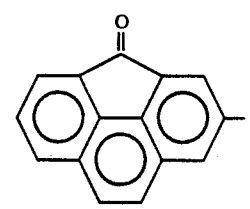 $CH_3$ | | 11 |

TABLE 10-continued

| Ex. | Structure (R₂ group) | R₂ | Ar₃ | Ar₄ | Cp₂ |
|---|---|---|---|---|---|
| Ex. 115 | fluorenone | 3-Cl | 2-CH₃-phenyl | 2-CH₃-phenyl | 28 |
| Ex. 116 | acenaphthenequinone | H | 4-phenyl | — | 2 |
| Ex. 117 | acenaphthenequinone | H | 2-CH₃-phenyl | — | 31 |
| Ex. 118 | naphth-NH-CO | H | 2-CH₃-phenyl | — | 32 |
| Ex. 119 | naphth-N(CH₃)-CO | H | 2,4-CH₃-phenyl | — | 5 |
| Ex. 120 | naphth-N(CH₃)-CO | H | 2-CH₃-phenyl | — | 31 |

COMPARATIVE EXAMPLES 8–10

A function divided photosensitive member with a photosensitive layer which was composed of a charge generating layer and a charge transporting layer was prepared in a manner similar to Example 81, except that the azo pigment represented by one of the following chemical formulas was used as a charge generating material.

Comparative Example 8

-continued

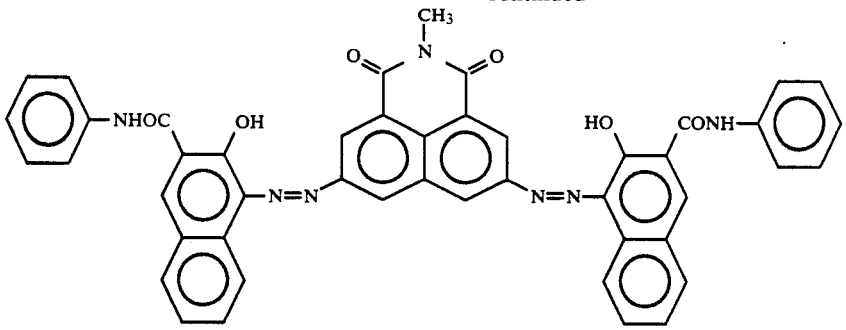
(i)

Comparative Example 9

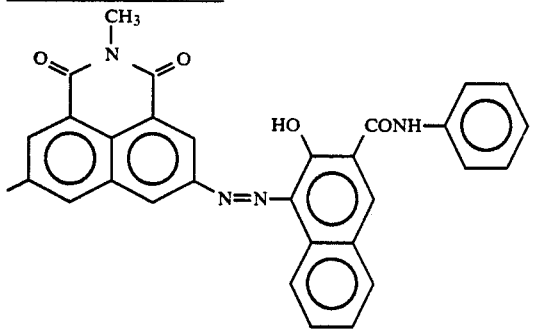
(j)

Comparative Example 10

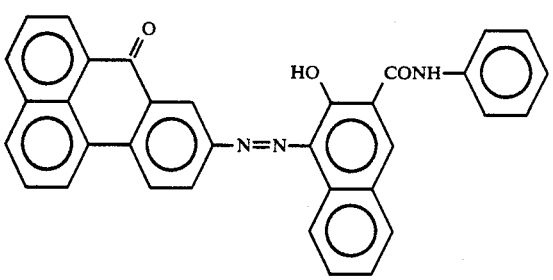
(k)

Exposure values for half reducing ($E_{\frac{1}{2}}$) and potential decay rates ($DDR_1$) were measured to evaluate sensitivity on the photosensitive members prepared in Examples 81-120, and Comparative Examples 8-10. The exposure value for half reducing, which is the exposure amount required for the surface potential to be half the value of the initial surface potential (Vo), was measured by charging first a photosensitive member by means of a corona-discharge of $-6.5$ KV in the dark and then exposing the member to white light of 5 lux in illuminance.

The potential decay rates ($DDR_1$) was measured by allowing the photosensitive member to stand in the dark for 1 minute after charging.

The results are shown in Table 11.

TABLE 11

| | Vo (V) | $E_{\frac{1}{2}}$ (lux · sec) | $DDR_1$ (%) |
|---|---|---|---|
| Ex. 81 | −660 | 1.7 | 2.4 |
| Ex. 82 | −650 | 1.4 | 3.0 |
| Ex. 83 | −660 | 1.5 | 2.6 |
| Ex. 84 | −650 | 1.8 | 2.9 |
| Ex. 85 | −640 | 1.3 | 3.5 |
| Ex. 86 | −650 | 1.8 | 2.8 |
| Ex. 87 | −650 | 1.5 | 3.1 |
| Ex. 88 | −660 | 1.2 | 2.4 |
| Ex. 89 | −650 | 2.0 | 3.0 |
| Ex. 90 | −660 | 1.7 | 2.5 |

TABLE 11-continued

| | Vo (V) | $E_{\frac{1}{2}}$ (lux · sec) | $DDR_1$ (%) |
|---|---|---|---|
| Ex. 91 | −660 | 1.4 | 2.3 |
| Ex. 92 | −650 | 1.6 | 3.1 |
| Ex. 93 | −670 | 1.2 | 2.1 |
| Ex. 94 | −660 | 2.2 | 2.4 |
| Ex. 95 | −650 | 1.8 | 2.9 |
| Ex. 96 | −640 | 1.6 | 3.3 |
| Ex. 97 | −650 | 1.5 | 2.8 |
| Ex. 98 | −660 | 1.3 | 2.3 |
| Ex. 99 | −640 | 1.2 | 3.4 |
| Ex. 100 | −670 | 1.8 | 2.0 |
| Ex. 101 | −650 | 1.4 | 3.0 |
| Ex. 102 | −640 | 1.0 | 3.5 |
| Ex. 103 | −630 | 1.5 | 3.8 |
| Ex. 104 | −650 | 1.9 | 2.9 |
| Ex. 105 | −670 | 2.2 | 1.9 |
| Ex. 106 | −640 | 1.4 | 3.4 |
| Ex. 107 | −650 | 1.8 | 3.0 |
| Ex. 108 | −660 | 1.3 | 2.5 |
| Ex. 109 | −650 | 0.8 | 2.7 |
| Ex. 110 | −640 | 1.2 | 3.3 |
| Ex. 111 | −660 | 1.8 | 2.6 |
| Ex. 112 | −650 | 1.4 | 3.0 |
| Ex. 113 | −660 | 2.3 | 2.3 |
| Ex. 114 | −650 | 1.9 | 2.9 |
| Ex. 115 | −670 | 1.7 | 2.0 |
| Ex. 116 | −670 | 2.0 | 2.2 |
| Ex. 117 | −680 | 1.8 | 1.9 |
| Ex. 118 | −650 | 2.2 | 3.0 |
| Ex. 119 | −640 | 1.7 | 3.6 |

TABLE 11-continued

|  | $V_0$ (V) | $E_{\frac{1}{2}}$ (lux·sec) | $DDR_1$ (%) |
|---|---|---|---|
| Ex. 120 | −670 | 1.5 | 2.3 |
| Com. Ex. 8 | −670 | 10.2 | 2.1 |
| Com. Ex. 9 | −660 | 24.7 | 2.4 |
| Com. Ex. 10 | −650 | 8.8 | 3.1 |

EXAMPLE 121-130

The azo compound represented by the general formula [III] in which $Ar_5$, $Ar_6$, $R_3$, $R_4$ and $Cp_3$ are shown in Table 12 was used in this example. The components $Cp_3$ and $Ar_6$ are indicated in Table 12 by the numbers of chemical formulas [1]–[80] of the coupler components as above described.

The azo compound of 0.45 parts by weight, 0.4 parts by weight of polyester resin (Vylon 200 made by Toyobo K.K.) and 50 parts by weight of cyclohexanone were taken in Sand grinder for dispersion. The dispersion solution of the bisazo pigment was dispersed onto aluminotype-Mylar of 100 μm in thickness by a film applicator to form a charge generating layer so that a thickness of the dried layer would be 0.3 g/m².

A solution of 70 parts by weight of p-diphenylaminobenzaldehyde-N,N-diphenylhydrazone and 7 parts by weight of polycarbonate resin (K-1300; made by Teijin Kasei K.K.) dissolved in 400 parts by weight of 1,4-dioxane was dispersed onto the above formed charge generating layer to form a charge transporting layer so that the thickness of the dried layer would be 16 μm.

Thus, a function-divided photosensitive member with the photosensitive layer which was composed of the charge generating layer and the charge transporting layer was prepared.

TABLE 12

|  | $Ar_5$ | $Cp_3$ | $Ar_6$ | $R_3$ | $R_4$ |
|---|---|---|---|---|---|
| Ex. 121 | phenyl | 2 | 2 | H | H |
| Ex. 122 | phenyl | 3 | 3 | H | H |
| Ex. 123 | 4-CH₃-phenyl | 5 | 5 | H | H |
| Ex. 124 | 4-CH₃-phenyl | 10 | 10 | H | H |
| Ex. 125 | 2-CH₃-phenyl | 26 | 26 | H | H |
| Ex. 126 | 4-CH₃-phenyl | 2 | 2 | H | H |
| Ex. 127 | 2-CH₃-phenyl | 2 | 2 | H | H |
| Ex. 128 | 2-CH₃-phenyl | 3 | 3 | H | H |
| Ex. 129 | 2-CH₃-phenyl | 31 | 31 | H | H |
| Ex. 130 | 2-OCH₃-phenyl | 2 | 2 | H | H |

EXAMPLES 131-140

A function divided photosensitive member with a photosensitive layer which was composed of a charge generating layer and a charge transporting layer was prepared in a manner similar to Example 121, except that the azo compound represented by the general formula [III], in which $Ar_5$, $Ar_6$, $R_3$, $R_4$ and $Cp_3$ are shown in Table 13, was used, and 1,1-bis(p-diethylaminophenyl)-4,4-diphenyl-1,3-butadiene was used as a charge transporting material. The components $Cp_3$ and $Ar_6$ are indicated in Table 13 by the numbers of chemical formulas [1]–[80] of the coupler components as above described.

TABLE 13

|  | $Ar_6$ | $Cp_3$ | $Ar_6$ | $R_3$ | $R_4$ |
|---|---|---|---|---|---|
| Ex. 131 | 4-OCH₃-phenyl | 31 | 31 | H | H |
| Ex. 132 | 4-OCH₃-phenyl | 32 | 32 | H | H |
| Ex. 133 | 3,4-diCH₃-phenyl | 5 | 5 | H | H |

TABLE 13-continued

| | Ar$_6$ | Cp$_3$ | Ar$_6$ | R$_3$ | R$_4$ |
|---|---|---|---|---|---|
| Ex. 134 | 2,3-dimethylphenyl (CH$_3$, CH$_3$) | 31 | 31 | H | H |
| Ex. 135 | 2-chlorophenyl (Cl) | 28 | 28 | H | H |
| Ex. 136 | 3-fluorophenyl (F) | 31 | 31 | H | H |
| Ex. 137 | 2-COH$_3$, 5-OCH$_3$ phenyl | 2 | 2 | H | H |
| Ex. 138 | 2,5-dimethylphenyl (CH$_3$, CH$_3$) | 2 | 2 | H | H |
| Ex. 139 | 2-OC$_2$H$_5$ phenyl | 3 | 3 | H | H |
| Ex. 140 | 4-CH$_3$ phenyl | 29 | 29 | H | H |

EXAMPLES 141–150

A function divided photosensitive member with a photosensitive layer which was composed of a charge generating layer and a charge transporting layer was prepared in a manner similar to Example 121, except that the azo compound represented by the general formula [III], in which Ar$_5$, Ar$_6$, R$_3$, R$_4$ and Cp$_3$ are shown in Table 14, was used, and N-ethylcarbazole-3-aldehyde-N-methyl-N-phenylhydrazone was used as a charge transporting material. The components Cp$_3$ and Ar$_6$ are indicated in Table 14 by the numbers of chemical formulas [1]–[80] of the coupler components as above described.

TABLE 14

| | Ar$_5$ | Cp$_3$ | Ar$_6$ | R$_3$ | R$_4$ |
|---|---|---|---|---|---|
| Ex. 141 | 4-CH$_3$ phenyl | 31 | 31 | H | H |
| Ex. 142 | 2,4-dimethylphenyl (CH$_3$, CH$_3$) | 10 | 10 | H | H |
| Ex. 143 | 2,5-dimethylphenyl (CH$_3$, CH$_3$) | 11 | 11 | H | H |
| Ex. 144 | 2-Cl phenyl | 2 | 10 | H | H |
| Ex. 145 | 2-F phenyl | 31 | 30 | H | H |
| Ex. 146 | 2-HO$_2$ phenyl | 2 | 28 | H | H |
| Ex. 147 | 2-CH$_3$ phenyl | 32 | 29 | 3-Cl | H |
| Ex. 148 | 2-C$_2$H$_5$ phenyl | 5 | 25 | 3-Cl | H |
| Ex. 149 | 2-C$_2$H$_5$ phenyl | 2 | 2 | 3-Br | H |
| Ex. 150 | 2-C$_2$H$_5$ phenyl | 37 | 37 | 3-Br | H |

EXAMPLES 151–160

A function divided photosensitive member with a photosensitive layer which was composed of a charge generating layer and a charge transporting layer was prepared in a manner similar to Example 121, except that the azo compound represented by the general formula [III], in which Ar$_5$, Ar$_6$, R$_3$, R$_4$ and Cp$_3$ are shown in Table 15, was used, and p-benzylamino-2-methylbenzaldehyde-N,N-diphenylhydrazone was used as a charge transporting material. The components Cp3 and Ar6 are indicated in Table 15 by the numbers of chemical formulas [1]-80] of the coupler components as above described.

TABLE 15

| | Ar5 | Cp3 | Ar6 | R3 | R4 |
|---|---|---|---|---|---|
| Ex. 151 | —⌬— | 2 | —⌬—OH | H | H |
| Ex. 152 | CH3-⌬— | 3 | —⌬—OH | H | H |
| Ex. 153 | —⌬— | 5 | —⌬—OH | H | H |
| Ex. 154 | | 7 | | H | H |
| Ex. 155 | CH3-⌬-CH3 | 10 | CH3-⌬—OH | 3-Br | 6-Br |
| Ex. 156 | —⌬— | 11 | CH3-⌬—OH | 3-Br | 6-Br |
| Ex. 157 | —⌬— | 29 | —⌬—OH | 3-CH3 | H |
| Ex. 158 | C2H5-⌬-CH3 | 31 | —⌬—OH | 3-CH3 | H |

TABLE 15-continued

| | Ar5 | Cp3 | Ar6 | R3 | R4 |
|---|---|---|---|---|---|
| Ex. 159 | OCH2-⌬— | 32 | CH3-⌬—OH | 3-OCH3 | H |
| Ex. 160 | CH3,CH3-⌬— | 37 | —⌬—OH | 3-OCH3 | H |

COMPARATIVE EXAMPLES 11-12

A function divided photosensitive member with a photosensitive layer which was composed of a charge generating layer and a charge transporting layer was prepared in a manner similar to Example 121, except that the azo pigment represented by one of the following chemical formulas was used as a charge generating material.

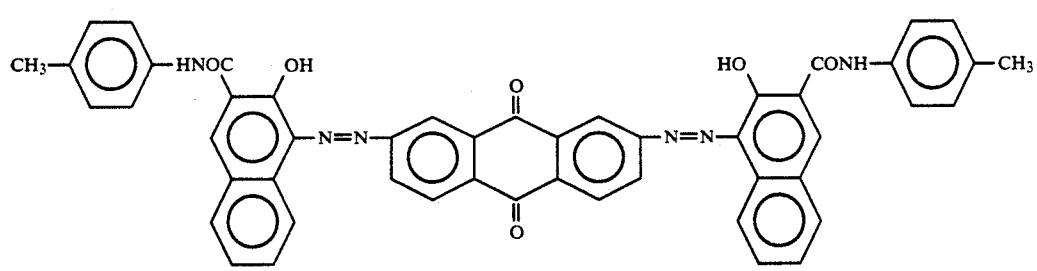

(l)

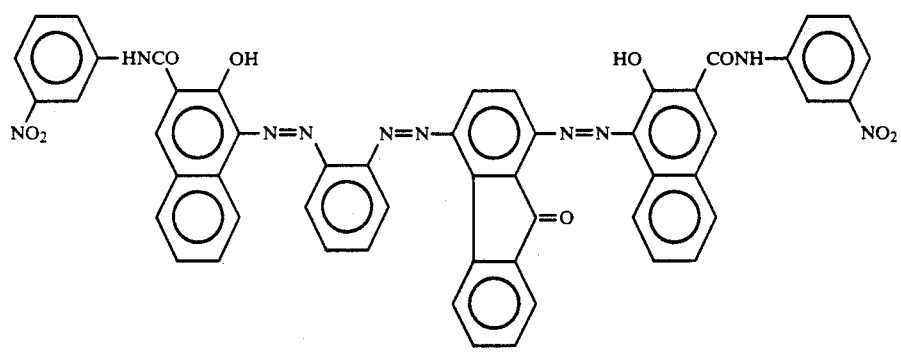

(m)

Exposure values for half reducing ($E_{\frac{1}{2}}$) and potential decay rates ($DDR_1$) were measured to evaluate sensitivity on the photosensitive members prepared in Example 121-160, and Comparative Examples 11 and 12. The exposure value for half reducing, which is the exposure amount required for the surface potential to be half the value of the initial surface potential (Vo), was measured by charging first a photosensitive member by means of a corona-discharge of −6.5 KV in the dark and then exposing the member to white light of 5 lux in illuminance.

The potential decay rates ($DDR_1$) was measured by allowing the photosensitive member to stand in the dark for 1 minute after charging.

The results are shown in Table 16.

TABLE 16

| | Vo(V) | $E_{2/1}$ (lux · sec) | $DDR_1$ (%) |
|---|---|---|---|
| Ex. 121 | −650 | 2.2 | 3.2 |
| Ex. 122 | −640 | 1.9 | 3.6 |

TABLE 16-continued

| | Vo(V) | E $_{2/1}$ (lux · sec) | DDR$_1$ (%) |
|---|---|---|---|
| Ex. 123 | −650 | 1.5 | 3.0 |
| Ex. 124 | −660 | 1.4 | 2.8 |
| Ex. 125 | −650 | 1.6 | 3.0 |
| Ex. 126 | −640 | 1.4 | 3.5 |
| Ex. 127 | −650 | 1.6 | 3.2 |
| Ex. 128 | −660 | 1.3 | 2.8 |
| Ex. 129 | −660 | 1.2 | 2.9 |
| Ex. 130 | −650 | 1.5 | 3.0 |
| Ex. 131 | −650 | 1.2 | 3.1 |
| Ex. 132 | −640 | 1.4 | 3.5 |
| Ex. 133 | −660 | 1.6 | 2.8 |
| Ex. 134 | −650 | 1.8 | 3.2 |
| Ex. 135 | −650 | 1.7 | 3.2 |
| Ex. 136 | −650 | 1.5 | 3.0 |
| Ex. 137 | −640 | 1.3 | 3.6 |
| Ex. 138 | −650 | 1.0 | 2.9 |
| Ex. 139 | −650 | 0.9 | 3.2 |
| Ex. 140 | −660 | 1.3 | 2.5 |
| Ex. 141 | −650 | 1.5 | 3.2 |
| Ex. 142 | −640 | 0.9 | 3.5 |
| Ex. 143 | −650 | 1.6 | 3.0 |
| Ex. 144 | −660 | 1.4 | 2.7 |
| Ex. 145 | −660 | 2.0 | 2.5 |
| Ex. 146 | −650 | 1.2 | 3.1 |
| Ex. 147 | −650 | 0.9 | 2.9 |
| Ex. 148 | −650 | 0.8 | 3.2 |
| Ex. 149 | −650 | 1.6 | 3.0 |
| Ex. 150 | −650 | 1.4 | 3.1 |
| Ex. 151 | −650 | 1.5 | 3.2 |
| Ex. 152 | −660 | 1.3 | 2.6 |
| Ex. 153 | −650 | 1.4 | 3.3 |
| Ex. 154 | −660 | 0.9 | 2.5 |
| Ex. 155 | −660 | 1.2 | 2.6 |
| Ex. 156 | −670 | 1.4 | 2.1 |
| Ex. 157 | −660 | 0.8 | 2.5 |
| Ex. 158 | −650 | 1.2 | 3.0 |
| Ex. 159 | −660 | 1.4 | 2.4 |
| Ex. 160 | −660 | 1.6 | 2.7 |
| Com. Ex. 11 | −650 | 11.2 | 3.0 |
| Com. Ex. 12 | −660 | 23.9 | 2.5 |

EXAMPLE 161

The azo pigment (A-51) (0.25 parts by weight), which is one of the azo pigments represented by the general formula [IV], the azo pigment (B-3)(0.25 parts by weight), which is one of the azo pigments represented by the general formula [V], butyral resin (S-Lec BX-1; made by Sekisui Kagaku K.K.) of 0.45 parts by weight and cyclohexanone of 50 parts by weight were taken in Sand grinder for dispersion. The dispersion solution of the pigments was dispersed onto aluminotype-Mylar of 100 μm in thickness by a film applicator to form a charge generating layer so that a thickness of the dried layer would be 0.3 g/m².

A solution of 70 parts by weight of the compound (c-6) and 70 parts by weight of polycarbonate resin (K-1300; made by Teijin Kasei K.K.) dissolved in 400 parts by weight of 1,4-dioxane was dispersed onto the above formed charge generating layer to form a charge transporting layer so that the thickness of the dried layer would be 16 μm.

Thus, a function-divided photosensitive member with the photosensitive layer which was composed of the charge generating layer and the charge transporting layer was prepared.

EXAMPLE 162-175

Photosensitive members were prepared in a manner similar to Example 161, except that the azo pigments and the charge transporting materials shown in Table 17 were used.

EXAMPLE 176

The azo pigment (A-88) (0.5 parts by weight), the azo pigment (B-47) of 0.5 parts by weight, the charge transporting material (c-19) of 2 parts by weight, and polycarbonate (PC-Z; made by Mitsubishi Gas Kagaku K.K.) of 3 parts by weight were taken in Sand grinder for dispersion. The dispersion was applied onto an aluminium drum by a dipping method so that a thickness of the dried layer would be 10 μm. Thus, a photosensitive member of dispersion type was prepared.

EXAMPLES 177-180

Photosensitive members were prepared in a manner similar to Example 176, except that the azo pigment and the charge transporting layer shown in Table 17 were used.

TABLE 17

| | Azo pigment [IV] | Azo pigment [V] | [IV]/[V] | CT |
|---|---|---|---|---|
| Ex. 161 | A-51 | B-3 | 1/1 | C-6 |
| Ex. 162 | A-53 | B-20 | 1/1 | C-6 |
| Ex. 163 | A-54 | B-20 | 1/2 | C-6 |
| Ex. 164 | A-56 | B-17 | 1/2 | C-6 |
| Ex. 165 | A-57 | B-25 | 2/3 | C-6 |
| Ex. 166 | A-58 | B-34 | 2/1 | C-9 |
| Ex. 167 | A-59 | B-40 | 2/1 | C-9 |
| Ex. 168 | A-63 | B-37 | 2/1 | C-9 |
| Ex. 169 | A-65 | B-38 | 1/1 | C-9 |
| Ex. 170 | A-68 | B-24 | 1/1 | C-9 |
| Ex. 171 | A-71 | B-40 | 1/2 | C-13 |
| Ex. 172 | A-74 | B-41 | 1/2 | C-13 |
| Ex. 173 | A-78 | B-43 | 2/3 | C-13 |
| Ex. 174 | A-79 | B-46 | 1/1 | C-13 |
| Ex. 175 | A-85 | B-46 | 1/2 | C-13 |
| Ex. 176 | A-88 | B-47 | 2/3 | C-19 |
| Ex. 177 | A-94 | B-51 | 1/3 | C-19 |
| Ex. 178 | A-99 | B-55 | 3/1 | C-19 |
| Ex. 179 | | | | C-19 |
| Ex. 180 | A-59 | B-58 | 1/1 | C-19 |
| Com. Ex. 13 | (n) | | | C-6 |
| Com. Ex. 14 | (o) | | | C-6 |
| Com. Ex. 15 | (p) | | | C-6 |
| Com. Ex. 16 | (q) | | | C-6 |

COMPARATIVE EXAMPLES 13-16

Photosensitive members were prepared in a manner similar to Example 161, except that the compounds represented by the chemical formulas (n)-(q) were used as a charge transporting materials.

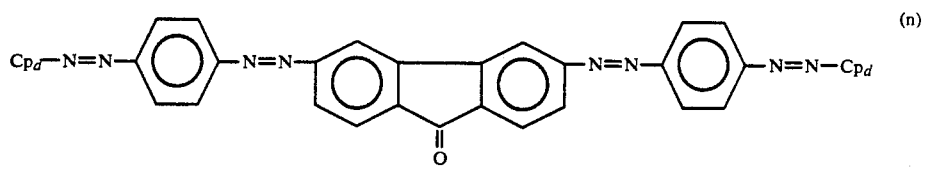

(n)

-continued

Cp_d = 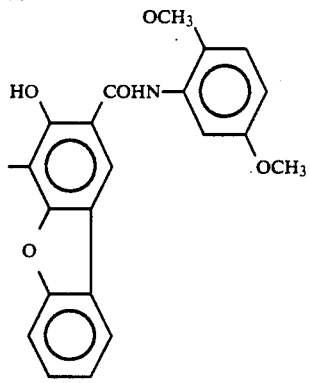

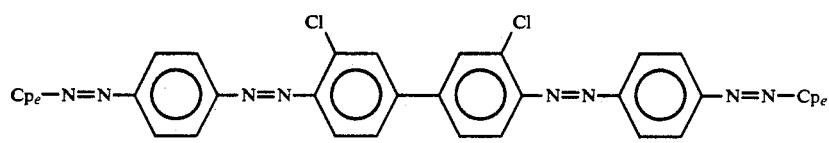 (o)

Cp_e = 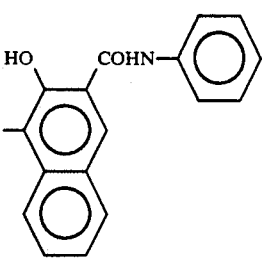

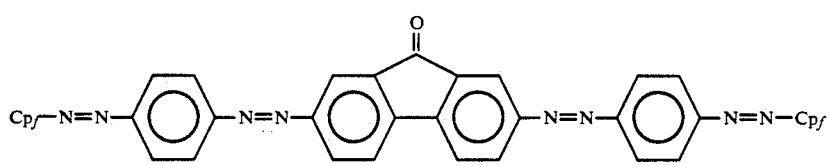 (p)

Cp_f = 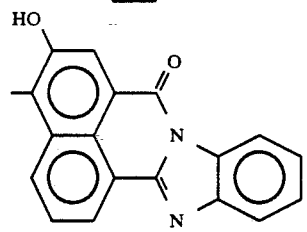

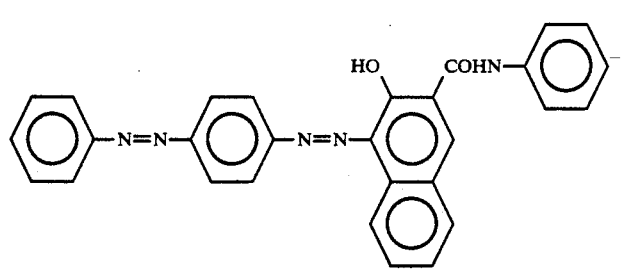 (q)

The photosensitive members prepared in Examples 161–175 and Comparative Examples 13–16 were installed in a commercial copying machine (EP-470Z; made by Minolta Camera K.K.) to measure initial surface potentials (Vo), the exposure values for half reducing ($E_{\frac{1}{2}}$ (lux.sec)) and the potential decay rates ($DDR_1$) by means of a corona-discharge of −6KV.

The photosensitive members prepared in Examples 176–180 were installed in a commercial copying machine (EP-350Z; made by Minolta Camera K.K.) to measure Vo, $E_{\frac{1}{2}}$ and $DDR_1$.

The results are shown in Table 18.

TABLE 18

| | Vo(V) | $E_{\frac{1}{2}}$ (lux/sec) | $DDR_1$ (%) |
|---|---|---|---|
| Ex. 161 | −650 | 0.8 | 3.0 |
| Ex. 162 | −660 | 0.7 | 2.7 |
| Ex. 163 | −650 | 0.7 | 2.9 |

TABLE 18-continued

| | Vo(V) | $E_{\frac{1}{2}}$ (lux/sec) | $DDR_1$ (%) |
|---|---|---|---|
| Ex. 164 | −660 | 0.9 | 2.5 |
| Ex. 165 | −670 | 0.8 | 2.2 |
| Ex. 166 | −660 | 1.0 | 2.6 |
| Ex. 167 | −650 | 0.9 | 3.1 |
| Ex. 168 | −660 | 0.8 | 2.7 |
| Ex. 169 | −650 | 0.7 | 3.0 |
| Ex. 170 | −650 | 0.8 | 2.9 |
| Ex. 171 | −660 | 0.6 | 2.6 |
| Ex. 172 | −650 | 0.5 | 3.0 |
| Ex. 173 | −660 | 0.3 | 2.5 |
| Ex. 174 | −650 | 0.4 | 3.1 |
| Ex. 175 | −660 | 0.5 | 2.7 |
| Ex. 176 | +650 | 0.9 | 3.1 |
| Ex. 177 | +640 | 0.8 | 3.4 |
| Ex. 178 | +650 | 1.0 | 2.9 |
| Ex. 179 | +640 | 0.9 | 3.5 |
| Ex. 180 | +650 | 0.7 | 3.0 |
| Comp. Ex. 13 | −650 | 13.2 | 2.7 |
| Comp. Ex. 14 | −650 | 3.9 | 2.7 |
| Comp. Ex. 15 | −650 | 10.7 | 3.1 |
| Comp. Ex. 16 | −650 | 7.4 | 3.1 |

EXAMPLE 181

The azo pigment (A-2) (0.25 parts by weight), which is one of the azo pigments represented by the general formula [III], the azo pigment (B-3)(0.25 parts by weight), which is one of the azo pigments represented by the general formula [V], butyral resin (S-Lec BX-1; made by Sekisui Kagaku K.K.) of 0.45 parts by weight and cyclohexanone of 50 parts by weight were taken in Sand grinder for dispersion. The dispersion solution of the bisazo pigments was dispersed onto aluminotype-Mylar of 100 μm in thickness by a film applicator to form a charge generating layer so that a thickness of the dried layer would be 0.3 g/m².

A solution of 70 parts by weight of the compound (C-6) and 70 parts by weight of polycarbonate resin (K-1300; made by Teijin Kasei K.K.) dissolved in 400 parts by weight of 1,4-dioxane was dispersed onto the above formed charge generating layer to form a charge transporting layer so that the thickness of the dried layer would be 16 μm.

Thus, a function-divided photosensitive member with the photosensitive layer which was composed of the charge generating layer and the charge transporting layer was prepared.

EXAMPLE 182-195

Photosensitive members were prepared in a manner similar to Example 181, except that the azo pigments and the charge transporting materials shown in Table 19 were used.

EXAMPLE 196

The azo pigment (A-38) (0.5 parts by weight), the azo pigment (B-47) of 0.5 parts by weight, the charge transporting material (c-19) of 2 parts by weight, and polycarbonate (PC-Z; made by Mitsubishi Gas Kagaku K.K.) of 3 parts by weight were taken in Sand grinder for dispersion. The dispersion was applied onto an aluminium drum by a dipping method so that a thickness of the dried layer would be 10 μm. Thus, a photosensitive member of dispersion type was prepared.

EXAMPLES 197-200

Photosensitive members were prepared in a manner similar to Example 196, except that the azo pigment and the charge transporting layer shown in Table 19 were used.

TABLE 19

| | Azo pigment [III] | Azo pigment [V] | [III]/[V] | CT |
|---|---|---|---|---|
| Ex. 181 | A-2 | B-3 | 1/1 | C-6 |
| Ex. 182 | A-5 | B-20 | 1/1 | C-6 |
| Ex. 183 | A-7 | B-22 | 1/2 | C-6 |
| Ex. 184 | A-8 | B-17 | 1/2 | C-6 |
| Ex. 185 | A-9 | B-25 | 2/3 | C-6 |
| Ex. 186 | A-10 | B-34 | 2/1 | C-9 |
| Ex. 187 | A-12 | B-40 | 2/1 | C-9 |
| Ex. 188 | A-13 | B-37 | 2/1 | C-9 |
| Ex. 189 | A-15 | B-38 | 1/1 | C-9 |
| Ex. 190 | A-18 | B-24 | 1/2 | C-9 |
| Ex. 191 | A-20 | B-40 | 1/3 | C-13 |
| Ex. 192 | A-21 | B-20 | 1/4 | C-13 |
| Ex. 193 | A-31 | B-43 | 1/5 | C-13 |
| Ex. 194 | A-33 | B-46 | 2/1 | C-13 |
| Ex. 195 | A-36 | B-47 | 3/1 | C-13 |
| Ex. 196 | A-39 | B-50 | 4/1 | C-13 |
| Ex. 197 | A-42 | B-54 | 5/1 | C-19 |
| Ex. 198 | A-5 | B-2/B-20 = 1/1 | 1/1 | C-19 |
| Ex. 199 | A-5 | B-2/B-20 = 1/8 | 1/5 | C-19 |
| Ex. 200 | A-5/A-33 = 1/1 | B-20 | 1/1 | C-19 |

The photosensitive members prepared in Examples 182–195 were installed in a commercial copying machine (EP-470Z; made by Minolta Camera K.K.) to measure initial surface potentials (Vo), the exposure values for half reducing ($E_{\frac{1}{2}}$ (lux.sec)) and the potential decay rates ($DDR_1$) by means of a corona-discharge of −6KV.

The photosensitive members prepared in Examples 196–200 were installed in a commercial copying machine (EP-350Z; made by Minolta Camera K.K.) to measure Vo, $E_{\frac{1}{2}}$ and $DDR_1$.

The results are shown in Table 20.

TABLE 20

| | Vo(V) | $E_{\frac{1}{2}}$ (lux/sec) | $DDR_1$ (%) |
|---|---|---|---|
| Ex. 181 | −660 | 0.9 | 2.7 |
| Ex. 182 | −660 | 0.7 | 2.6 |
| Ex. 183 | −650 | 0.8 | 3.0 |
| Ex. 184 | −660 | 0.8 | 2.7 |
| Ex. 185 | −670 | 0.9 | 2.3 |
| Ex. 186 | −660 | 1.0 | 2.6 |
| Ex. 187 | −660 | 0.9 | 2.7 |
| Ex. 188 | −650 | 0.8 | 3.1 |
| Ex. 189 | −650 | 0.9 | 2.9 |
| Ex. 190 | −660 | 0.8 | 2.5 |
| Ex. 191 | −650 | 0.8 | 3.1 |
| Ex. 192 | −660 | 0.7 | 2.7 |
| Ex. 193 | −650 | 0.6 | 3.2 |
| Ex. 194 | −660 | 0.7 | 2.8 |
| Ex. 195 | −660 | 0.8 | 2.7 |
| Ex. 196 | +650 | 0.9 | 3.1 |
| Ex. 197 | +640 | 1.0 | 3.6 |
| Ex. 198 | +650 | 0.7 | 3.2 |
| Ex. 199 | +640 | 0.5 | 3.4 |
| Ex. 200 | +650 | 0.6 | 3.0 |

What is claimed is:

1. A photosensitive member with a photosensitive layer on or over an electrically conductive substrate, in which the photosensitive layer comprises at least one of the azo pigments selected from the group consisting of azo pigments represented by the following general formulas [I], [II] and [III]:

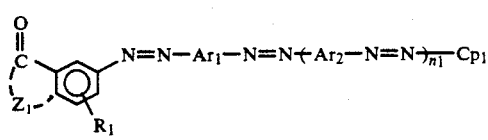  [I]

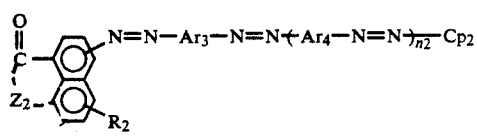  [II]

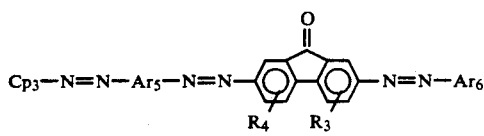  [III]

in which $Z_1$ is a residual group of a condensed ring excluding the benzene ring and the carbonyl group in the formula [I]; $Z_2$ is a residual group of a condensed ring excluding the naphthalene ring and the carbonyl group in the formula [II]; $Z_1$ and $Z_2$ may have a substituent respectively; $R_1$, $R_2$, $R_3$ and $R_4$ represent independently a hydrogen atom, an alkyl group, an alkoxy group, a halogen atom, a hydroxy group or a nitro group; $Ar_1$, $Ar_2$, $Ar_3$, $Ar_4$ and $Ar_5$ represent independently an arylene group which may have a substituent; $Ar_6$ represents an aryl group which may have a substituent or a residual group of a coupler component having a phenolic hydroxy group; $n_1$ and $n_2$ represent independently an integer of 0 or 1; $Cp_1$, $Cp_2$ and $Cp_3$ represent independently a residual group of a coupler component having a phenolic hydroxy group selected from the group consisting of coupler components represented by the following general formulas [a]-[j]:

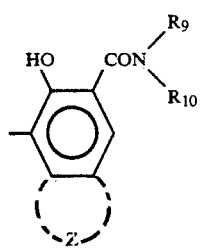  [a]

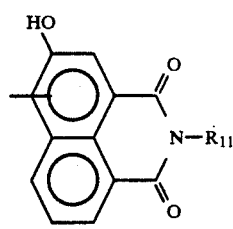  [b]

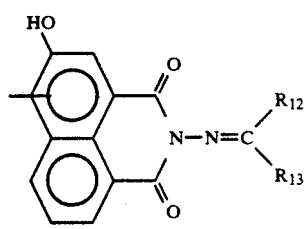  [c]

-continued

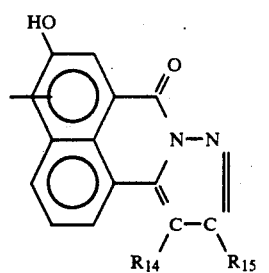  [d]

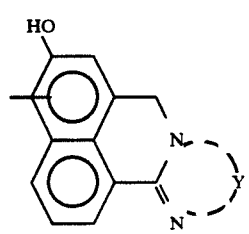  [e]

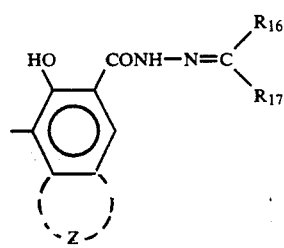  [f]

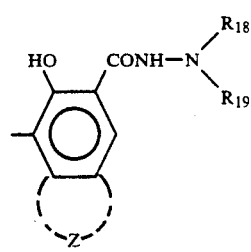  [g]

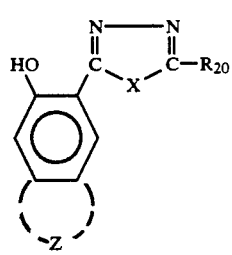  [h]

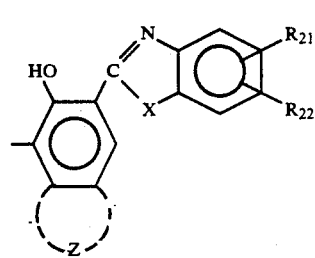  [i]

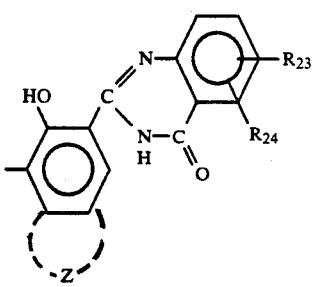

wherein X is an oxygen atom, a sulfur atom or a nitrogen atom which may have a substituent; Y is a bivalent group of aromatic hydrocarbon or a bivalent group which may form a heterocyclic ring together with nitrogen atoms; z is a residual group which may be condensed with benzene ring to form a conjugated polycyclic ring or a heterocyclic ring; $R_9$, $R_{10}$, $R_{12}$, $R_{13}$, $R_{16}$, $R_{17}$, $R_{18}$ and $R_{19}$ are an alkyl group, an aralkyl group, an aryl group, or a heterocyclic group, each of which may have a substituent and form a ring with each other, or a hydrogen atom; $R_{11}$ and $R_{20}$ are independently an alkyl group, an aralkyl group, an aryl group or a heterocyclic group, each of which may have a substituent; $R_{14}$, and $R_{15}$ are a hydrogen atom, a halogen atom, or an alkyl group, an aralkyl group, an acyl group, an alkoxycarbonyl group, an aryl group, a condensed polycyclic group or a heterocyclic group, each of which may have a substituent; $R_{21}$, $R_{22}$, $R_{23}$ and $R_{24}$ are a hydrogen atom, a halogen atom, an alkyl group, a nitro group, substituted sulfone group, a carbamoyl group which may have a substituent on the nitrogen atom, a sulfamoyl group, a C-acylamino group which may have a substituent or a phthalimidyl group; $R_{21}$ and $R_{22}$, or $R_{22}$ and $R_{23}$ may form a ring with each other.

2. A photosensitive member of claim 1, in which the photosensitive layer comprises the azo pigments of claim 1 dispersed in a binder resin.

3. A photosensitive member of claim 2, in which the photosensitive layer further comprises a charge transporting material dispersed in the binder resin.

4. A photosensitive member of claim 3, in which the thickness of the photosensitive layer is within the range of 3-30 μm.

5. A photosensitive member of claim 2, in which the azo pigments of claim 1 are contained at the content of 0.01-2 parts by weight on the basis of 1 part by weight of the binder resin.

6. A photosensitive member of claim 1, in which the photosensitive layer comprises a charge transporting layer and a charge generating layer.

7. A photosensitive member of claim 6, in which the thickness of the charge generating layer is 4 μm or less.

8. A photosensitive member of claim 6, in which the thickness of the charge transporting layer is within the range of 3-50 μm.

9. A photosensitive member of claim 6, in which the charge transporting layer comprises the charge transporting material dispersed in the binder resin at the content of 0.2-2 parts by weight on the basis of 1 part of the binder resin.

10. A photosensitive member of claim 6, in which the azo pigments of claim 1 are contained at the content of 0.01-2 parts by weight on the basis of 1 part of the binder resin.

11. A photosensitive member with a photosensitive layer on or over an electrically conductive substrate, in which the photosensitive layer comprises a mixture of an azo pigment represented by the following general formula [IV] with an azo pigment represented by the following general formula [V]:

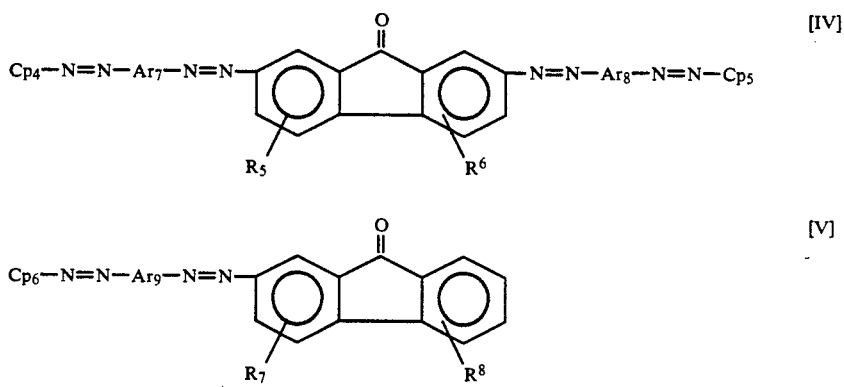

in which $Ar_7$, $Ar_8$ and $Ar_9$ represent independently an arylene group which may have a substituent; $R_5$, $R_6$, $R_7$ and $R_8$ represent independently a hydrogen atom, a halogen atom, an alkyl group, an alkoxy group, a hydroxy group or a nitro group; $Cp_4$, $Cp_5$ and $Cp_6$ represent independently a residual group of a coupler component having a phenolic hydroxy group selected from the group consisting of coupler components represented by the following general formulas [a]–[j]:

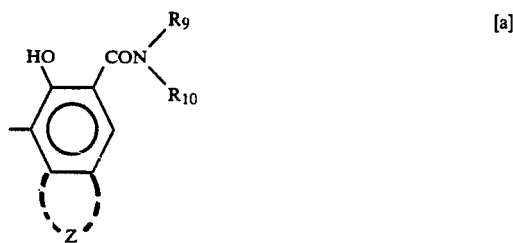

-continued

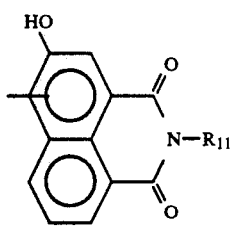

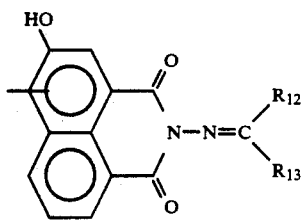

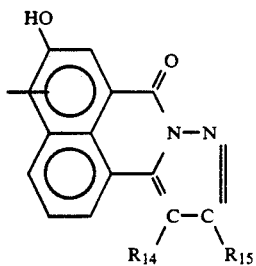

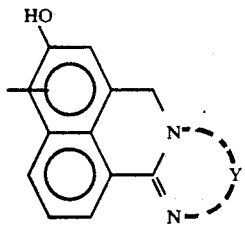

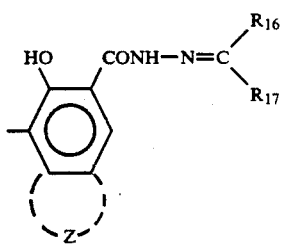

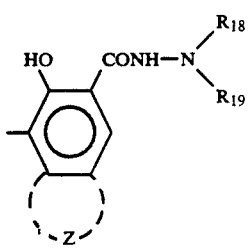

[b]

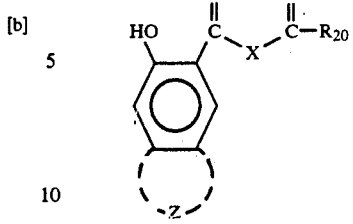

[c]

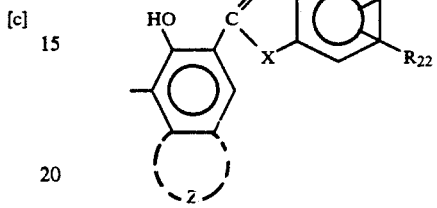

[d]

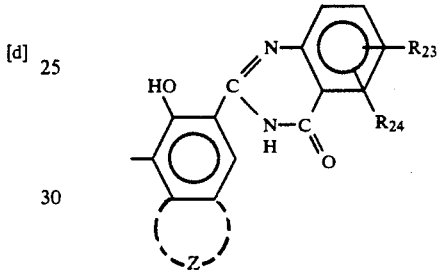

wherein X is an oxygen atom, a sulfur atom or a nitrogen atom which may have a substituent; Y is a bivalent group of aromatic hydrocarbon or a bivalent group which may form a heterocyclic ring together with nitrogen atoms; z is a residual group which may be condensed with benzene ring to form a conjugated polycyclic ring or a heterocyclic ring; $R_9$, $R_{10}$, $R_{12}$, $R_{13}$, $R_{16}$, $R_{17}$, $R_{18}$ and $R_{19}$ are an alkyl group, an aralkyl group, an aryl group, or a heterocyclic group, each of which may have a substituent and form a ring with each other, or a hydrogen atom; $R_{11}$ and $R_{20}$ are independently an alkyl group, an aralkyl group, an aryl group or a heterocyclic group, each of which may have a substituent; $R_{14}$, and $R_{15}$ are a hydrogen atom, a halogen atom, or an alkyl group, an aralkyl group, an acyl group, an alkoxycarbonyl group, an aryl group, a condensed polycyclic group or a heterocyclic group, each of which may have a substituent; $R_{21}$, $R_{22}$, $R_{23}$ and $R_{24}$ are a hydrogen atom, a halogen atom, an alkyl group, a nitro group, substituted sulfone group, a carbamoyl group which may have a substituent on the nitrogen atom, a sulfamoyl group, a C-acylamino group which may have a substituent or a phthalimidyl group; $R_{21}$ and $R_{22}$, or $R_{22}$ and $R_{23}$ may form a ring with each other.

12. A photosensitive member of claim 11, in which the azo pigment of the general formula [IV] is mixed with the azo pigment of the general formula [V] at the weight ratio ([IV]/[V]) of 1/5-5/1.

13. A photosensitive member of claim 11, in which the azo pigment of the general formula [IV] is mixed with the azo pigment of the general formula [V] at the weight ratio ([IV]/[V]) of ⅓-3/1.

14. A photosensitive member of claim 11, in which the photosensitive member comprises the azo pigments of the general formula [IV] and [V] dispersed in the binder resin at the total content of 0.2–2 parts by weight on the basis of 1 part of the binder resin.

15. A photosensitive member with a photosensitive layer on or over an electrically conductive substrate, in which the photosensitive layer comprises a mixture of an azo pigment represented by the following general formula [III] with an azo pigment represented by the following general formula [V]:

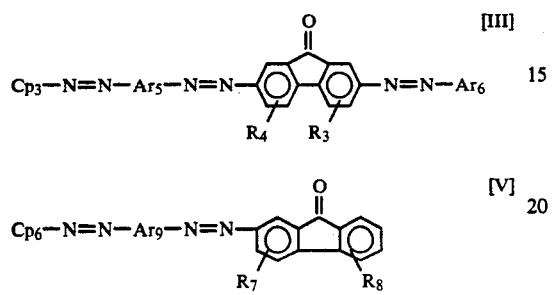

in which $Ar_5$ and $Ar_9$ represent independently an arylene group which may have a substituent; $Ar_6$ is a residual group of a coupler component having a phenolic hydroxy group; $R_3$, $R_4$, $R_7$ and $R_8$ represent independently a hydrogen atom, a halogen atom, an alkyl group, an alkoxy group, a hydroxy group or a nitro group; $Cp_3$ and $Cp_6$ represent independently a residual group of a coupler component having a phenolic hydroxy group selected from the group consisting of coupler components represented by the following general formulas [a]–[j]:

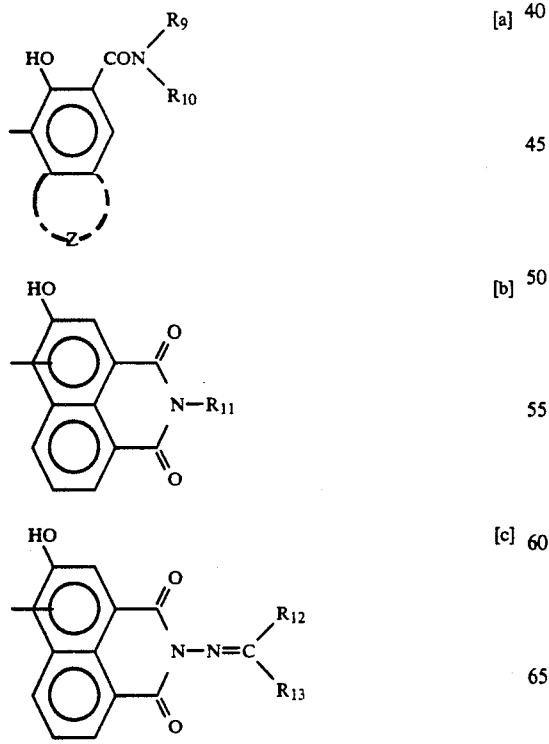

-continued

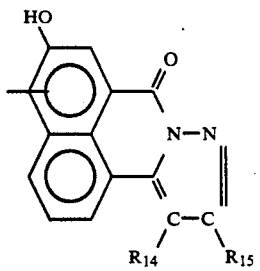

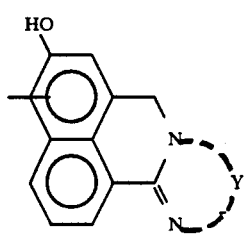

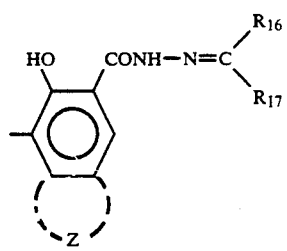

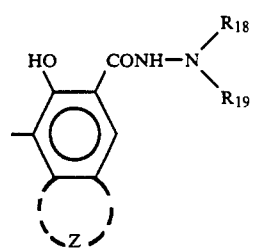

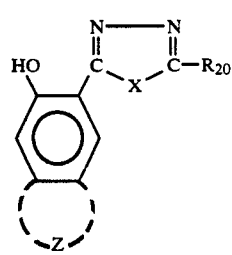

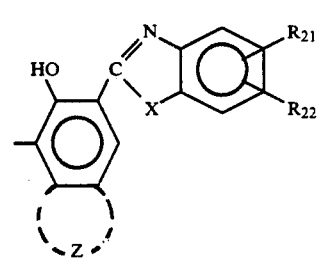

-continued

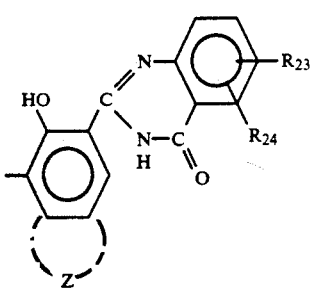

[j]

wherein X is an oxygen atom, a sulfur atom or a nitrogen atom which may have a substituent; Y is a bivalent group of aromatic hydrocarbon or a bivalent group which may form a heterocyclic ring together with nitrogen atoms; z is a residual group which may be condensed with benzene ring to form a conjugated polycyclic ring or a heterocyclic ring; $R_9$, $R_{10}$, $R_{12}$, $R_{13}$, $R_{16}$, $R_{17}$, $R_{18}$ and $R_{19}$ are an alkyl group, an aralkyl group, an aryl group, or a heterocyclic group, each of which may have a substituent and form a ring with each other, or a hydrogen atom; $R_{11}$ and $R_{20}$ are independently an alkyl group, an aralkyl group, an aryl group or a heterocyclic group, each of which may have a substituent; $R_{14}$, and $R_{15}$ are a hydrogen atom, a halogen atom, or an alkyl group, an aralkyl group, an acyl group, an alkoxycarbonyl group, an aryl group, a condensed polycyclic group or a heterocyclic group, each of which may have a substituent; $R_{21}$, $R_{22}$, $R_{23}$ and $R_{24}$ are a hydrogen atom, a halogen atom, an alkyl group, a nitro group, substituted sulfone group, a carbamoyl group which may have a substituent on the nitrogen atom, a sulfamoyl group, a C-acylamino group which may have a substituent or a phthalimidyl group; $R_{21}$ and $R_{22}$, or $R_{22}$ and $R_{23}$ may form a ring with each other.

16. A photosensitive member of claim 15, in which the azo pigment of the general formula [III] is mixed with the azo pigment of the general formula [V] at the weight ratio ([III]/[V]) of 1/5–5/1.

17. A photosensitive member of claim 15, in which the azo pigment of the general formula [III] is mixed with the azo pigment of the general formula [V] at the weight ratio ([III]/[V]) of ⅓–3/1.

18. A photosensitive member of claim 15, in which the photosensitive member comprises the azo pigments of the general formula [III] and [V] dispersed in the binder resin at the total content of 0.2–2 parts by weight on the basis of 1 part of the binder resin.

19. A photosensitive member with a photosensitive layer on or over an electrically conductive substrate, in which the photosensitive layer comprises a mixture of an azo pigment represented by the following general formula [V] with an azo pigment represented by the following general formula [VI]:

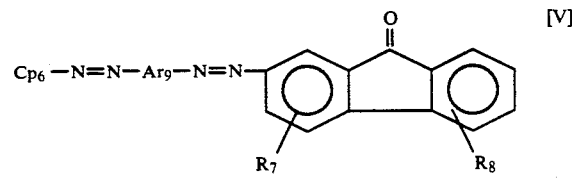

[V]

[VI]

independently an alkyl group, an aralkyl group, an aryl group or a heterocyclic group, each of which may have a substituent; $R_{14}$ and $R_{15}$ are a hydrogen atom, a halogen atom, or an alkyl group, an aralkyl group, an acyl group, an alkoxycarbonyl group, an aryl group, a condensed polycyclic group or a heterocyclic group, each of which may have a substituent; $R_{21}$, $R_{22}$, $R_{23}$ and $R_{24}$ are a hydrogen atom, a halogen atom, an alkyl group, a nitro group, substituted sulfone group, a carbamoyl group which may have a substituent on the nitrogen atom, a sulfamoyl group, a C-acylamino group which may have a substituent or a phthalimidyl group; $R_{21}$ and $R_{22}$, or $R_{22}$ and $R_{23}$ may form a ring with each other.

* * * * *